US012340655B2

(12) United States Patent
Lutnick et al.

(10) Patent No.: US 12,340,655 B2
(45) **Date of Patent: *Jun. 24, 2025**

(54) SYSTEM FOR MANAGING PROMOTIONS

(71) Applicant: CFPH, LLC, New York, NY (US)

(72) Inventors: Howard W. Lutnick, New York, NY (US); Kevin Burman, Hunters Hill (AU); Dean P. Alderucci, Westport, CT (US); Geoffrey M. Gelman, Brooklyn, NY (US); Antonio Papageorgiou, Bronx, NY (US); Joseph M. Asher, Las Vegas, NV (US)

(73) Assignee: CFPH, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/203,719

(22) Filed: May 31, 2023

(65) Prior Publication Data

US 2023/0306812 A1 Sep. 28, 2023

Related U.S. Application Data

(63) Continuation of application No. 17/157,853, filed on Jan. 25, 2021, now Pat. No. 11,704,964, which is a continuation of application No. 15/808,950, filed on Nov. 10, 2017, now Pat. No. 10,902,698, which is a continuation of application No. 13/611,655, filed on Sep. 12, 2012, now Pat. No. 9,818,254, which is a continuation of application No. 11/621,369, filed on Jan. 9, 2007, now Pat. No. 9,600,959.

(51) Int. Cl.
*G07F 17/32* (2006.01)
*G07F 17/34* (2006.01)

(52) U.S. Cl.
CPC .......... *G07F 17/3223* (2013.01); *G07F 17/32* (2013.01); *G07F 17/3286* (2013.01); *G07F 17/34* (2013.01)

(58) Field of Classification Search
CPC .. G07F 17/3223; G07F 17/32; G07F 17/3286; G07F 17/34
See application file for complete search history.

(56) References Cited

U.S. PATENT DOCUMENTS 11,948,424 B2 * 4/2024 Shepherd ............ G07F 17/3239

* cited by examiner

*Primary Examiner* — James S. McClellan
*Assistant Examiner* — Ross A Williams

(57) ABSTRACT

In various embodiments, promotions are featured on mobile gaming devices.

20 Claims, 6 Drawing Sheets

SYSTEM FOR MANAGING PROMOTIONS

CROSS REFERENCE TO RELATED APPLICATIONS

This application is a continuation of U.S. patent application Ser. No. 17/157,853 filed Jan. 25, 2021, which is a continuation of U.S. patent application Ser. No. 15/808,950 filed Nov. 10, 2017 (now U.S. patent Ser. No. 10/902,698 issued Jan. 26, 2021), which is a continuation of U.S. patent application Ser. No. 13/611,655 fled Sep. 12, 2012 (now U.S. Pat. No. 9,818,254 issued Nov. 14, 2017), which is a continuation of U.S. patent application Ser. No. 11/621,369 filed Jan. 9, 2007 (now U.S. Pat. No. 9,600,959 issued Mar. 21, 2017), each of which is incorporated by reference herein in its entirety.

DETAILED DESCRIPTION

Guidelines for Interpreting the Present Application

Figure 1:
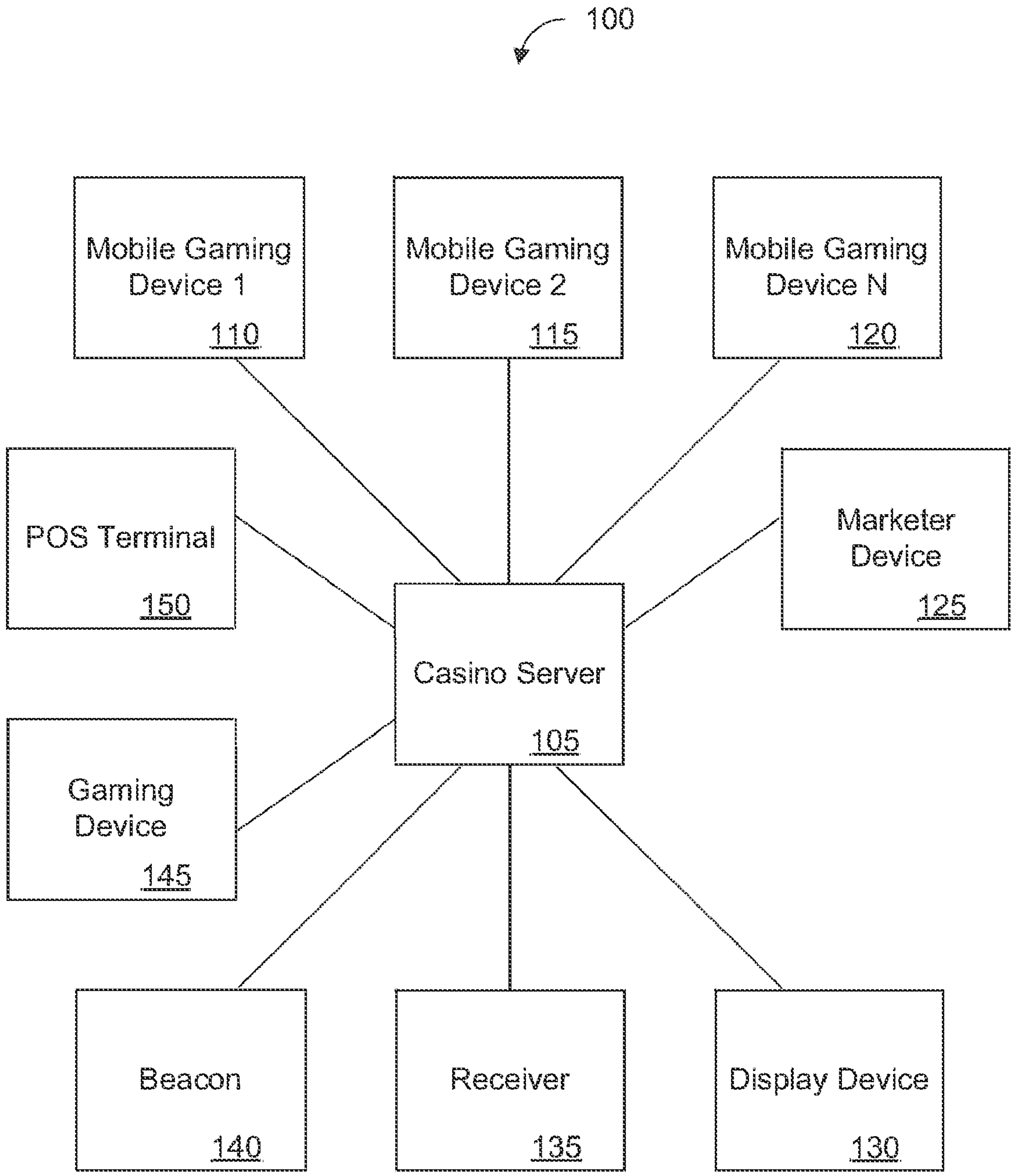
FIG. 1 shows a system according to some embodiments.

The following sections I-X provide a guide to interpreting the present application.

I. Terms

The term "product" means any machine, manufacture and/or composition of matter, unless expressly specified otherwise.

The term "process" means any process, algorithm, method, or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment," "embodiment," "embodiments," "the embodiment," "the embodiments," "one or more embodiments," "some embodiments," "certain embodiments", "one embodiment," "another embodiment" and the like mean "one or more (but not all) embodiments of the disclosed invention(s)," unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car, and a wheel. The phrase "at least one of", when such phrase modifies a plurality of things does not mean "one of" each of the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on."

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number, and the data also represents something else".

The term "whereby" is used herein only to precede a clause or other set of words that express only the intended result, objective, or consequence of something that is previously and explicitly recited. Thus, when the term "whereby" is used in a claim, the clause, or other words that the term "whereby" modifies do not establish specific further limitations of the claim or otherwise restricts the meaning or scope of the claim.

The term "e.g." and like terms mean "for example," and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data," and other things besides "instructions" and "a data structure" can be "data."

The term "respective" and like terms mean "taken individually." Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is," and thus limits the term or phrase it explains. For example, in the sentence "the computer sends data (i.e., instructions) over the Internet," the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed and does not imply that numerical methods must be used and does not imply that an algorithm or process is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. Disclosed Examples and Terminology are not Limiting

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. § 1.72(b).

The title of the present application and headings of sections provided in the present application are for convenience only and are not to be taken as limiting the disclosure in any way.

Numerous embodiments are described in the present application and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

All words in every claim have the broadest scope of meaning they would have been given by a person of ordinary skill in the art as of the priority date. No term used in any claim is specially defined or limited by this application except where expressly so stated either in this specification or in a claim.

The preambles of the claims that follow recite purposes, benefits, and possible uses of the claimed invention only and do not limit the claimed invention.

The present disclosure is not a literal description of all embodiments of the invention(s). Also, the present disclosure is not a listing of features of the invention(s) which must be present in all embodiments.

Devices that are described as in communication with each other need not be in continuous communication with each other, unless expressly specified otherwise. On the contrary, such devices need only transmit to each other as necessary or desirable and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves, and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. § 112, Paragraph 6

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material, or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function hat is a method, one structure for performing this method includes a computing device (e.g., a general purpose computer) that is programmed and/or configured with appropriate hardware to perform that function. Also includes a computing device (e.g., a general purpose computer) that is programmed and/or configured with appropriate hardware to perform that function via other algorithms as would be understood by one of ordinary skill in the art.

VIII. Disclaimer

Numerous references to a particular embodiment does not indicate a disclaimer or disavowal of additional, different embodiments, and similarly references to the description of embodiments which all include a particular feature does not indicate a disclaimer or disavowal of embodiments which do not include that particular feature. A clear disclaimer or disavowal in the present application shall be prefaced by the phrase "does not include" or by the phrase "cannot perform".

IX. Incorporation By Reference

Any patent, patent application or other document referred to herein is incorporated by reference into this patent application as part of the present disclosure, but only for purposes of written description in accordance with 35 U.S.C. § 112, paragraph 1 and enablement in accordance with 35 U.S.C. § 112, paragraph 1, and should in no way be used to limit, define, or otherwise construe any term of the present application where the present application, without such incorporation by reference, would not have failed to provide an ascertainable meaning, but rather would have allowed an ascertainable meaning for such term to be provided. Thus, the person of ordinary skill in the art need not have been in any way limited by any embodiments provided in the reference.

Any incorporation by reference does not, in and of itself, imply any endorsement of, ratification of, or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

Tailored Ads in Virtual Game Environments

Various virtual game environments, interactive environments, role-playing environments, virtual worlds, virtual communities, and other environments currently exist or may exist in the future. Examples include Second Life, EverQuest, World of Warcraft, and Guild Wars. Such environments may include slots, mediums, or other opportunities to display promotions, such as advertisements. The promotions may pertain to the virtual world or to the real world. For example, the promotions may be advertisements for products in the real world. For example, a virtual world billboard may advertise a soft drink that is actually sold and drunk in the real world.

In various embodiments, players or patrons of a virtual environment may register or otherwise supply information about themselves. For example, a player may provide a name and email address when registering to play in a virtual gaming environment. Other information about the player may be derived in other ways. For example, information about the player may be collected from his playing habits. For example, information about the player may be collected detailing times of day when the player is active in the virtual community. From such information, for example, the player's sleeping hours and eating hours may be deduced. In various embodiments, information about a player may be derived from interacting with his computer. For example, the interaction of the player's computer with the server operating the virtual environment may provide information about the player's physical location.

In various embodiments, information about a player or participant in a virtual environment may be used in selecting which promotions will be presented to the player. In various embodiments, information about a player or participant in a virtual environment may be used in conjunction with current circumstances, such as time of day, in presenting promotions to the player.

In various embodiments, a particular location in virtual world may display different promotions depending on which players are currently viewing that location. For example, suppose a player is driving on a road in a virtual world. The road may include a billboard which displays advertisements to passing cars. The player's real address may be on record with the server operating the virtual world. The real address may be in West Virginia, for example. Accordingly, the virtual world may present a promotion on the billboard that relates to a business in West Virginia. For example, the promotion may be an advertisement for a take-out restaurant near to the player's house in West Virginia. When a second player drives by the same billboard in the virtual world, a different promotion may be displayed to the second player. The different promotion may be a promotion that is tailored to information about the second player, such as to the second player's home address in the real world. In various embodiments, two players may see the same virtual location, but may see different promotions at the same location. Thus, it may be as if the two players are in parallel virtual universes in that they are in the same place at the same time but see different things. The promotions shown to the players may be tailored to the players' respective information.

In various embodiments, promotions shown to a player may be chosen (e.g., by the game server) based on the time of day. For example, if it is local noon for a player in the real world, a promotion may be shown for a fast food restaurant. If it is the evening, a promotion may be shown for a prime-time TV show.

Pay a Person to Receive Ads on his Cell Phone

In various embodiments, a user of a mobile device, such as of a cell phone, may be paid to receive promotions at his mobile device. The person may receive payment from his wireless carrier and/or from marketers. As payment, a person may receive cash, discounts off a cell phone bill (e.g., the person may have his cell phone bill reduced from $40 to $35), gift certificates (e.g., gift certificates for the products being promoted by a marketer providing promotions to the person), and any other benefit. A person may agree to have a certain quantity of promotions downloaded to his mobile device. The quantity may include some quantity of playing time. For example, the quantity may include 1 hours' worth of promotions per month. The quantity may include some total number of promotions (e.g., 20 promotions per month). The quantity may include some total bit or byte quantity of promotions. For example, the quantity may include 30 megabytes worth of promotions downloaded per month. A person may receive differing payments or benefits depending on the quantity of promotions downloaded. For example, a person who has 20 minutes of promotions downloaded per week may receive a $10 benefit per month, while a person who has 10 minutes of promotions downloaded per week may receive a $4 benefit per month.

In various embodiments, promotions downloaded may include ring tones. One possible benefit of a ring tone is that it may be heard not only by the owner of mobile device (e.g., a cell phone), but it may also be heard by others in the vicinity of the owner when the device rings. Thus, if the ring tone promotes a particular product or service, the promotion may reach more than just one person. In various embodiments, a person may be paid or may receive a benefit for downloading a particular ring tone. In various embodiments, a person may receive a benefit for using a particular ring tone. For example, a cellular phone may report to the wireless carrier (or to any other business or authority) on the usage of a particular ring tone. A person may be paid according to this reported usage. In various embodiments, a person may be paid according to the number of phone calls he receives and according to the number of times a particular ring tone is thereby played. In various embodiments, a person may be paid according to his or her location at the time that a ring tone is played from his cellular phone. For example, a person may be paid more if his ring tone goes off in a crowded or frequently trafficked area than if the ring tone goes off in an isolated area. In various embodiments, a person may be paid according to the time of day that a ring tone goes off. For example, a person may be paid more if a ring tone goes off during a busy time of day (e.g., during a lunch hour) than during a time of day when most people are at home or are at work in a particular area.

Software which Prevents or Discourages the Mobile Device from Presenting Unauthorized Ads (or Other Things).

In various embodiments, a party that is not affiliated with the casino may attempt to transmit data for a promotion to a mobile gaming device. The party may wish to have a promotion presented on the mobile gaming device. In doing so, however, the party may be circumventing the casino, and may thereby be avoiding making payments to the casino that are rightfully owed to the casino.

In various embodiments, a mobile gaming device may include software to prevent the presentation of unauthorized promotions.

In various embodiments, data for an authorized promotion may include a tag, label, or other associated data. The tag may be an authorization code, for example. A mobile gaming device may include software which can determine whether a tag is valid or not. For example, a valid tag may include a digital signature from the casino server. The mobile gaming device may include software that can check whether the tag is a valid digital signature of the casino server. In various embodiments, a digital signature may incorporate data from a promotion. Thus, another party may be unable to effectively take a digital signature from an authorized promotion and move it to an unauthorized promotion.

In various embodiments, data associated with a promotion may include a time stamp. The time stamp may indicate, for example, when a promotion was approved by the casino server or by some other authoritative body. A mobile gaming device may include software for determining whether a time stamp represents a time in the recent past. If the time represented by a time stamp is too far in the past, then the mobile gaming device may prevent the promotion from being displayed. In various embodiments, a promotion must be displayed within a certain amount of time of receiving a time stamp. Thus, a party that attempts to intercept an old time stamp, attach it to an unauthorized promotion, and then display the promotion, may be foiled. In some embodiments, a time stamp provided by an authorized body, such as by the casino server, may incorporate the data of the promotion. Thus, another party may be unable to take a time stamp associated with one promotion and use it for another.

In various embodiments, data associated with a promotion may be encrypted enroute to a mobile gaming device. For example, the casino server may use its private key to encrypt data associated with a promotion. The mobile gaming device may then use the casino server's public key to decrypt data associated with the promotion, and to then present the unencrypted promotion. A party that attempts to transmit an unauthorized promotion to a mobile gaming device may not have access to the casino server's private key. Therefore, the party may not be able to pass off the unauthorized promotion as a legitimate promotion.

In various embodiments, a human screener may view a presentation of a promotion before it is presented to a person via a mobile gaming device. If the promotion does not meet certain criteria, the human screener may prevent the promotion from being presented. The human screener may flag the promotion, for instance, with a tag that prevents the casino server from transmitting the promotion to a mobile gaming device.

In various embodiments, a player may have the opportunity to indicate a reaction to a promotion. The player may indicate, for example, that he liked the promotion, that the promotion was funny, that the promotion was relevant to him, that the promotion was of the right length, that the promotion was of the right volume, that the promotion was for a product or service about which the player would like to learn more, and so on. The player may rate the promotion using a numerical rating, for example. For instance, the player may give the promotion a rating of 1 to 5 on a scale of relevance. In various embodiments, a player may furnish a negative reaction as well. A player may indicate that a promotion was offensive, irrelevant, too long, too distracting, or in any other way undesirable.

A player's reaction to a promotion may be forwarded by the casino server to the marketer that originated the promotion. The marketer may thereby have an opportunity to design a better promotion. The player's reaction may also be used to build a profile for the player. The profile may include a set of preferences of the player. The profile may be used to determine future promotions that should be presented to the player.

A player's reaction to a promotion may be used in preventing a promotion from being presented to other players. A player may flag a promotion as offensive or inappropriate, for example. The casino server may then decide not to present the promotion any further. In some embodiments, if a player flags a promotion, a casino representative may view the promotion. The casino representative may then decide whether or not to continue presenting the promotion. In various embodiments, a promotion may no longer be presented if it is flagged by a predetermined number of players. For example, if three or more players tag a promotion as inappropriate, the casino server may cease presentation of the promotion. The casino server may halt the presentation of a promotion by failing to transmit data for the promotion to any further mobile gaming devices. The casino server may halt the presentation of a promotion by sending a signal to one or more mobile gaming devices with data describing the promotion already stored locally on the mobile gaming devices. The casino server may instruct the mobile gaming devices not to present such promotions. The casino server may instruct the mobile gaming devices to delete such promotions.

In various embodiments, a mobile gaming device may inform the casino server when a promotion has been presented. For example, the mobile gaming device may inform the casino server of date and time when a promotion was presented. The mobile gaming device may further provide an identifier for the promotion. The casino server may then bill the marketer who sent the promotion for the presentation of the promotion. In various embodiments, a mobile gaming device may transmit one or more of the following pieces of information to the casino server: (a) the date of a promotion's presentation; (b) the time of a promotion's presentation; (c) an indication of which promotion was presented (e.g., an identifier for a promotion; e.g., "The Ford Promotion"); (d) a format in which a promotion was presented (e.g., a promotion was presented only as a still image; e.g., a promotion was presented in its abbreviated 3 second form; e.g., a promotion was presented in its full 20 second form; e.g., a promotion was presented as audio only); (e) a sponsor of a promotion; (f) a length of a promotion; (g) a game during which a promotion was presented; (h) a location on a display screen where a promotion was presented; (i) one or more outcomes which occurred on the player's mobile gaming device preceding the promotion (e.g., a promotion may cost a marketer more if the promotion was made following a string of winning outcomes for the player); (j) a player's reaction to a promotion (e.g., the player wished to find out more information; e.g., the player was bored with the promotion); (k) and any other pertinent information.

In various embodiments, the casino server may include accounting software. The software may track when promotions have been presented, how much is owed to the casino based on such presentations, how many remaining presentations of a promotion must be made, how much has already been paid by a marketer, who a promotion has been presented to, and any other information related to a promotion, amounts.

In various embodiments, a mobile gaming device may verify with the casino server that a promotion should be presented before actually presenting the promotion. For example, the mobile gaming device may send an identifier associated with the promotion to the casino server. The casino server may check a record of promotions that had been transmitted to the mobile gaming device. If the record does not contain the identifier transmitted to the casino server by the mobile gaming device, then the casino server may instruct the mobile gaming device not to present the promotion that the mobile gaming device had indicated.

Prevent Presentation of Promotions that are Confusing and Look Like Symbols

In various embodiments, certain types of promotions may be barred from presentation because of the possibility that the promotions would be confusing or misleading. As an illustration, a promotion may be presented in place of a symbol. If the promotion looks like a jackpot symbol, then a player may believe he has won a large prize when the promotion lines up with several real jackpot symbols. The player would be sorely disappointed to find that he had not won as much as he thought.

In various embodiments, the casino server may contain software for analyzing images associated with promotions. The software may use image recognition or image comparison algorithms to ensure that images shown in promotions look sufficiently distinct from images typically seen in a game. For example, image processing algorithms may be used to determine a border for a symbol. Image processing algorithms may similarly be used to determine a border for a graphic in a promotion. The two borders may be represented with looped black lines, for example. The two borders may then be overlain on top of one another. If the two borders fall within a predetermined distance of one another (e.g., within three pixels) over their entire lengths, then the borders may be construed to define similar shapes. The promotion may be barred based on the fact that it contains a graphic which is shaped similarly to a symbol. In various embodiments, coincidence of both shape and color may be sufficient reason to bar a promotional graphic. As will be appreciated, many other algorithms may be used to perform image recognition and/or image comparison.

In various embodiments, comparisons of promotional images with images used in a game may be performed on a mobile gaming device. For example, a mobile gaming device may store software for performing image comparisons and/or image recognition. In various embodiments, comparisons of promotional images with images used in a game may be performed on a stationary gaming device.

In various embodiments, promotions may be restricted such that the promotions may be presented only with certain games. The restrictions may be based on a comparison between images in a promotion and between images in a game. If images in a promotion look too similar to the images in a game, presentation of the promotion may be unallowable in conjunction with a game. However, if images in a promotion do not look too similar to images in a game, then the presentation of the promotion may be allowed in conjunction with a game. Thus, in various embodiments, it may be permissible to present a given promotion in conjunction with a first game, but not in conjunction with a second game. For example, suppose a promotion comprises an image that is presented on the reels of a slot machine game. The promotion may be presented with a first slot machine game, but not with a second slot machine game.

In various embodiments, it may be permissible to present a promotion at a certain location on a display screen, but not at another location. It may be impermissible to present a promotion in a first location on a display screen if images in the promotion might be confused with standard game elements or images. For example, if an image in a promotion looks like a symbol used in a game, it may be impermissible to present the promotion within the game area (e.g., on the reel symbols; e.g., in an area where cards are typically dealt). However, it may still be permissible to present the promotion in another area of the screen. For example, it may still be permissible to present the promotion to the right of the game area. As another example, a promotion may include images which show numerals (e.g., "5% APR on a new credit card!"). It may be impermissible to present such a promotion in a location where numerals are typically presented as part of a game. For example, a presenting a promotion with images of numerals may be impermissible near an area where a player's credit balance is typically displayed. Thus, in various embodiments, software may compare images in promotions to images typically seen at different areas of a display screen. Image comparison algorithms may be used. If the images of a promotion are too similar to those of standard game elements in a particular area of a display screen, then it may be made impermissible for the promotion to be presented in that area. On the other hand, if there is not too much similarity between the images in the promotion and between the images of typical game elements in an area, then the promotion may be presented in that area. In various embodiments, humans may visually compare images, or may otherwise make a determination as to whether it is permissible for a promotion to be displayed in a particular area of a display screen. The foregoing may be understood with respect to a mobile gaming device or to a gaming device, in various embodiments.

In various embodiments, it may be permissible to present a promotion at one time during a game, but not at another time. For example, certain images associated with a game may typically arise only during a single stage of the game. Such images may not arise at other points in the game. Accordingly, the presentation of promotions showing similarly looking images may be permissible only during those stages when the game images are not typically displayed. For example, a slot machine game may include a bonus round. The bonus round may include images that are not seen in the earlier stages of the game. Thus, presentation of promotions which include images similar to those shown in the bonus round may be impermissible during the bonus round, but permissible during other stages of the game.

In various embodiments, certain colors may be impermissible in a promotion. Such colors may be the same colors as symbols or other game elements. In various embodiments, certain shapes may be impermissible in a promotion. Such shapes may be shapes used as symbols or other game elements. In various embodiments, a list, table, or other indicator of prohibited shapes may be published, posted, transmitted to marketers, or otherwise made available.

In various embodiments, game developers may submit graphics or indications of graphics used in their games. The game developers may submit such graphics to a regulator, to a marketer, to a casino server, or to another party. Graphics from different games may be stored together or may be stored in association with one another, such as being stored in a single database or set of linked databases. Marketers may then refer to the graphics in order to design promotions that have dissimilar graphics. A regulator or casino server may similarly compare game graphics to promotional graphics to ensure there is not a conflict.

In various embodiments, a consulting company or other company may have access to a database or other conglomeration of graphics used in games. The company may help marketers design promotions that do not use graphics too similar to those used in games. In various embodiments, the consulting company may have private access to the conglomeration of symbols, e.g., so game developers do not have to share knowledge of graphics with competing developers.

In various embodiments, humans may be used to compare graphics used in promotions to graphics used in a game. In various embodiments, a human tester may play a game that features promotions. The human may later be asked whether they were ever confused or misled by a promotion. For example, the human may ask whether they ever thought they had won something when they did not. If the human reports that they were not confused, then the promotions may be permitted as part of the game. In various embodiments, a test may require a certain number of people to report that they were not confused. For example, a test must involve at least six people, and all must report that they were not confused by a promotion.

In various embodiments, sounds associated with a promotion may be compared to the sounds featured in a game. In various embodiments, an algorithm may be used to compare the sounds of a promotion with the sounds featured in a game. The algorithm may compare tones, tempos, rhythms, musical keys, volume, instrumental sounds (e.g., violin, e.g., piano), or any other feature of sounds. In various embodiments, if the sounds of a promotion are deemed to be too similar to sounds featured in a game, presentation of the promotion may made impermissible in the game. In various embodiments, if sounds in a promotion are deemed to be too similar to those in a game, the promotion may be presented, but without the sounds. For example, the promotion may be presented using only graphics.

In various embodiments, humans may listen to sounds from a promotion and from a game. The human may use his own judgment to determine whether the sounds of the promotion might be confused with the sounds of the game. In various embodiments, a group of test subjects listens to both sounds. Only if none, or less than a predetermined number of the test subjects says that the sounds would not be confusing may the promotion be allowed for presentation in the game. In various embodiments, one or more test subjects is allowed to play a game in which a promotion was presented. The test subjects are then asked whether they were confused by the promotion, e.g., whether they at any time thought that sounds from the promotion had something to do with the game. Only if the subjects report no confusion may the promotion be used in the game, in various embodiments.

In various embodiments, it may be impermissible to show faces in promotions. In various embodiments, it may be impermissible to show a face in a promotion without having received prior approval from the face's owner. In various embodiments, software or a human may analyze graphics associated with a promotion to determine whether there are any faces in the promotion. For example, face recognition algorithms may be used to detect faces in promotions. In various embodiments, the use of certain celebrity faces may be impermissible in promotions. For example, the celebrities may have failed to supply permission for appearing in promotions. Humans or algorithms, such as face recognition algorithms, may be used to compare faces appearing in promotions to known faces of celebrities so as to ensure that the celebrities do not appear in the promotions.

In various embodiments, humans or software may be used to ensure a promotion does not contain certain words. For example, software may check for vulgar or obscene words.

In various embodiments, software may ensure that data for a promotion is in a satisfactory format. For example, software may check that data for an image meets certain dimensions or pixel constraints. For example, the software may verify that image data represents an image of exactly 100 pixels by 200 pixels. As another example, software may verify that an image contains the proper color encoding. For example, software may verify that an image for a promotion uses eight bits to describe each of the three primary colors. In various embodiments, software may verify that data describing a promotion is not excessive. For example, a promotion may be limited to 10 megabytes or to any other limit.

In various embodiments the casino server may transmit instructions to a mobile gaming device. The instructions may tell the mobile gaming device to present a promotion when, or only when the mobile gaming device is in a particular area of a casino. For example, the casino server may instruct the mobile gaming device to present a promotion only when the mobile gaming device is within ten feet of a particular restaurant. As another example, the casino server may instruct the mobile gaming device to present a promotion only when the mobile gaming device is in the swimming area of a casino.

Offering to Transfer a Player from a Mobile Gaming Device to a Stationary Gaming Device In various embodiments, a player may be involved in gaming on a mobile gaming device. The player may wish to play the same game at a stationary gaming device. For example, the stationary gaming device may afford the player a place to sit, may feature a larger display screen, may feature improved sound, or may have any other advantage or convenience. In various embodiments, the casino server may offer the player the chance to transfer from playing a game at a mobile gaming device to playing a game at a stationary gaming device. The player may have the chance to transfer to a stationary gaming device and play the same game that he had been playing at a mobile gaming device.

When a player transfers from a mobile gaming device to a stationary device, any credit balance that the player has with the mobile gaming device may be transferred to the stationary device. Thus, for example, the stationary device may create a credit balance equal to the credit balance on the mobile gaming device, while the credit balance of the mobile gaming device may be set to zero. In various embodiments, the player may be given additional credits at the stationary device, e.g., as an incentive for transferring. In various embodiments, the player may be given fewer credits at the stationary device. In various embodiments, some of the player's credits may be transferred and some may remain on the mobile gaming device.

When offering the player the chance to transfer, the casino server may provide an indication of the location of the stationary device. For example, the casino server may transmit to the player's mobile gaming device an indication of the location of the stationary device. The casino server may also indicate directions to the stationary gaming device. The directions may include directions from a standard location in the casino (e.g., from the front entrance) or from the current location of the mobile gaming device. In various embodiments, directions may include directions from the current location of the mobile gaming device.

Conducting

As used herein, the term "conducting" may be used in the context of a game, such as in the phrase "conducting a game." Conducting a game may include receiving a bet, storing a record of the amount of the bet, determining or generating an outcome of a game (e.g., such as by the execution of an algorithm for generating random outcome), determining an amount to be paid out as a payout based on the outcome and the bet (e.g., determining a multiple of the bet to be paid out in the event of a winning outcome), paying or directing that the payout be paid, and performing any other aspect of a game. In various embodiments, a game may be conducted by a remote entity. For example, though a player may interact with a mobile gaming device, the casino server may generate the outcomes that occur in games of the player. In various embodiments, a game may be conducted by a proximate entity, such as a mobile gaming device with which a player interacts. In various embodiments, a game may be conducted jointly by a proximate and remote entity. For example, a mobile gaming device and the casino server may jointly conduct a game.

Stationary Device

As used herein, the term "stationary device" may include a stationary game gaming device, a terminal used for gaming, and a table game. For example, a stationary device may include a slot machine, a video poker machine, a terminal at which players may place bets, a blackjack table, and a poker table.

In various embodiments, the casino server may provide instructions to a mobile gaming device. The instructions may indicate where the mobile gaming device should be before a promotion may be presented. For example, a mobile gaming device must be near a particular bar before a promotion must be presented. The promotion may be a promotion for an alcoholic beverage, for example.

Demographic

As used herein, the term demographic may refer to an age, age range, race, gender, income level, range of income levels, marital status, level of education, presence or absence of children, number of children, net worth, language spoken, religion, political orientation, or to any other characteristic which may be used to classify a person into some segment of the population.

House Edge, House Advantage

As used herein, the terms "house edge" and "house advantage" may refer to an amount that the house is expected to retain, on average, per unit bet by the player. The house edge may be expressed in percentage terms. For example, a house edge of 5% may indicate that the house can expect to retain 5 cents on average per dollar bet by a player. It should be noted that a statement of a house edge does not imply that the house will necessarily retain the stated amount of a player's bet on each game. The house edge, rather, refers to an expectation or average. For example, suppose a player bets $1 on a game in which he has a 45% chance of winning $2, and a 55% chance of winning nothing. The house edge may be calculated as (0.55*($1−$0)+0.45*($1−$2))/$1=10%. Thus, the house may expect to win 10 cents per dollar wagered by the player.

Outcome

As used herein, the term "outcome" may refer a set of symbols or indicia which may be obtained (e.g., randomly generated; e.g., selected by a player) in a game (e.g., in a game played with a wager), and which may determine a course or direction in the game and/or which may determine a payment or prize to be awarded from the game. The term "outcome" may, in various embodiments, refer both to symbols and indicia and to the payment or prize awarded in a game. The term "outcome" may, in various embodiments, refer to the prize or payment awarded in a game. In various embodiments, multiple outcomes may occur during a game. For example, in a slot machine game, each activated pay-line may feature a different outcome. Further, in various embodiments, a game may include a succession of outcomes. For example, in a game of video poker, an initial set of five cards dealt to a player may constitute a first outcome. The final hand of cards obtained by the player after discarding cards from the initial set of five cards may constitute a second outcome. In various embodiments, the aggregate effect of several outcomes in a game may itself constitute an outcome. For example, in a slot machine game, a player may activate three pay-lines and may thereby receive three outcomes. Payouts associated with the three outcomes may be 2 coins, 5 coins, and 3 coins. Thus, the aggregate outcome of the game may be that the player receives a payout of 10 coins. Examples of outcomes include: (a) a set of symbols achieved across the pay-line of a reel slot machine; (b) a set of cards dealt in a game of poker; (c) a set of cards dealt in a game of blackjack; (d) a player hand in a game of blackjack; (e) a player hand in combination with a dealer hand in blackjack (i.e., an outcome in a game of blackjack may include cards received by a player and cards received by a dealer); (f) a number rolled in a game of craps; (g) a series of numbers rolled in a game of craps (e.g., in a game of craps, an outcome may include the entire series of numbers rolled between the time a player made a bet and the time the player was paid for his bet or lost his bet); (g) a set of numbers generated in a game of keno; (h) a prize amount revealed in a bonus round; and so on.

Product

As used herein, the term "product" may include a good. As used herein, the term "product" may include a service.

Gaming

As used herein, the term "gaming" may refer to placing a first value at risk on one or more events whose outcomes cannot be predicted with certainty, with the possibility of winning a second value should a particular outcome of the event(s) actually occur. Gaming may include: (a) betting money on the outcome of a roll of dice; (b) betting money on the deal of one or more cards; (c) betting money on the spinning of a wheel; (d) betting money on the spinning of slot machine reels; (e) betting money on the outcome of a sporting contest; (f) betting money on the outcome of an election; (g) betting money on the occurrence of a natural event, such as a hurricane; and betting money on any other event which cannot be predicted with certainty. Gaming may include: (a) playing a game of poker with money at risk; (b) playing a game of craps with money at risk; (c) playing a game of roulette with money at risk; (d) betting money on the outcome of a football game; or betting money on any other game or contest. The "value" placed at risk in gaming may include anything that may be of benefit to a person or other entity, whether or not the benefit may be experienced by the person engaging in gaming. Value may be tangible or intangible. Value may include: (a) cash; (b) credits; (c) tokens; (d) rights (e.g., the right to bypass a line for a buffet; e.g., the right to a free spin at a slot machine); (e) products; (f) services; (g) comp points; (h) coupons; (i) vouchers; (j) movie tickets; (k) the right to receive a loan; (l) frequent flyer miles; and any other item of value. The value that may be won from gaming need not be of the same type as that placed at risk. For example, a person may put at risk cash in order to win movie tickets. The events which are the subject of gaming may be predictable in principle, but may not be predictable given applicable rules, standards, or capabilities. For example, a person may be able to predict which cards will be dealt by rigging a deck of cards. However, rigging the deck of cards would be contrary to the rules of the game. Placing an item of value at risk may include allowing the possibility that some or all of the item of value will be lost. Gaming may include placing value at risk even if such value is not in the possession of the gamer. For example, a business owner may bet half of his future business profits for the forthcoming calendar year. Gaming may include investing, such as investing in the stock or bond market. Gaming may further include taking a derivative position, such as buying puts or calls on stocks.

Detection of One Device by Another

Various embodiments described herein may refer to the interaction between a first device and a "nearby" second device. In various embodiments, the first device may take action if the second device is nearby. In various embodiments, the second device may take action if the first device is nearby. When terms such as "nearby", "near", "close", "proximate", "presence", or the like are used, it will be understood that the first device may recognize the presence of the second device in various ways, that the second device may recognize the presence of the first device in various ways, that the first device may react to the presence of the second device in various ways, and that the second device may react to the first device in various ways. It may be noted that the first device may react to the presence of the second device without recognizing the presence of the second device if, for example, the first device is instructed to take an action by a third device which recognizes that the second device is near to the first device. In various embodiments, the first device and/or the second device may be in motion. For example, the first device may be moving (e.g., the first device may be carried by a walking person) while the second device may be stationary.

Various technologies may allow a first device to recognize and/or to react to the presence of a second device. Various technologies may allow a second device to recognize and/or to react to the presence of a first device. As used herein, the term "beacon" includes a device which generates a signal which may be used as a reference signal by another device or person, e.g., so that the other device may determine its own location or position. A beacon may emit a continuous, periodic, sporadic, or other type of signal. A beacon may emit a directed signal (e.g., a signal which is most easily detected by devices at a certain incident angle to the beacon) or the beacon may emit a signal of equal strength in all directions. A beacon may emit a signal when triggered by the presence of another device or may emit a signal independently of other events. A beacon may have, as its sole function, the broadcast of a reference signal. A beacon may serve as a beacon only incidentally. For example, a light bulb may incidentally serve as a beacon even though its primary purpose may be to light a room. A beacon may be natural (e.g., the sun) or man-made. A beacon may emit light, sound, radio waves, microwaves, odors, or any other form of signals.

Radio Frequency Identification (RFID) tags or transponders are devices, generally small, that can transmit signals and/or redirect signals, and use such signals as a means for providing identification. The transmitted or redirected signals are generally radio waves. Signals which are transmitted or redirected may contain a unique signature or pattern, which may serve to uniquely identify the RFID tag. If the tag is associated with a device (e.g., by attachment or by incorporation into the device), then the unique identification of the tag can, by association, serve to uniquely identify the device.

Near field communication (NFC) is a technology that allows for secure wireless communication over short distances, typically in the range of inches. An exemplary application has been tested by Motorola and Mastercard, in which cellular phones are outfitted with NFC to allow for credit card payments using cellular phones.

Infrared data transmission can be used as a means of communication between two nearby devices. For example, an infrared light-emitting diode (LED) can be used to generate signals. The signal pattern can be created by switching the LED on and off. A receiver may include a silicon photodiode, which may convert incident infrared light into electrical signals. Infrared signals may also be transmitted with lasers.

A device may be recognized by means of a captured picture or image of the device. For example, a first device may take a picture of a second device. The first device may use image processing algorithms to detect salient features of the second device. For example, if the second device has a pattern of black and white stripes, then the first device may search for such a pattern within captured images.

One or more devices may use positioning technologies to determine their own location. Once the locations of two devices are known, simple algorithms may be used to determine whether the devices are close to one another or not. For example, the distances between two devices with known x and y coordinates can be at least approximated using the Pythagorean Theorem. Various positioning technologies may be used. For example, a device may receive a signal from a beacon or other signal generator of a known location. Particularly if the beacon has a short range, the device's position may be assumed to approximate the position of the beacon. In various embodiments, a device may receive signals from multiple beacons or signal generators. The signal generators may coordinate to transmit the signals simultaneously. However, depending on the device's location, the device will not necessarily receive the signals from all the beacons at the same time. For example, if the device is closer to beacon 1 than to beacon 2, the device will receive the signal from beacon 1 prior to receiving the signal from beacon 2. Based on the arrival times of signals from the various beacons, the device's location may be deduced. For example, geometric or trigonometric algorithms may be used to determine the location of the device based on the known locations of the beacons and based on the arrival times of simultaneously transmitted signals from the beacons. In an analogous fashion to systems involving beacons, positioning systems may make use of receivers at known locations (e.g., fixed receivers). The fixed receivers each receive a signal from the device about which a location is desired. The same signal from the device might arrive at the different receivers at different times, or from different angles. Based on the arrival times or angles of arrival of the signal at the various receivers, algorithms may be used to determine the location of the device. Exemplary positioning systems are as follows:

The Global Positioning System (GPS) is based on a constellation of satellites which transmit reference signals to locations on earth. GPS receivers can pick up reference signals from multiple satellites and use the signals to determine a position and/or an altitude.

Long Range Navigation (LORAN) is a navigation based on earth-based radio transmitters. The location of a device can be estimated based on differences in arrival times at the device of signals from three or more transmitters.

Radiolocation using the cellular telephone network is a system whereby cellular base stations serve as fixed receivers. The signal from a cellular phone may be received at multiple base stations. The location of the cellular phone may be determined based on when a signal from the cellular phone was received at each of the base stations, based on the angle with which a signal from the cell phone was received at each of the base stations, and/or based on characteristic distortions in the cell phone signal that would indicate a particular location of origin of the signal.

A first device may emit an audio signal. The audio signal may consist of a distinct series of notes or pulses. A second device may pick up the audio signal using a microphone, for example. The second device may recognize the distinctive pattern of the audio signal and may thereby deduce the presence of the first device. In a similar fashion, the second device may emit an audio signal which may allow the first device to identify the second device.

A first device may recognize the presence of a second device from physical or electronic contact. For example, a first device may have a port where a second device can be docked. When docked, the second device may come into electrical contact with the first device. The first device may thereby recognize the presence of the second device and/or the second device may thereby recognize the presence of the first device.

There are various ways in which one or more devices may detect the presence of one or more other devices. There are various ways in the proximity of two devices may be determined.

A first device may detect a signal from a second device. The first device may thereby detect the presence of the second device.

A first device may determine its own location. For example, the first device may use a positioning system to determine its own location. The first device may already know the location of the second device. For example, the second device may be at a well-known, fixed location. The first device may have stored in memory the location of the second device. Once the first device knows its own location and that of the second device, the first device may deduce (e.g., using geometric algorithms) when the first device is near to the second device.

A third device may detect the position of a first device, e.g., using a positioning system. The third device may know the position of a second device. The third device can then inform the first, second, or both devices of the positions of either or both of the first and second devices. The first device may thereby determine whether it is proximate to the second device. The second device may thereby determine whether it is proximate to the first device. In some embodiments, the third device may inform the first device that the first device is near the second device. In some embodiments, the third device may inform the second device that it is near the first device. In some embodiments, the third device may instruct the first device to take some action based on the fact that the first device is near to the second device, without necessarily informing the first device that the first device is near the second device. In some embodiments, the third device may instruct the second device to take some action based on the fact that the second device is near to the first device, without necessarily informing the second device that the second device is near the first device.

A third device may detect the positions of both a first device and a second device. The third device can then inform the first, second, or both devices as above. That is, the third device may inform the first and/or second devices of the first and/or second devices' positions or of the fact that the first and second devices are near to each other. The third device may also provide instructions to the first and/or to the second device based on the fact that the two devices are near to each other.

A third device may detect the position of a first device. A fourth device may detect the position of a second device. The third and fourth devices may then inform the first device of both positions. The third and fourth devices may inform the second device of both positions. The third and fourth devices may inform the first device that the first device is near the second device. The third and fourth devices may inform the second device that the first device is near the second device. The third and/or fourth devices may instruct the first device to take some action based on the fact that the first device is near the second device. The third and/or fourth devices may instruct the second device to take some action based on the fact that the first device is near the second device. The fourth device may inform the third device of the position of the second device. The third device may inform the first device of the positions of the first device and the second device. The third device may inform the first device that the first device is near the second device. The third device may inform the first device to take some action based on the fact that the first device is near the second device. The third device may inform the second device of the positions of the first device and the second device. The third device may inform the second device that the first device is near the second device. The third device may inform the second device to take some action based on the fact that the first device is near the second device.

A third device may detect the position of a first device. A fourth device may detect the position of a second device. The third and fourth devices may inform a fifth device of both positions. The fifth device may inform the first and/or second devices of both positions. The fifth device may inform the first device that it is near to the second device. The fifth device may inform the second device that it is near to the first device. The fifth device may instruct the first device to take some action based on the fact that the first device is near the second device. The fifth device may instruct the second device to take some action based on the fact that the second device is near the first device.

Transmission and Communication

Various embodiments described herein describe the "transmission" or "communication" of a digital or electronic composition, such as a digital image, a text file, a computer program, an audio file, a video file, or any other object or entity. Transmission or communication of a digital or electronic composition may include transmission of data such that the data alone is sufficient to entirely reconstruct the composition. For example, the transmission of a digital image may include the transmission of one million bytes of data, each byte characterizing one of the pixels in the digital image, such that the digital image may be completely reconstructed from the data alone. Transmission or communication of a digital or electronic composition may include transmission of a data such that the transmitted data may be used in combination with other data to reconstruct the composition. For example, a digital image may be transmitted in a compressed format. The data that is transmitted may be used in combination with data describing a decompression algorithm in order to reconstruct the digital image. Transmission or communication of a digital or electronic composition may include transmission of a data which indicates or characterizes the composition such that the composition can be retrieved or acquired elsewhere. For example, data describing the title of an image may be communicated from a first device to a second device. The second device may have various images already stored on the second device and indexed by title. The second device may reconstruct the image that was communicated from the first device by using the title to retrieve a complete description of the second image from storage on the second device.

In various embodiments, transmission or communication of a promotion may include transmission or communication of a digital or electronic composition.

Encode

As used herein, a signal that "encodes" a digital or electronic composition may include sufficient data to reconstruct the composition from the data alone. For example, a signal that encodes an advertisement consisting of an image may include data which is sufficient, on its own, to reconstruct the image.

As used herein, a signal that "identifies" a digital or electronic composition may include data that provides information indicating where or how the composition may be retrieved. A signal that identifies a digital or electronic composition may include data that provides a name, title, or other identifier for the composition such that the composition can be retrieved from a database or other storage medium using the name, title, or other identifier.

Encryption

As used herein, the term "encryption" may refer to a process for obscuring or hiding information so that the information is not readily understandable without special knowledge. The process of encryption may transform raw information, called plaintext, into encrypted information. The encrypted information may be called ciphertext, and the algorithm for transforming the plaintext into ciphertext may be referred to as a cipher. A cipher may also be used for performing the reverse operation of converting the ciphertext back into plaintext. Examples of ciphers include substitution ciphers, transposition ciphers, and ciphers implemented using rotor machines.

In various encryption methods, ciphers may require a supplementary piece of information called a key. A key may consist, for example, of a string of bits. A key may be used in conjunction with a cipher to encrypt plaintext. A key may also be used in conjunction with a cipher to decrypt ciphertext. In a category of ciphers called symmetric key algorithms (e.g., private-key cryptography), the same key is used for both encryption and decryption. The sanctity of the encrypted information may thus depend on the key being kept secret. Examples of symmetric key algorithms are DES and AES. In a category of ciphers called asymmetric key algorithms (e.g., public-key cryptography), different keys are used for encryption and decryption. With an asymmetric key algorithm, any member of the public may use a first key (e.g., a public key) to encrypt plaintext into ciphertext. However, only the holder of a second key (e.g., the private key) will be able to decrypt the ciphertext back into plaintext. An example of an asymmetric key algorithm is the RSA algorithm.

It will be appreciated that other methods besides encryption may be used to hide or obscure information, such as encoding or steganography. Such methods may also be used in conjunction with cryptography.

Encryption may be used to:

Send a message only specific recipients can read. For example, Alice and Bob may both be in possession of the same secret key. Alice may encrypt a plaintext message with the secret key. She may transmit the resultant ciphertext to Bob. Bob may then decrypt the cyphertext using the secret key so as to view the plaintext version of the message.

Allow messages to be encrypted by many and decrypted only one (e.g., PGP). For example, Alice may possess a public and a private key. Bob may wish to send Alice a message that only Alice will be able to read. Bob may create a message in plaintext and encrypt it using Alice's public key. Bob may send the resultant ciphertext to Alice. Alice may then decrypt the ciphertext using her private key and may thereby view the plaintext message. Should Cindy intercept the ciphertext message on its way from Bob to Alice, Cindy would not be able to decrypt the message since Cindy would not have access to Alice's private key. Alice's public key, although available to Cindy, would not be sufficient to decrypt the ciphertext message in a practicable amount of time.

Authenticate the sender of a message. This use of encryption may include having the sender create a digital signature. For example, Alice would like to send a message to Bob in such a way that Bob can be confident that the message has come from her. Alice may construct a plaintext message and encrypt the plaintext into ciphertext using her private key. Alice may then send the ciphertext message to Bob. Bob may then use Alice's public key to decrypt the ciphertext back into plaintext. Since Alice's public key only works to decrypt a ciphertext message created using Alice's private key, and since presumably only Alice has access to her own private key, Bob can be confident that the message originated from Alice.

Allow for non-repudiation. If a sender has applied a digital signature to a message, or portion of a message, then the sender will not later be able to claim he did not send the message.

Guarantee a time/data sent. See hashing below.

Guarantee receipt by recipient. See hashing below.

Verify that a message has not been altered after being sent by the sender. See hashing below.

Hashing is a process whereby input data, typically of arbitrary length, is transformed into output data, typically of shorter length and/or of fixed length. A hash function is a function that performs the transformation. Often, useful hash functions will be one-way functions. That is, for a given input, the output can be computed readily. However, for a given output, the input which produced the output will be difficult to calculate. Also, useful hash functions will often have the property that two differing inputs rarely produce the same output. Hashing can be used for the following purposes:

To perform data redundancy checks. For example, a database may contain a large number of names. The names may be of arbitrary length. To check for redundant names, hash values for the names may be created. The hash values may be of smaller size than the names and may all be of the same length. Thus, it may be easier to compare the hash values of the names that it will be to compare the names themselves.

To verify that a message has not been altered. For example, Alice can send a plaintext message to Bob along with a hash value of the message. Alice can apply a digital signature to the hash value so as to assure Bob that the hash value has been sent by Alice. When Bob receives the plaintext message from Alice, Bob can compute the hash value of the message. If the hash value that Bob computes is the same as the hash value that Alice has sent to Bob, then Bob can be fairly confident that the message has not been altered enroute from Alice to Bob.

To prove possession of a message without having to reveal the message. For example, Alice can send a message to Bob. Bob can take the hash of the message and send it back to Alice. Alice may thus be assured that Bob has the message without the risk of the message being intercepted enroute from Bob to Alice.

To prove possession of a message at a certain time without having to reveal the message. For example, Alice might have a great idea and wish to prove she came up with it at a certain time without having to reveal the idea. Thus, Alice might write out the idea in the form of text and take a hash value of the text. Alice can then publish the hash of the text in a newspaper. It will then be readily apparent that Alice had possession of the idea at least on the date of the newspaper's publication.

To timestamp a document. For example, a document may be sent to a time-stamping service. The service may then determine the hash value of the document. The service may append the then current date and time to the hash value of the document and apply a digital signature to the result. The digitally signed hash value plus date and time may then be published. So long as the time-stamping service can be trusted to provide accurate dates and times (e.g., not to use old dates and times) then the published timestamp may serve as proof that the document was in existence as of the date and time provided by the time-stamping service. Further precautions may ensure that it becomes very difficult for even the time-stamping service to provide fake times and dates. For example, the time-stamping service may add a sequence number, (e.g., 1, 2, 3, etc.) to each document it timestamps. If the service wishes to provide an old date, the service would have to find an older sequence number. The older sequence number would have to fit between two sequence numbers used immediately before and immediately after the desired fake date. However, no such sequence number would be available if, e.g., no numbers had been skipped in the first place.

FIG. 1 shows a system 100 according to some embodiments. In various embodiments, the system may function within the confines of a casino. In various embodiments, the system may function within the confines of a casino and associated areas, such as retail shops, exercise rooms, restaurants, swimming areas, showrooms, conference halls, and so on. In various embodiments, the system may function beyond the confines of a casino. A casino server 105 may be in communication with one or more mobile gaming devices, such as devices, 110, 115, and 120. The casino server may be in communication with one or more marketer devices, such as marketer device 125. Marketer devices may transmit information to the casino server include information describing promotions to run (e.g., graphics and audio associated with promotions), when to run the promotions, what players should view promotions, what price will be paid for running promotions, what media to use for running promotions (e.g., symbols; e.g., background areas of a displays screen) and so on. The casino server 105 may be in communication with one or more display devices, such as display device 130. Display devices may include billboards, electronic signs, signs, television monitors, projectors, or other display devices. The casino server may instruct a display device to display graphics associated with a promotion, in various embodiments. The casino server may be in communication with one or more receivers, such as receiver 135. Receivers may include antenna, RFID tag readers, bar code readers, and so on. Receivers may detect signals emitted from mobile gaming devices. Receivers may use such signals to determine the location of the mobile gaming devices. Receivers may also receive data from mobile gaming devices. Such data may be relayed to the casino server. The casino server 105 may be in communication with one or more beacons, such as beacon 140. Beacons may form part of a positioning system which may be used by mobile gaming devices to determine their positions. For example, beacons may emit signals within a casino. A mobile gaming device, by receiving signals from several beacons, may be able to triangulate its own position within the casino. The casino server 105 may be in communication with one or more gaming devices, such as gaming device 145. Gaming devices may include slot machines, video poker machines, video blackjack machines, video keno machines, and so on. The casino server may be in communication with one or more point of sale (POS) terminals, such as POS terminal 150. POS terminals may include any terminals associated with retail establishments, or any other terminals that can handle sales transactions. In various embodiments, a POS terminal may determine an appropriate promotion to be displayed on a nearby mobile gaming device. The POS terminal may transmit the promotion to the casino server. The casino server may, in turn, transmit the promotion to the mobile gaming device.

Figure 2:
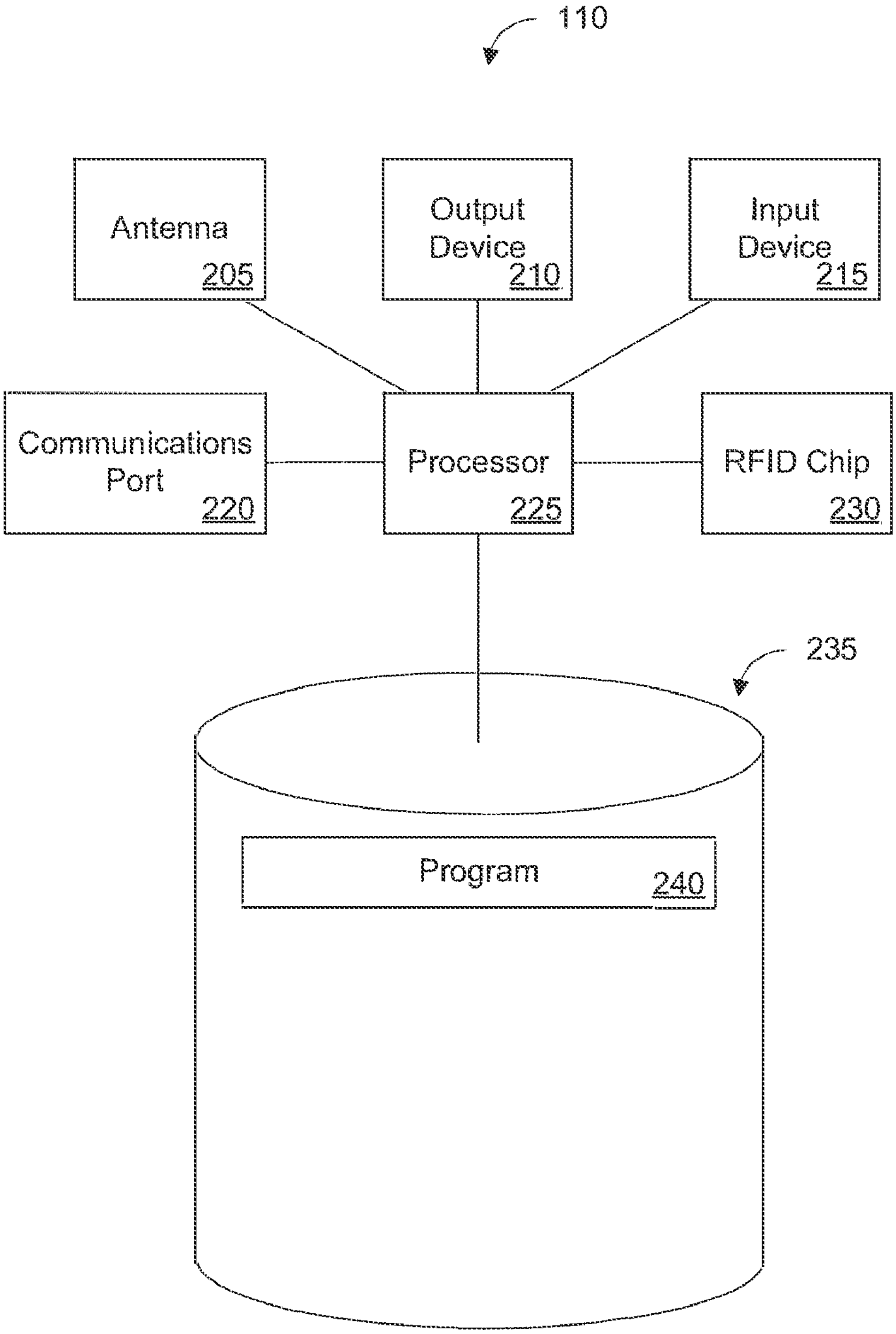
FIG. 2 shows a mobile gaming device according to some embodiments.

FIG. 2 shows a mobile gaming device 110 according to some embodiments. As used herein, the term "mobile gaming device" may refer to any device that is readily movable or portable and which allows for players to gamble on one or more of at least the following: (a) a game of chance; (b) a sporting contest; (c) a game of mixed chance and skill (e.g., blackjack); (d) a game of skill; (e) a slot machine game (e.g., a game of video slots); (f) a lottery game; (g) a game of cards (e.g., a game of poker); (h) a pull-tab game; (i) a game of bingo; (j) a natural event (e.g., the occurrence of a hurricane); (k) a political event (e.g., the winner of an election); (l) an event of popular culture (e.g., the date of a wedding between two celebrities); and so on. A mobile gaming device may be a device such as a Blackberry®, iPod®, personal digital assistant, mobile phone, laptop computer, camera, personal computer, television, electronic book (eBook), or any other suitable device. A mobile gaming device may be movable or portable in the sense that the average human would be able to transport the device without significant exertion and without the aid of heavy machinery. A mobile gaming device may be movable or portable in the sense that it is not, by design, locked, bolted, or tied down to the same location for extended periods of time (e.g., months). It is, however, contemplated that a mobile gaming device may be temporarily fixed into place (e.g., with locks or bolts) so that a human might physically interact with the device without risk that the device will be accidentally pushed, moved, toppled, etc. A mobile gaming device may include a processor for executing various programs, including programs for operating games, programs for communicating with other devices, programs for presenting advertisements, programs for presenting entertainment, and any other programs. A mobile gaming device may include memory for storing program data, for storing image data, for storing data about a player, for storing information about outcomes of games played on the mobile gaming device, for storing accounting data, and so on. A mobile gaming device may include various output devices. Such output devices may include a display screen, such as a liquid crystal display. The display screen may display images, videos, cartoons, animations, text, or any other feasible output. Output devices may include a speaker. The speaker may generate audio outputs. For example, the speaker may generate voice outputs, the sound of bells, the sound of engines, or any other sound. The speaker may generate vibrations. A mobile gaming device may include one or more input devices. The input devices may allow a player to interact with the mobile gaming device. The mobile gaming device may include buttons, keypads, roller balls, scrolling wheels, and so on. The mobile gaming device may include a touch screen which, e.g., can sense contact from a human's touch and/or from a stylus. The mobile gaming device may include a microphone for receiving audio inputs. The microphone may be used for receiving voice inputs. A mobile gaming device may include a card reader for receiving inputs from a magnetically striped card (e.g., from a credit card or player tracking card). A mobile gaming device may also include a smart card reader. A mobile gaming device may include a camera for capturing images or video. A mobile gaming device may include a biometric reader, such as a thumb-print reader or retinal scanner. A mobile gaming device may include a communications port. The communications port may include an antenna for broadcasting and/or for receiving electromagnetic signals, such as wireless signals. The communications port may include an optical communication mechanism, such as a laser or diode. The communications port may include an electric contact, which may interface to a wire, to a cable, or to the electronic contact of another device so as to create an electronic connection. The electronic connection may be used for purposes of communication and/or for the purposes of drawing power. A mobile gaming device may include a portion which is geometrically configured to fit into a docking area of another device. The other device may include a portion with a complementary geometrical configuration. When the mobile gaming device is docked into the other device, the mobile gaming device may communicate with such device and/or draw power from the device. For example, the mobile gaming device may upload game software from the other device or download information about player gambling activities to the other device. A mobile gaming device may include a power source, such as a battery or fuel cell. The mobile gaming device may further include a sensor for determining when power is low. The sensor may trigger an indicator, which may indicate an amount of power remaining. The mobile gaming device may include a radio frequency identification (RFID) tag. The tag may include a unique signature and may allow other devices to recognize the presence of the mobile gaming device. For example, a sensor embedded in a door frame may detect a signal from an RFID tag embedded within a mobile gaming device and thereby recognize the presence of the mobile gaming device. In an example of its general operation, a mobile gaming device may receive an indication of a player identifier, such as from the swipe of a player tracking card through a magnetic card reader associated with the mobile gaming device. The mobile gaming device may wirelessly transmit the player identifier to a casino server. The casino server may transmit a confirmation signal back to the mobile gaming device, confirming that the player has adequate credits on account to engage in gambling activities. The mobile gaming device may receive a game initiation signal from a player, e.g., via one the buttons on the mobile gaming device. The mobile gaming device may then execute a game program to generate a random outcome and present the random outcome to the player. For example, on its displays screen, the mobile gaming device may simulate the spinning of slot machine reels, which may be shown to stop with a particular outcome displayed centrally. The mobile gaming device may inform the casino server of the outcome of the game. The casino server may, accordingly, add or subtract credits from the player's account. It will be appreciated that there are many other ways in which a mobile gaming device may operate. A mobile gaming device may include a more general purpose device which is configured to allow gaming activity, e.g., through downloads of gaming related software to the device. A mobile gaming device may also include a special purpose device dedicated to gaming. A mobile gaming device may include a device as set forth in Nevada bill AB471.

Figure 3:
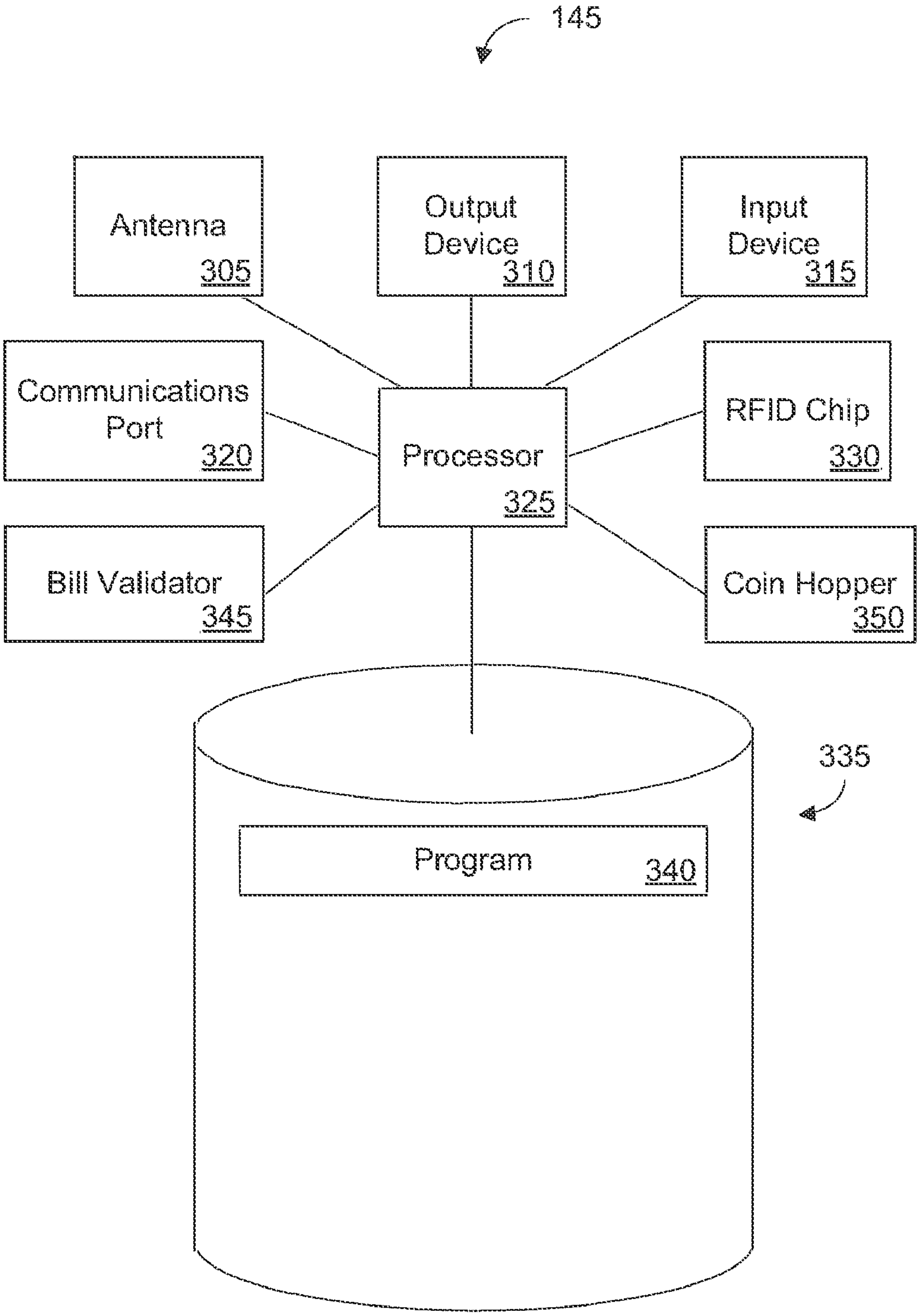
FIG. 3 shows a gaming device according to some embodiments.

FIG. 3 shows a gaming device 145 according to some embodiments. As used herein, the term "gaming device" may refer to any machine, article, or device which allows a player to participate in a game, contest, or other endeavor, and which allows a player to put money or other consideration at risk. A gaming device may include a Class II gaming device, a Class III gaming device, a video bingo machine, an instant bingo machine, a video poker machine (e.g., Action Gaming's Triple Play™ Draw Poker), a video slot machine (e.g., WMS's Jackpot Party Classic machines), a mechanical slot machine (e.g., IGT's Cleopatra® Slots), an electromechanical slot machine, a video blackjack machine, a video keno machine, and a multi-game machine. Gaming devices may include devices with non-gaming related uses which can also be used or adapted for gaming. For example, a personal computer may constitute a gaming device since the computer may run software for conducting a game and may receive, e.g., a credit card number from a player for the purposes of collecting from and paying money to a player. A gaming device may include a mobile gaming device (e.g., a mobile device as defined by Nevada bill AB 471) or any mobile device that can be used for gaming. A gaming device may include a personal digital assistant, a cell phone, a laptop computer, a Blackberry®, and so on.

Figure 4:
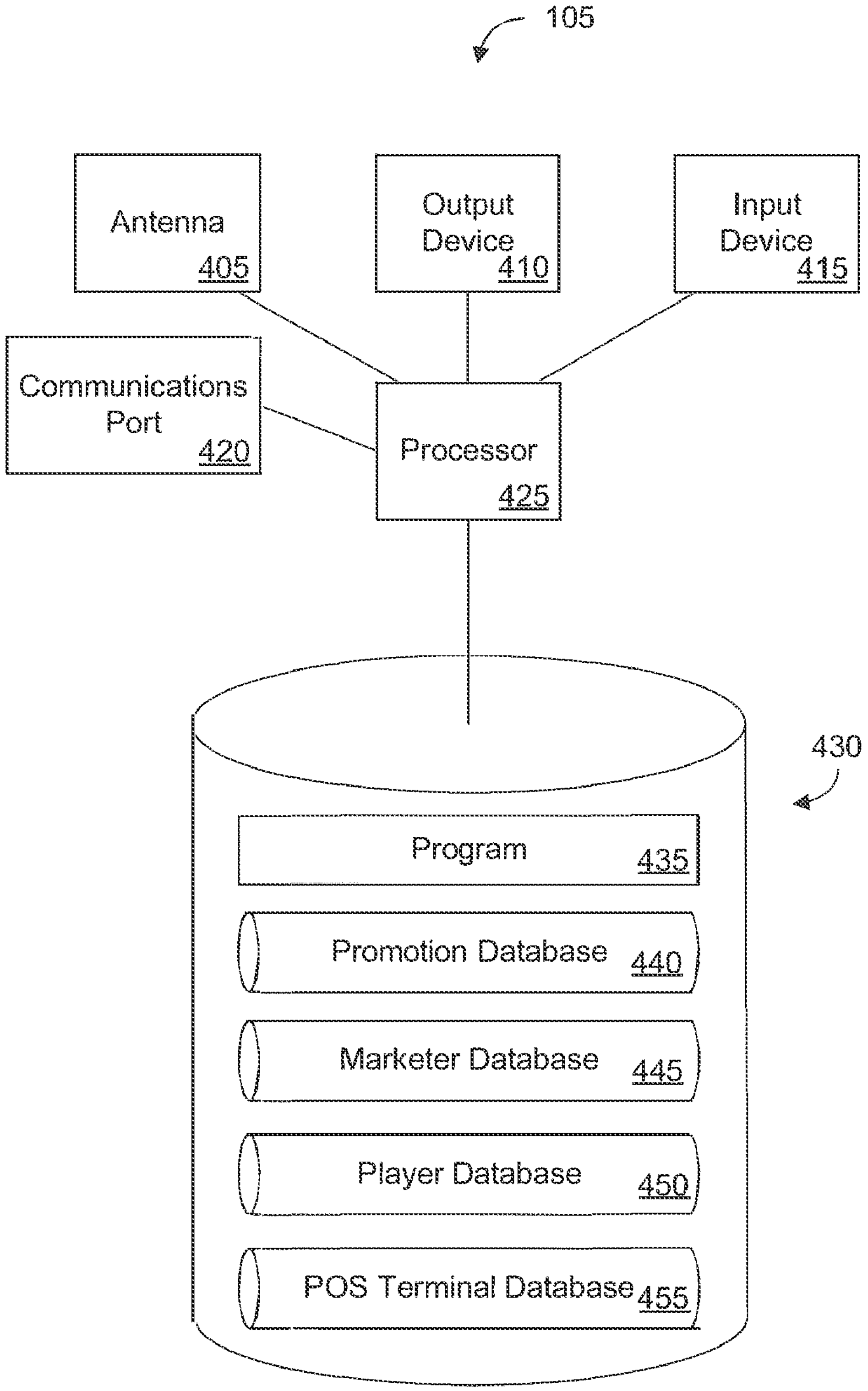
FIG. 4 shows a casino server according to some embodiments.

FIG. 4 shows a casino server 105 according to some embodiments. Antenna 405 may allow the casino server to communicate wirelessly with various devices, such as mobile gaming devices. Output device 410 may include displays, such as liquid crystal display monitors, speakers, or any other device that may communicate information. The output device may present information in a way suitable for human perception. For example, the output device may present text for a human to read. Input device 415 may include buttons, keypads, mice, roller balls, microphones, styli, touch screens, and so on. The input device may allow humans to communicate information to the casino server. Communications port 420 may include an antenna, serial port, parallel port, FireWire, Ethernet, Universal Serial Bus (USB), or any other interface for communications. Storage device 430 may include a hard disk, flash memory, random access memory (RAM), read only memory (ROM), a compact disc, a digital versatile disc, an optical disc, a magnetic storage device, a semiconductor memory, a magneto-optical storage device, and so on. Storage device 430 may store program data 435 as well as various databases, including a promotion database 440, marketer database 445, player database 450, and point of sale (POS) terminal database 455. The program data may include instructions which may direct the processor 425 to operate in accordance with various embodiments.

Promotion database 440 may store data associated with promotions. Such data may include: (a) image data (e.g., images of products being promoted); (b) video data (e.g., video advertisements); (c) audio data (e.g., jingles associated with product promotions); (d) text data (e.g., text for display in a promotion); (e) data descriptive of a promotion (e.g., a promotion may have a tag indicating what product is being promoted); (f) data descriptive of the size of a promotion (e.g., data describing the number of pixels in each dimension of an image; (g) data describing the running time of a promotion (e.g., 30 seconds); (h) data describing the place or medium where a promotion should be featured (e.g., a promotion should appear as a symbol in a simulated slot machine game); (i) data describing the number of times a promotion should be run (e.g., the promotion should be run 100 time); (j) data describing the audience to which a promotion should be presented (e.g., a promotion should be presented to women between the ages of 40 and 60); (k) data describing the times during which a promotion should be presented (e.g., a promotion should be presented between 11:00 am and 1:00 pm); (l) data describing the priority of a promotion (e.g., promotion with higher priorities may be presented before or in place of promotions with lower priorities); (m) data describing the sponsor or marketer behind a promotion (e.g., Procter & Gamble is the sponsor of a promotion); (n) data describing a price to be paid by a sponsor or marketer for a promotion's presentation (e.g., a marketer will pay two cents per viewer per presentation; e.g., a marketer will pay $100 to have a product featured in a game for an entire day); (o) data describing the number of times a promotion has already been presented; (p) data describing a number of times remaining that a promotion must be presented; (q) data describing the number of people who have viewed a promotion; (r) data describing the demographics of people who have viewed a promotion; and any other data pertinent to a promotion.

Marketer database 445 may store data associated with sponsors or marketers. Marketer database may store data including: (a) marketer names; (b) marketer advertising budgets; (c) promotions associated with marketers; (d) amounts owed the casino by the marketers; (e) preferred audiences of the marketer; (f) billing information for the marketer (e.g., a credit card identifier associated with the marketer; e.g., an address for the marketer); (g) a medium which is of primary interest to a marketer (e.g., symbols; e.g., bonus rounds); and so on.

Player database 450 may store data associated with players. Player database 450 may store data including: (a) a player's name; (b) a player's tracking card number; (c) a player's age; (d) a player's demographic; (e) a player's preferred product category; (f) a player's preferred category of promotion; (g) a player's length of stay at a casino; (h) a player's historical purchasing behavior (e.g., the player has made 3 purchases in response to promotions in the past); (i) a player's game results or outcomes (e.g., the player has won $120 today; e.g., the player has lost on his last 5 outcomes); (j) a player's friends, relatives, associates, or other group members; and so on.

Point of sale (POS) terminal database 455 may include data describing various POS terminals. In various embodiments, such terminals may be associated with the casino. For example, such POS terminals may manage transactions for various retail establishments within a casino. In various embodiments, such terminals may include terminals outside of the casino. POS terminal database 455 may include: (a) data describing the location of POS terminals; (b) data describing the retail establishments served by POS terminals; (c) data describing presentation capabilities of POS terminals (e.g., a POS terminal may include a display screen and/or speaker which may be used to present images and/or sounds associated with a promotion); and so on.

Figure 5:
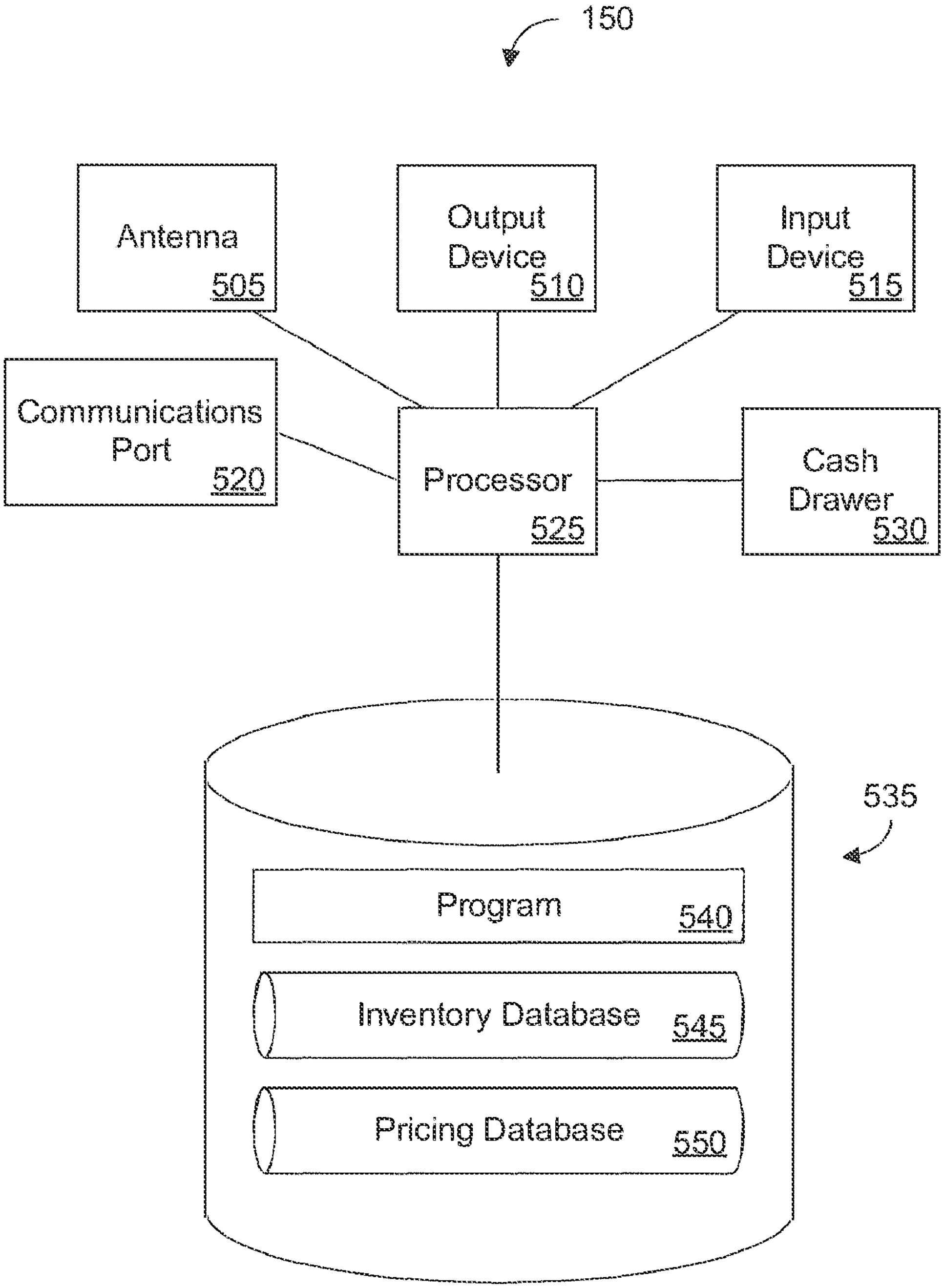
FIG. 5 shows a point of sale terminal according to some embodiments.

FIG. 5 shows a POS terminal 150 according to some embodiments. The inventory database 545 may include data describing products within the store. The inventory database may include data describing: (a) the number of a product remaining; (b) the expected shelf life of a product; (c) the expected remaining shelf life of a product; (d) the expected time of arrival of new inventory; (e) the characteristics of a product (e.g., the product color; e.g., the product size); and so on. The pricing database 550 may include data related to products' prices, including: (a) a product's price; (b) a discount available on the product (e.g., there is a 25% discount in effect for the next two days; (c) a wholesale price for the product; (d) a cost of acquiring the product (e.g., the cost to the retailer of purchasing the product from a wholesaler or manufacturer); (e) a liquidation price for a product; and so on.

Figure 6:
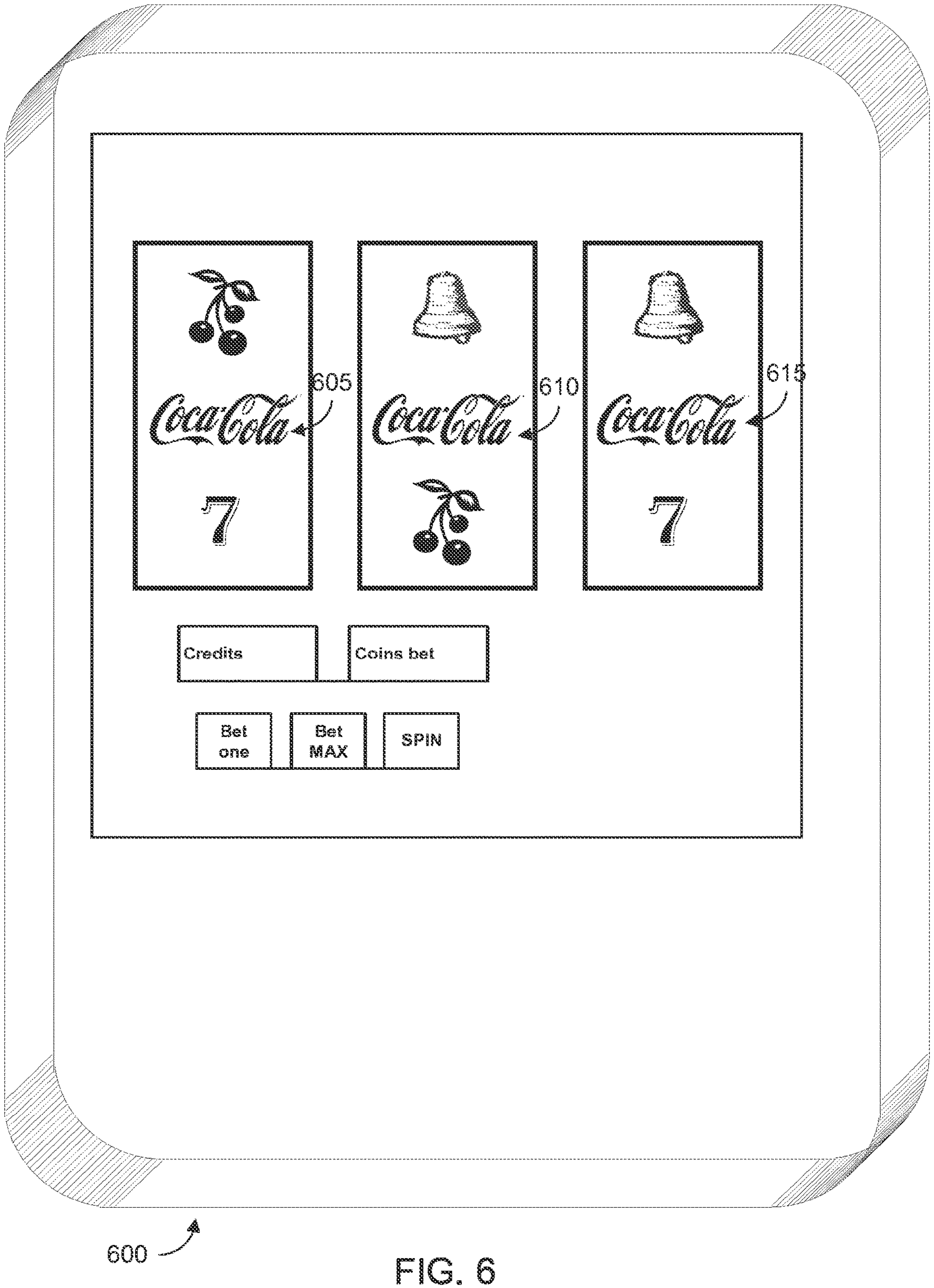
FIG. 6 shows a mobile gaming device according to some embodiments.

FIG. 6 shows a mobile gaming device 600 according to some embodiments. The mobile gaming device 500 features a slot machine game. The slot machine game includes three reels. Among the symbols depicted on the reels are three symbols representing promotions. These symbols, 605, 610, and 615, depict a corporate logo for Coca-Cola. By lining up three such symbols, a player may win a prize. The prize may be related to the product or corporation depicted by the symbols. For example, the prize may be a year's supply of Coca-Cola drinks.

1. Types of promotion. In various embodiments, promotions may be presented using mobile gaming devices. A promotion may include: (a) an advertisement (e.g., for a product or service); (b) an announcement (e.g., an announcement as to when a new show is starting at a casino; e.g., an announcement that a certain car was rated number one in the country); (c) a warning (e.g., a warning about the approach of inclement weather); (d) a statement of information (e.g., candidate Jones has just won the election); (e) an offer of a benefit (e.g., an offer of a discount; e.g., an offer of a coupon; e.g., an offer of a gift certificate); (f) an offer of a benefit in exchange for some action on the part of the recipient of the offer (e.g., an offer of a gift certificate in exchange for the recipient of the offer answering survey questions); (g) a request (e.g., a request to answer survey questions); (h) a benefit given unconditionally (e.g., cash given unconditionally; e.g., a gift certificate given unconditionally); (i) an entry into a sweepstakes or other chance event (e.g., an entry into a drawing for a particular merchant's car); and so on. Promotions may be presented in various forms and in various situations. Promotions may be presented in audio form, video form, or text form, for example. Promotions may be presented at various points in time relative to other events. For example, promotions may be presented in between games played on a mobile device.

1.1. Audio. Promotions may be presented in audio form. A promotion may include a spoken voice. For example, an announcer or narrator may describe the features of a product that is being advertised. A promotion may include a song. A promotion may include a musical tune. A promotion may include a soundtrack, such as the revving of a motorcycle engine. A promotion may include a jingle, such as a jingle commonly associated with a product.

1.2. Text. A promotion may include text. Text may include information, slogans, or subtitles, for example.

1.3. Still image. A promotion may include still images. The image may take up all or part of a display screen, such as the display screen on the mobile gaming device. The image may represent an actual photograph, an image created by an artist, or an image created by a computer, for example.

1.4. Video. A promotion may include video. The video may be comprised of a sequence of still images, for example. The video may occupy an entire display screen or part of a display screen, for example. A video may be the product of a camera, or maybe an animation, for example.

1.5. Vibration. A promotion may include vibration, or any induced motion of the mobile gaming device. For example, the mobile gaming device may vibrate in conjunction with a promotion for a car race, where the vibrations may help the player of the mobile gaming device to imagine the cars rumbling by.

1.6. Flashing lights. A promotion may include flashing or blinking lights. For example, light emitting diodes (LEDs) on the mobile gaming device may flash in order to convey excitement associated with a promotion.

1.7. Smells. A promotion may include smells. For example, a mobile gaming device may release small quantities of chemicals to create aromas in conjunction with a food advertisement.

1.8. Trigger nearby signs or slot machines to display advertisements. In some embodiments, a promotion may include a signal to other displays or devices, the signal instructing such displays or devices to participate in the promotion. For example, as part of a promotion, a mobile gaming device may send a signal to a nearby slot machine (e.g., to a slot machine located within hearing range; e.g., to a slot machine located within a line of sight of the mobile gaming device) instructing the slot machine to perform one or more actions related to the promotion. In some embodiments, a mobile gaming device may instruct a slot machine to generate an audio output. For example, the mobile gaming device may instruct that the slot machine blasts the sounds of bells ringing through a speaker that is part of the slot machine. In some embodiments, a mobile gaming device may be a slot machine to generate a video output. For example, the mobile gaming device may instruct a slot machine to show a particular video or animated clip. In some embodiments, a mobile gaming device may instruct a slot machine to show an image. For example, a mobile gaming device may instruct a slot machine to show an image of a product being promoted by the mobile gaming device.

1.8.1. Distances. In various embodiments, a slot machine, another gaming device, a display screen, or any other device may participate in presenting a promotion so as to enhance the effect of a promotion. For example, a promotion may be more effective if five slot machines surrounding a player all show the same sounds and images than if only the display screen on the mobile gaming device is involved. A promotion may be particularly effective, in some embodiments, if participating slot machines or other devices can influence the player of the mobile gaming device. Thus, particularly effective devices may include devices that are visible or audible to the player. In various embodiments, a device is instructed to participate in a promotion if the device is within a certain range of a mobile gaming device. For example, a mobile gaming device may instruct a slot machine to participate in a promotion if the slot machine is within ten feet of the mobile gaming device. In various embodiments, a mobile gaming device may instruct a device to participate in a promotion if: (a) the device is within a predetermined distance of the mobile gaming device; (b) if the device is within a direct line of sight of the mobile gaming device (e.g., if there are no other devices or fixtures between the mobile gaming device and the device); (c) the device is in the same room as the mobile gaming device; (d) the device is on the same floor of a building as is the mobile gaming device; (e) the device is facing at least somewhat towards the mobile gaming device (e.g., the mobile gaming device may only request that a slot machine participate in a promotion if the screen of the slot machine is facing in the direction of the mobile gaming device); (f) the mobile gaming device can detect a signal from the device (e.g., a gaming device may emit a short range signal that is detectable by the mobile gaming device only if the mobile gaming device is within proximity to the gaming device; (g) the device can detect a signal from the mobile gaming device; (h) the mobile gaming device receives a signal from the device at a certain minimum threshold power (e.g., if the signal power is strong in the detected signal, the device may be assumed to be near to the mobile gaming device); (i) the device receives a signal from the mobile gaming device at a certain minimum threshold power level; (j) if the device has video display capability; (k) if the device has audio output capability; (l) if the device has speakers of a certain minimum output capability; and so on. In various embodiments, a mobile gaming device may determine whether or not another device is available for participation in a promotion. Another device may be available if such device: (a) is currently not participating in a different promotion (e.g., if the device is not displaying graphics as part of a promotion to a different player); (b) is currently not being used for gaming purposes (e.g., a slot machine may be available if it is not currently being played by another player); (c) is currently not being used for other purposes (e.g., a plasma display monitor may be available if it is not currently not broadcasting programming to passing people); (d) is functioning (e.g., if the device is not experiencing mechanical or electrical problems); (e) is not scheduled or intended for immediate use; (f) is not restricted from participating in promotions of the type in which the device would be asked to participate in (e.g., a device made by a first manufacturer may be restricted from promoting products from a competing manufacturer); and so on. In various embodiments, a device that may be instructed to participate in a promotion may include a slot machine, video poker machine, another gaming device, a display monitor (e.g., a plasma display screen; e.g., a cathode ray tube (CRT) monitor), a billboard, a projection display, a speaker, a public address system output, a light bulb, a light fixture, and so on.

In various embodiments, a device may be proximate to several players with mobile gaming devices. For example, a slot machine may be within 10 feet of each of three players of mobile gaming devices. Such players may coincidentally happen to be in the same area, for example. The three mobile gaming devices (those belonging to each of the three players) may cooperate to schedule the same promotion at the same time so that the device which is proximate to all three players may show a promotion which influences all the three players at once. For example, each of the three mobile gaming devices may schedule an advertisement for cruise vacations to occur at the same time. As the mobile gaming devices broadcast audio to the three players, the slot machine which is near to all three players may show a video of a cruise ship sailing through blue waters and stopping at tropical islands.

In various embodiments, a plurality of mobile gaming devices may coordinate to schedule the same or similar promotions at the same time. A device which can influence the players of the mobile gaming devices may be commanded or requested to participate in the promotion. The device may be a slot machine, TV monitor, billboard, or any other device. The device may, accordingly, broadcast sounds images, or other information in support of the promotion. The device may be selected or chosen because it is within a certain distance of all of the mobile gaming device players, because it is within line-of-site of all of the mobile gaming device players, because it is within hearing range of all the mobile gaming device players, and/or for any other reason. In various embodiments, a device (e.g., a slot machine) may be selected to participate in a promotion that is being presented to a plurality of players even though the device may be unable to influence one of the plurality of players. For example, a slot machine may be chosen to participate in a promotion being presented to several players even if one of the players cannot see the screen of the slot machine.

In various embodiments, a device may have the potential to participate in two or more promotions at a given time. For example, a first player of a mobile gaming device and a second player of a mobile gaming device may each be in proximity to the device. Various criteria may be used to determine whether the device will participate in a promotion presented to the first player or the second player. The device may participate in the promotion presented to the first player if: (a) the first player is in closer proximity to the device than is the second player; (b) the first player has a better view of the device than does the second player (e.g., a display screen of the device is facing towards the first player but away from the second player); (c) the first player is deemed more likely to be influenced by the promotion than is the second player; (d) the first player is a better customer of the casino than is the second player (e.g., the first player has bet more money at the casino in the past than has the second player); (e) the second player is a better customer of the casino than is the first player; (f) the first player is deemed more likely to pay attention to the device participating in the promotion; (g) the first player has shown more interest in the product scheduled to be promoted to the first player than has the second player shown in the product scheduled to be promoted to the second player; (h) the second player is in proximity to another device which might participate in the promotion scheduled to be presented to the second player; and/or if other criteria are satisfied. It will be appreciated that similar criteria may be used to choose which promotion a device (e.g., a slot machine) will participate in given that three or more players of mobile devices are in the vicinity. In some embodiments, a device (e.g., a slot machine) may participate in a promotion if such promotion will be presented to the majority (or the plurality) of the players of mobile gaming devices which are in the vicinity of the device.

1.8.2. Sending the signals. The determination of whether or not it would be appropriate for a device (e.g., a slot machine) to participate in a promotion of a mobile gaming device may be determined in various ways. In some embodiments, the mobile gaming device may detect the presence of the device (e.g., the slot machine). The mobile gaming device may detect the presence of the device by detecting a signal emitted from the device. The signal may be caused by radio frequency identification (RFID) tag associated with the device. The signal may be an infrared signal or any other signal. In some embodiments, the device (e.g., the slot machine) may detect the presence of the mobile gaming device. The device may detect a signal from the mobile gaming device, such as a signature of an RFID tag associated with the mobile gaming device, such as an infrared signal from the mobile gaming device, or any other signal. In various embodiments, the device (e.g., the slot machine) may detect the presence of the mobile gaming device using optical means. For example, the device may include a camera and may employ image processing algorithms to recognize when a player in the vicinity of the gaming device is carrying a mobile gaming device. In various embodiments, the mobile gaming device may contain a positioning system, such as a global positioning system (GPS). The mobile gaming device may determine based on its position whether it is currently proximate to a device (e.g., a slot machine). For example, the mobile gaming device may access an internally stored map describing the positions of one or more devices. In various embodiments, the mobile gaming device and/or the device (e.g., the slot machine) may relay any received signals to a central server. For example, the device (e.g., the slot machine) may relay signals from the mobile gamine device to the central server. The central server may recognize that the signals were generated by the mobile gaming device. Therefore, the central server may recognize that the mobile gaming device is likely in proximity to the device (e.g., the slot machine). Similarly, the mobile gaming device may relay signals from the device (e.g., the slot machine) to the central server. The central server may recognize such signals as originating from the device (e.g., the slot machine) and may thereby recognize that the mobile device is in proximity to the device (e.g., the slot machine). In various embodiments, one or more sensors may detect the presence of the mobile gaming device via signals emitted or transmitted from the mobile gaming device. The sensors may not be associated with a device (e.g., with a slot machine). The sensors may be in communication with the central server. Thus, using signals detected from sensors, and possibly using triangulation or other location algorithms, the central server may detect the presence of the mobile gaming device.

In various embodiments, once the central server recognizes that a mobile gaming device is in proximity to a device (e.g., a slot machine), the central server may arrange for the device to participate in a promotion to be presented by the mobile gaming device. For example, the central server may instruct both the mobile gaming device and the device (e.g., the slot machine) to present a promotion at the same time. For example, the mobile gaming device may present an audio and a video portion of a promotion while the nearby device (e.g., the slot machine) may present a video sequence as part of the promotion. In various embodiments, when the central server recognizes that a mobile gaming device and a device (e.g., a slot machine) are in proximity, the central server may determine whether it is appropriate that the device (e.g., the slot machine) participate in a promotion to be presented by the mobile gaming device. For example, the central server may determine whether sound to be broadcast by the device would be audible to the player of the mobile gaming device given the ambient noise levels in the casino. As another example, the central server may determine whether or not the device is currently occupied and therefore whether the device should be used at all in presenting the promotion.

In various embodiments, a device (e.g., a slot machine) may be the sole presenter of a promotion. The mobile gaming device may not be involved in presenting a promotion to a player. However, the mobile gaming device may signal the device (e.g., the slot machine) to make the presentation. For example, a player with a mobile gaming device may walk by a slot machine.

The mobile gaming device may transmit a signal to the slot machine to present a promotion. Accordingly, the slot machine may present video, audio, or other information associated with the promotion. In the meantime, the mobile gaming device may continue to allow the player to play a game without the mobile gaming device becoming involved in the promotion. In various embodiments, two or more devices may be involved in presenting a promotion to a player. The mobile device may not be involved in the presentation. However, the mobile device may signal to the devices to present material in accordance with the promotion.

1.9. Message about where to go to get something. For example, the mobile device knows where you are and can tell you if you're near the jewelry store and what you can get there. In various embodiments, a promotion may include a message indicating where a product or service may be bought, used, or experienced. For example, a mobile gaming device may present a text message to a player indicating that there is a jewelry store to the right of the player. For example, a mobile gaming device may present an audio message to a player indicating that there is a show playing around the corner. In various embodiments, when a player with a mobile gaming device walks near a retail store or other locality of interest, a promotion may be triggered. The promotion may relate to that locality.

2. Mediums. Places where promotions may be placed. Images or videos associated with promotions may be presented in various places. Images and videos associated with promotions may be presented on a display screen of a mobile gaming device. Images and videos may be presented on the display screen in different places, and under different circumstances. For example, an image may be presented in the foreground or background, during a game or between games. Other outputs associated with promotions may also be presented in various ways.

2.1. Symbols. In various embodiments, images or video associated with a promotion may be put on a symbol. In various embodiments, images or video associated with a promotion may make up the whole of a symbol. For example, an image of a soda drink may make up a symbol. Symbols with such images or videos may function in a game just as any other symbol. For example, in a slot machine game, the alignment of three like symbols may allow a player to win a prize. Images or video associated with a promotion may be put on cards; game tokens (e.g., a game token that moves around a board in a game of Monopoly® may take the form of an image of a luxury car brand); game characters (e.g., a bidder in an auction game may take the form of an animated Clorox™ box); tokens of value (e.g., when a player of a game opens a treasure chest, three sparkling Rolex® watches may be revealed); and so on.

2.2. The background, e.g., background graphics. Images or video associated with a promotion may appear as background graphics on the display screen of a mobile gaming device. For example, the parts of the screen that are not occupied by graphics related to a game may be occupied by images or video related to a promotion.

2.3. Signs. Images or video associated with a promotion may appear on signs or other landmarks in a virtual world associated with a game. For example, a game played on a mobile gaming device may feature a virtual world with racing cars. The cars may pass billboards in the virtual world. The billboards may include images promoting products or services.

2.4. Chip faces, such as the faces on gaming chips. In various embodiments, images or video associated with a promotion may appear on gaming chips. Such gaming chips may be actual, physical gaming chips, such as those used in table games at casinos. Such gaming chips may also include chips used in a game played on a computing device, such as on a mobile gaming device. For example, a player may engage in a game of poker using his mobile gaming device. Gaming chips which are graphically depicted in the game may include images associated with a promotion, such as images of products or services.

2.5. Cards. In various embodiments, images or video associated with a promotion may appear on cards. Such gaming cards may be actual, physical cards, such as those used in table games of poker or blackjack. Such cards may also include cards used in a game played on a computing device, such as on a mobile gaming device. For example, a player may engage in a game of poker using his mobile gaming device. Cards which are graphically depicted in the game may include images associated with a promotion, such as images of products or services.

2.6. Audio. In various embodiments, the audio outputs of a mobile gaming device may be used as part of a promotion. The audio outputs may broadcast songs, jingles, voice, tunes, narrative, sounds of products (e.g., the sounds of a horse stamping in an advertisement for horse-back riding).

2.7. Promotions appear in a bonus round. The whole theme of the bonus round could be based on the promotions. In various embodiments images or video associated with a promotion may appear in the bonus round of a game. The bonus round may include any game sequence that is not part of the normal flow of the game, and in which a player has the opportunity to win unusual amounts of credits. For example, in a Wheel of Fortune® game, a bonus round may include a spin of a simulated wheel in which a player is given the opportunity to win large prizes posted on the wheel. Promotional images may be displayed in the background of a bonus round scene. Promotional images may also function as characters or game tokens in a bonus round. For example, a cereal box may be the main character in bonus round, with the cereal box moving around a game board and landing on squares which win money for the player. In various embodiments the theme of a bonus round may center around a particular promotion. For example, a bonus round set in a chocolate factory may be designed to promote the Mars company. In various embodiments, audio associated with a promotion may be broadcast during a bonus round. For example, the hissing sound of a soft drink bottle opening may be broadcast whenever the player has won more money in the bonus round.

2.8. Pop-up ads. In various embodiments, pop-up boxes or windows may be used to display videos or images associated with promotions. Pop-up boxes or windows may include separate windows that appear on a display (e.g., on the display screen of the mobile gaming device) without prompting from a player. Images or video associated with the promotion may be displayed within the pop-up boxes or windows.

2.9. Housing. In various embodiments, promotions may be placed on a casing, housing, or other hardware components of a mobile gaming device. For example, the housing of a mobile gaming device may be decorated in the coloring of a Coca-Cola can. In various embodiments, promotions may be put on accessories of a mobile gaming device, such as on a leather case of an iPod, such as on the holster of a Blackberry™, such as on a dock of an iPod, or on any other accessory.

2.10. Constraints. Symbols have inherent constraints. For example, they consist of graphics. Symbols might be only certain pixel dimensions, such as 20×20 pixels. In various embodiments, a particular medium or slot for the display of images or video may have inherent constraints. Accordingly, a marketer who wishes to use such a medium or slot for the presentation of a promotion may have to devise images or video which satisfy the constraints presented by the medium. For example, an image associated with a promotion may take the place of (or may serve as) a symbol in a reeled slot game. As the symbol may occupy only a small portion of the area of the display screen, the image or video associated with the promotion may likewise be constrained to occupy only that small area of the display screen. The symbol may have a stated constraint in terms of size. For example, the symbol may occupy an area of 0.36 square inches, or an area of 20 by 20 pixels. Any image or video that is to serve as a symbol must thus be confined to the stated area limits. In various embodiments an image or video associated with a promotion is constrained to occupy a certain area. The area may be measured in terms of square inches, dimensions, square millimeters, or in terms of any other units. In various embodiments, the central server or other party selling promotional opportunities to marketers may publish or otherwise inform potential marketers of the constraints placed on various types of promotions. For example, the central server may list available places to display images or video and may list corresponding size constraints. For example, the following may be a partial list of mediums and constraints: (a) symbol, 20×20 pixels; (b) billboard in bonus round, 30×50 pixels; (c) background left side of screen, 70×20 pixels; (d) background top of screen, 20×80 pixels; and so on. In various embodiments, the cost to a marketer of displaying an image or video may be based, at least in part, on the display area of the image or video. For example, the cost to the advertiser may be proportional to the display area of the image or video. In various embodiments, the cost to the marketer for a promotion may depend on other factors as well, such as the duration for which a promotion is presented, the point in a game at which a promotion is presented, the number of times a promotion is presented (e.g., the cost per presentation may go down if there are multiple presentations), and so on.

In various embodiments, there may be time constraints placed on a promotion. For example, a promotion must last no more than 3 seconds. Thus, any video associated with the promotion may be constrained to lasting no more than 3 seconds. Also, any audio associated with the promotion may be constrained to lasting no more than 3 seconds. In various embodiments, the cost to a marketer for having a promotion presented may depend, at least in part, on the duration of the promotion.

In various embodiments, an image may be constrained to be at least a certain size, or to occupy at least a certain area. For example, an image may be constrained to be at least 20 by 20 pixels. In this way, the casino server can ensure that empty space is kept to a minimum on a display screen. Similarly a video may be constrained to take up at least a certain amount of area. In various embodiments, an image or video may be constrained to be exactly a particular size. In various embodiments, an audio clip associated with a promotion may be constrained to be exactly a particular duration. In this way, the casino server may ensure that there is no undesired quiet time.

3. Player indicates his preferences in advertising. In various embodiments, a player may influence the promotions that are presented to him. When the player has an input into which promotions are presented to him, the player may be more likely to respond positively to the promotions.

3.1. In a game with advertising on various game elements, the player selects the category, genre, brand, or other rubric from which ads are selected. This information on player ad preferences may itself be valuable since the player has just answered a survey question. For example, when the game is about to start, the opening screen can display three options (e.g., three large boxes with descriptive text and graphics) to be picked using the touch screen. In various embodiments, a player may indicate a type, category, or other limitation on a promotion. Promotions may then be presented to the player based on the indicated type or category. Such a type or category may represent a preference of the player. For example, the player may prefer to see vacation related commercials, car related commercials, or food related commercials. In indicating a category of promotion, player may indicate: (a) a type of product; (b) a type of service; (c) a price range for a product or service; (d) a brand; (e) a manufacturer; (f) a format of the promotion (e.g., the promotion is a movie trailer; e.g., the promotion should last only five seconds; e.g., the promotion may be an infomercial; e.g., the promotion should be video; e.g., the promotion should be audio); (g) a particular product (e.g., the player may wish to see a promotion about a Mercedes of a particular model and year); (h) a particular cause (e.g., the player may wish to see promotions for products or charities that benefit a particular cause, such as the environment); (i) a particular attribute of a product (e.g., the player may indicate that he/she wishes to see only red clothes); (j) a retailer (e.g., the player may indicate the he/she wishes to see products from Macy's); (k) whether a promotion will promote a particular product or service or just be informational; and so on.

In various embodiments, a player may indicate a category of promotion in various ways. When first receiving a mobile gaming device, a player may indicate a category of promotion. The player may indicate a category by informing a casino representative. The casino representative may then program a setting onto the mobile gaming device such that the mobile gaming device only presents promotions of the category indicated by the player. The player may also make an indication using the mobile gaming device. For example, the player may select a category of promotion from a menu, from a series of check boxes, or from a text box. Using a text box, a player may key in a category of promotion, or any description of a promotion the player so desires. For example, the player may key in, "show me things to do in Kansas during August." In various embodiments, the player may go through two or more rounds of specifying a promotion. For example, the player may first specify a broad category such as automobiles. The player may then specify a narrower category, such as "cars" or "trucks."

In various embodiments, a player may indicate category of promotion via the Internet. For example, prior to a casino visit, a player may visit the Internet. The player may navigate a series of menus, checkboxes, text boxes, or other input mediums in order to specify a category of promotion. The indicated category of promotions may be stored by the casino server. The casino server may then ensure that, while playing, the player is only presented with promotions falling under the given category. In various embodiments, the mobile gaming device may filter out promotions so that only those of a category indicated by a player are presented to the player.

In various embodiments, promotions of a category related to that selected by the player may be presented to the player.

In various embodiments, a player may indicate a new category of promotions sometime during the course of a playing session. For example, a player may indicate that she is no longer interested in seeing promotions related to jewelry, and instead would like to see promotions related to purses. A mobile gaming device may include a menu or icon that is accessible during a playing session. The player may access such a menu or icon to indicate a change to the category of promotion.

In various embodiments, a player may first see one or more promotions. The player may then indicate whether he would like to see additional, similar promotions, or whether he would like to see promotions of a different type. Based on his response, new promotions may be presented to the player. The player may once again be asked whether he would like to see similar promotions or promotions of a different type. In this way, the casino server may iteratively arrive at a category of promotion that is of interest to the player.

In various embodiments, a player may indicate a category of promotion. The promotions presented to the player may or may not then all conform to the indicated category. For example, the casino server may not necessarily have an inventory of promotions to present to the player of the category indicated by the player. In various embodiments, the casino server may determine promotions that are deemed to most closely fall within the category indicated by a player, even if such promotions do not directly fall within the category indicated by the player. For example, the player may indicate a desire to see promotions related to vacationing in the Bahamas. The casino may not have any promotions directly on topic. However, the casino may have promotions related to vacationing in the Virgin Islands. Thus, the casino may present such promotions to the player. The casino may employ algorithms for associating related concepts. The algorithms may learn from the preferences indicated by players. For example, if a given player indicates that he wishes to be presented with promotions related to concept A and concept B, then the algorithms may associate concept A with concept B. In the future, if another player indicates he wished to be presented with promotions related to concept A, the casino server may present to the player promotions related to concept B. As will be appreciated, many algorithms could be used for deriving associations between concepts. Any such algorithm might be used for choosing promotions to present to a player, in various embodiments.

In various embodiments, a player may indicate a category of promotion. By indicating such a category, the player may reveal himself to be a potential customer of a merchant who would create a promotion falling within the indicated category. For example, a player may indicate that he wishes to view promotions for luxury cars. By providing such an indication, the player may reveal himself to be a potential buyer of luxury cars. The knowledge that the player is a potential buyer of luxury cars may be of value to a dealer or manufacturer of luxury cars. Thus, in various embodiments, if a merchant deals in a category of goods or services and a player has indicated a preference to view promotions related to that category, then the casino may provide the merchant with the player's contact information. The merchant may then be able to send further promotions to the player. For example, the merchant may be able to send promotions to the home of the player. In some embodiments, a merchant may pay the casino to provide the contact information of a player who has indicated interest in seeing promotions in a category in which the merchant's products fall.

In some embodiments, a merchant not be given direct contact information for a player who has shown interest in promotions falling within the merchant's area of business. Rather, the casino may forward promotions from the merchant to the player, even after the player has left the confines of the casino. For example, the merchant may send a promotional email to the casino, and the casino may forward the promotional email to the player. In this way, the player's contact information may be kept from the merchant, and the player's privacy may be maintained.

In various embodiments, a player may indicate a particular category of promotion. The casino may then find marketers who might be expected to run promotions falling under that category. For example, a player may indicate he wishes to see promotions related to car insurance. The casino may then find various car insurance companies. The casino may invite the marketers to promote to the player. In various embodiments, the casino may provide a general description of the player to a marketer. For example, the casino may provide the marketer with an age, income level, and/or other demographic characteristic of the player. The information about the player that is provided to the marketer may aid the marketer in deciding whether or not to promote to the player. Based on information about the player, marketers may determine whether or not they wish to promote to the player. For example, a marketer may decide based on the age of a player whether or not the player would be likely to purchase the marketer's product. The marketer may make a decision as to whether or not to promote to a player simply based on the fact that the player has shown interest in a particular category of promotion. In various embodiments, the casino may quote a price to the marketer to promote to a particular player. The marketer may accept or reject the offer to promote. In various embodiments, the casino may quote a range of prices, each price corresponding to different limitations on the promotions. For example, a first price may be quoted for placing a symbol on a reel, a second price may be quoted for filling the whole screen with a 30-second video, and so on.

In various embodiments, the casino may solicit bids from marketers to present promotions to a particular player. The marketers that place the highest bids for a given medium or slot may be given the opportunity to present a promotion to the player. In various embodiments, more than one marketer who bids may be given the opportunity to promote to a player. The marketers with the higher bids may be given preferential slots. For example, the marketer with the highest bid may be given the largest screen area in which to promote. For example, the marketer with the highest bid may be given the longest time slot in which to have a promotion presented.

In various embodiments, the casino server may contain an inventory of promotions that are available to present to a player. The casino server may store rules (e.g., rules provided by the sponsor of the promotion) which describe the criteria for presenting the promotions. A promotion may be stored as one or more computer files, including image files, audio files, video files, and so on. In various embodiments, the casino may request promotions from marketers. For example, upon receiving an indication of a category of promotion from a player, the casino may solicit promotions from marketers who might wish to present promotions falling within the indicated category.

3.2. Sponsors or marketers may inform a player as to what sponsored outcomes he can get. "Pick Pepsi and get free spins". In various embodiments, a player may be informed of a benefit he can receive in exchange for agreeing to view a promotion. In various embodiments, a player may be informed of a benefit he can receive in exchange for agreeing to view a category of promotion. In various embodiments, a marketer may be willing to compensate a player for viewing or listening to a promotion. The compensation may take a number of forms. Compensation may include: (a) money; (b) gaming chips or gaming credits; (c) increased odds of winning; (d) higher payouts (e.g., a jackpot may be increased); (e) reduced costs of wagering (e.g., a player may be given the opportunity to make a wager for $5 that would normally have been $10); (f) a free game (e.g., a free spin at a slot machine; e.g., a free game of video poker); (g) a free opportunity to enter the bonus round; (h) hints given in a game (e.g., in a game of video poker, a player may receive hints); (i) a free or discounted music download; (j) a free or discounted software download; (k) a free or discounted ring-tone download; (l) a download of a video, cartoon, movie trailer, animation, television pilot episode, news clip, or other sequence; (l) a cashless gaming ticket; (m) a ticket to a show; (n) a ticket to a movie; (o) complementary (comp) points; (p) a voucher; (q) a gift certificate; (r) a voucher for a free meal; (s) a free or discounted stay in a hotel room; and any other benefits. A marketer may provide any benefit either directly or indirectly to a player. In various embodiments, a marketer may directly provide cash to a player in exchange for the player agreeing to view a promotion of the marketer. In various embodiments, a marketer may provide compensation to the casino, and the casino may in turn provide a benefit to the player, such as increased odds of winning. The compensation provided to the casino may be equal to the expected cost to the casino of providing the benefit to the player.

In various embodiments, two or more marketers may contribute to a benefit which will be provided to a player. For example, each of two automobile manufacturers may contribute a portion of the benefit that will be provided to a player for viewing automobile related promotions.

In various embodiments, a player may receive a fixed benefit from the casino for agreeing to be presented with promotions. The casino may then sell to marketers opportunities to present promotions to the player. The casino may attempt to sell such opportunities for as much money as it can get. The casino may profit from the difference in value between the benefit provided to the player and the amounts received from the marketers.

In various embodiments, a player may be presented with a table or other listing of benefits he might receive, together with criteria for receiving the benefits. For example, a table may include a first column listing different categories of promotion. A second column in the table may list benefits the player would receive in exchange for being presented with such promotions. For example, a line in the table might list, "Watch Pepsi Ads" as the category of promotions, and "Get 10 Free Spins" as the benefit.

4. Triggers for promotions. Promotions may be presented at various times and under various circumstances. In one situation, a player may be engaged in playing a game on the mobile gaming device. A promotion may be presented to the player on the screen while the game is occurring (e.g., the promotion is presented as a symbol; e.g., the promotion is presented on screen space to the side of the screen space displaying the game), on the screen between games, on the screen while a resolution of a game is pending, as an audio broadcast during the game, and so on. In one situation, a player may not be engaged in playing a game and promotions may be presented to on the mobile gaming device. Promotions may be presented continuously, periodically, sporadically, when the mobile gaming device comes to a particular location, and so on.

4.1. Broadcasting of advertising content to others physically near a player. If a player is near others, the volume on your device can go up so that others hear the advertising on your device. "You have just won a FREE COKE." In various embodiments, a promotion may be triggered by the presence of a nearby human being. The nearby human being may be someone other than the player of the mobile gaming device which is presenting the promotion. For example, if the mobile gaming device detects the presence of a human being other than the player, the mobile gaming device may broadcast a promotion. In various embodiments, the mobile gaming device may broadcast a promotion in response to the presence of any human being, including the player of the mobile gaming device. A mobile gaming device may detect the presence of another human being in various ways. The mobile gaming device may include a microphone. The microphone may pick up ambient audio signals. The mobile gaming device may analyze ambient audio signals for tell-tell human sounds, such as the sound of a voice, the sound of breathing, the sound of steps, and so on. For example, the mobile gaming device may use special software which is tuned to recognize voice signals. The mobile gaming device may recognize the presence of humans by other means. For example, the mobile gaming device may include a heat or infrared sensor. The mobile gaming device may use such a sensor to pick up the heat signatures of humans. In various embodiments, the mobile gaming device may include a camera. The camera may periodically snap pictures of its surroundings. The mobile gaming device may include image processing software for analyzing the pictures. The image processing software may have the capability to recognize images associated with humans. In various embodiments, the mobile gaming device may recognize the presence of humans via devices associated with the humans. For example, the mobile gaming device may recognize the signal from a nearby cell phone, e.g., by receiving the signal at an antenna associated with the mobile gaming device. Presumably, the cell phone is being carried by a human. Thus, by recognizing the presence of a cell phone, the mobile gaming device may be indirectly recognizing the presence of a human. In various embodiments, the mobile gaming device may recognize the presence of another mobile gaming device. Presumably, the other mobile gaming device is being held or carried by another human. Thus, by recognizing another mobile gaming device, the first mobile gaming device may indirectly recognize the presence of another human.

In various embodiments, upon recognizing the presence of another human, the mobile gaming device may present a promotion. The promotion may thereby have the chance of being perceived not only by the player of the mobile gaming device, but also by the other human who is in proximity to the mobile gaming device. The effect of the promotion may thereby be amplified.

In various embodiments, upon recognizing the presence of another human, the mobile gaming device may increase the volume with which a promotion is presented. The increased volume may make it more likely that the other human will perceive the promotion.

In various embodiments, upon recognizing the presence of another human, the mobile gaming device may increase the brightness of a display. Increasing the brightness of its display may make it more likely that the other human may perceive the graphics on the display. Such graphics may include graphics associated with promotions.

4.2. Broadcasting with more light in a brightly-lit environment (e.g., in the pool). In various embodiments, a mobile gaming device may increase the brightness of its display based on the strength of ambient light. For example, the mobile gaming device may increase the brightness of its display as the brightness of ambient light increases. For example, the mobile gaming device may make its display bright if the mobile gaming device is outside in the sunlight, while the mobile gaming device may make its display dimmer when the mobile gaming device is within a casino. In various embodiments, a mobile gaming device may include a light sensor. The sensor may detect ambient light conditions. Based on readings from the sensor, the mobile gaming device may either increase or decrease the brightness of its display. In various embodiments, increasing the brightness of a display may make it easier for a player of the mobile gaming device to perceive promotions and/or other graphics while in the presence of bright light. In various embodiments, decreasing the brightness of its display may allow the mobile gaming device to increase battery life. Thus, in various embodiments, the mobile gaming device may decrease the brightness of its display in areas where a bright display is not needed, such as indoors.

4.3. Somebody near you wins. For example, someone on slot machine nearby wins. Your mobile device says, "You can have that too, if you'll just . . . " In various embodiments, a promotion may be presented to a first player of a mobile gaming device based on the game results of a nearby player. The nearby player may be a player of a slot machine, video poker machine, mobile gaming device, or any other gaming device. The nearby player may have just: (a) won a game; (b) won a large payout (e.g., a payout of 40 or more coins); (c) won a jackpot; (d) entered into a bonus round; (e) had a near miss; (f) lost a game; (g) run out of money; (h) cashed out; or may have been involved in any other game event or outcome. Based on the game event, result, or outcome of the nearby player, promotion may be presented to the first player.

In various embodiments, if the nearby player has had a favorable outcome, then a promotion may be presented to the first player. The promotion may offer the first player the opportunity to experience a similar outcome as has the nearby player, if the first player will only engage in some activity. The activity may include viewing ad advertisement or presentation, test driving an automobile, answering a survey question, testing, or sampling a product or service, providing some information about him or herself (e.g., demographic information), providing contact information about himself, providing contact information about another person (e.g., a friend; e.g., a family member), and so on. Thus, for example, the first player may have the opportunity to experience an outcome similar to the outcome that the nearby player has just experienced if the first player would only view a ten-minute promotion on his mobile gaming device and answer two survey questions related to the promotion.

In various embodiments, a mobile gaming device may determine the results or outcomes of a nearby player in various ways. The mobile gaming device may transmit to the casino server its location. The casino server may determine a gaming device that is proximate to the location of the mobile gaming device. The casino server may determine an outcome that has just occurred at the gaming device. The casino server may transmit to the mobile gaming device an indication of the outcome.

If the first player accepts the offer of his mobile gaming device, then the mobile gaming device may allow the first player to engage in the activity. For example, the mobile gaming device may present a ten-minute promotion and then present survey questions about the promotion for the first player to answer. Once the first player has successfully engaged in the activity, the mobile gaming device may provide the first player with the same outcome as had been achieved by the nearby player. For example, if the nearby player had won a payout of 50 credits, the first player may be given 50 credits. For example, if the nearby player had won entry into a bonus round, then the first player may be given entry into the bonus round.

4.4. You win an outcome. In various embodiments, a promotion may be presented to a player if the player has achieved a winning outcome. A promotion may be presented to a player if the player has: (a) received a positive payout; (b) received a payout that is greater than the amount wagered; (c) received a payout that exceeds a certain threshold (e.g., 10 coins); (d) achieved entry into a bonus round; and so on. The time when a player achieves a winning outcome may be an opportune time to present a promotion to the player, because the player may be in a good mood. The player may thereby be more receptive to the message of the promotion. The player may also transfer the positive feelings associated with the winning outcome to the subject of the promotion. For example, if a particular brand of potato chips is presented to a player right after the player has achieved a winning outcome, then the player may associate those potato chips with the positive feeling of winnings.

In various embodiments, a marketer may pay more to have its promotion presented if the promotion is presented following a winning outcome. This may occur because the player may be more likely to have positive feelings associated with the promotion following a winning outcome than following a non-winning outcome. Thus, in various embodiments, a marketer may pay a first amount to have a presentation promoted at a first time not following a winning outcome and may pay a second amount which is greater than the first amount to have the promotion presented at a second time following a winning outcome.

4.5. You win a big payout. In various embodiments, a promotion may be presented to a player if the player has won a large payout. A large payout may be defined as a payout exceeding X credits, where X may be e.g., 50, 100, 1000, or any threshold number of credits. In various embodiments, a large payout may be defined as a payout whose quantity is greater than X multiple of the amount wagered, where the multiple may be e.g., 50, 100, 1000, or any threshold multiple.

4.6. You win a certain amount. In various embodiments, a promotion may be presented to a player if the player has won a certain aggregate amount. The aggregate amount may represent total payouts over a certain period less amounts wagered. The aggregate amount may represent total payouts regardless of amounts wagered. For example, a promotion may be presented to a player if the player has won 100 coins net of amounts wagered over the past hour.

4.7. You have a near miss. In various embodiments, a promotion may be presented to a player if the player has had a near miss. For example, if the player has achieved four cards to a royal flush, if a person has achieved four out of five required jackpot symbols, or if a person has landed one spot away on a spinning wheel from the jackpot space, the player may be presented with a promotion. The promotion may read, "Oh, so close—well, at least you can rent a car for only $20 per day at Jim's car rental." In some embodiments, a promotion may offer the player the chance to achieve the missed outcome if the player will perform some activity. For example, if the player agrees to spend a day in a cabin in a retirement community, the player may receive a payout as if he had achieved the nearly missed outcome.

4.8. Location. In various embodiments, a promotion may be triggered by the location of a player. In various embodiments, a promotion may be presented to a player if the player is in a first location, but not if the player is in a second location. In various embodiments, a first promotion may be presented to a player if the player is in a first location, and a second promotion may be presented to the player if the player is in a second location. In various embodiments, a promotion may be presented to a player if the mobile gaming device of the player is in a particular location. The player may be assumed to be in the same location as the player.

4.8.1. Walk by a store. In various embodiments, a promotion may be triggered as a mobile gaming device comes into the proximity of a store. The promotion may show images or video depicting products in the store. The promotion may present text descriptions of store items. The promotion may describe available discounts within the store. In various embodiments, a promotion may be triggered as a mobile gaming device comes into proximity of any retailer, such as a store, a restaurant, a roadside stand, a gas station, a car repair shop, and so on. Proximity may be defined, in various embodiments, as being within 100 feet, as being on the same block, as being within sight, as being within walking distance, as being within a mile, as being directly in front of, or as any other appropriate distance range.

In various embodiments, a promotion may include an offer of a benefit if the player of the mobile gaming device walks into the retailer, buys a product at the retailer, tests a product at the retailer, or otherwise interacts with the retailer. The benefit offered may include: (a) money; (b) gaming chips or gaming credits; (c) increased odds of winning; (d) higher payouts (e.g., a jackpot may be increased); (e) reduced costs of wagering (e.g., a player may be given the opportunity to make a wager for $5 that would normally have been $10); (f) a free game (e.g., a free spin at a slot machine; e.g., a free game of video poker); (g) a free opportunity to enter the bonus round; (h) hints given in a game (e.g., in a game of video poker, a player may receive hints); and so on. Thus, for example, a player of a mobile gaming device may receive an offer of 10 free spins in a game of slots if he walks into a retailer.

In various embodiments, a representative of a retailer, such as a store owner or manager, may be informed as a mobile gaming device approaches the store. The representative of the retailer may have the opportunity to decide on an offer for the player in substantially real time. For example, the representative may determine whether any items in the store are currently overstocked. The representative may accordingly offer the player a special discount on such items. The representative may also be given information about the player. For example, the representative may receive information about the player's age, race, marital status, gender, and so on. The representative may also receive information about recent outcomes achieved by the player. The representative may use such information in tailoring a promotion for the player. For example, if the player is a man, the store owner may offer him a discount on a tie. If the player is a woman, the store owner may offer her a discount on a blouse. The mobile gaming device may transmit information about the player to nearby stores, thus allowing store representatives to learn information about the player. In various embodiments, the mobile gaming device may transmit to a nearby retailer a player identifier, such as a player name. The retailer may transmit to the casino server the player identifier. The retailer may thereupon receive from the casino server further information about the player. Information received about a player may include: (a) the last outcome achieved by the player; (b) the last large outcome received by the player; (c) total winnings for the player in the past X period of time (e.g., total winnings for the player in the last 10 minutes, the last day, the last hour, the last two days, etc.); (d) net or gross winnings for a player in the last X period of time; and so on.

In various embodiments, a retailer may include a retail computer or retail server. The computer or server may execute algorithms for determining a promotion for a passing player. The promotion may be determined based on conditions within the store. The promotion may also be determined based on information received about the player. For example, the promotion may be determined based on whether the player has recently won a significant amount of money while gambling. For example, if a player has won a large amount of money recently, the store may promote to the player a relatively expensive product. The idea behind the promotion may be that the player is in a good spending mood in light of his recent good fortune. The retail server may receive signals from the mobile gaming device and/or from the casino server, with such signals describing information about the player. The retail server may use such information to automatically determine a promotion for the player. The promotion may be automatically transmitted to the mobile gaming device of the player. The promotion may then appear on the screen of the mobile gaming device. The promotion may be broadcast using speakers of the mobile gaming device. In various embodiments, the retail server may determine a promotion for the player. The retail server may display an indication of the promotion to a representative of the retailer. The representative may then communicate the promotion to the player. For example, the representative may walk out in front of the retail establishment, greet the player, and present the promotion to the player (e.g., offer the player a discount on a product within the store).

In various embodiments, a retailer and/or the casino server may track purchase data from players. For example, the retailer and/or the casino server may maintain a database. The database may include information about a player coupled with data describing an amount a player spent (e.g., on products or services), a type of product purchased by the player (e.g., clothes; e.g., shoes; e.g., jewelry); whether or not a player tested a product or service, whether or not a player walked into a store, whether or not a player indicated interest in an item, and so on. Data about a player may include data describing player demographics, including age, race, gender, income, marital status, and so on. Data about the player may also include data about gambling results of the player, possibly including recent outcomes achieved, recent amounts won, amounts won in the last X period of time, total payouts less total amounts wagered in the last X period of time, amounts wagered, amounts wagered per game, and so on. The database may thus include demographic information about a player, information about the gambling results of the player, and purchasing results of the player. The database may contain such information about a large number of players. For example, the database may contain one record for each player. Each record may include information about a player's demographics, purchasing information, and information about gambling results achieved.

In various embodiments, an algorithm may be used to derive correlations between two types of information such as purchasing decisions and gaming outcomes achieved prior to the purchasing decision. For example, algorithms may be used to determine correlations between amounts won while gaming during a given period of time, and amounts spent at a retailer following the period of time. The output of the algorithm might indicate, for example, that the more a player wins during the hour prior to visiting a retail store, the more the player is likely to spend at the retail store.

In general, given historical information about players' gaming outcomes and purchasing decisions, and given information about a particular player's recent gaming performance (or gaming performance over more than just the recent past), algorithms may be used to predict the particular player's likely purchasing decisions. Such algorithms may be used to predict a player's likely response to promotions. For example, a representative of a retail establishment may receive information about an approaching player. The information may indicate that the player has won a jackpot in the last hour. The retailer may key that information into a predictive algorithm. The algorithm may tell the retailer that the player is more likely than a typical person to want to purchase an expensive item. The algorithm may further recommend an item to offer to the player. The algorithm may have access to a database or other listing of store items. The algorithm may have access to a database or other listing of prices, costs, or other measures of value of store items. Based on predictions of the player's spending and based on the descriptions of items and their values, the algorithm may determine which item to offer to the player. The algorithm may output a test description of such item to the store representative. The representative may approach the player and inform the player that this item is available and even that the player may receive a special discount on the item. In some embodiments, the algorithm may transmit a promotion directly to the mobile gaming device of the approaching player. For example, the algorithm may transmit a promotion indicating that a fine coat is available only to that player for $700.

In various embodiments, data recorded about a player may include data describing promotions presented to the player. Data recorded and/or stored may further include data describing a player's reaction to the promotions presented to him. Algorithms may be used to correlate information about the players' recent gaming outcomes to players' reactions to promotions. For example, an algorithm may find that a player is more likely to respond to humor-based promotions when the player has just won money, and that a player is more likely to respond to value-based promotions when the player has just lost money. Thus, algorithms may be used to predict which promotion or type of promotion would be most effective given a player's recent gaming outcomes.

In various embodiments, information about a player's gaming outcomes may be received at a retail computer from the player's mobile gaming device. In various embodiments, information about a player's gaming outcomes may be received at a retail computer from the casino server. In various embodiments, algorithms used to predict which products a player might like to purchase may be executed by the casino server. In various embodiments, algorithms used to predict which products a player might like to purchase may be executed by a retail server. Such algorithms may, in various embodiments, be executed by the player's mobile gaming device. In various embodiments, one or more human representatives may work in conjunction with predictive algorithms in order to determine a particular promotion for a player. For example, a predictive algorithm may determine a price range of a product that should be offered to a player. Based on that price range, a representative may determine a particular product to offer to the player, given the representative's knowledge of different product pricing. As another example, a predictive algorithm may determine a type of promotion (e.g., video; e.g., audio; e.g., still image; e.g., 30-second; e.g., 5-second; e.g., offer of a discount; etc.). A human, such as a representative of a retailer, may determine the exact promotion to send to the player. In various embodiments, a human may make a live presentation of a promotion. For example, a representative of a retailer may call a player on his mobile gaming device. The mobile gaming device may, for example, function as a cellular telephone. The human may make a sales pitch to the player. A human may also present a promotion via text. In various embodiments, the determination and presentation of a promotion may be done automatically, without any human intervention. For example, a player with a mobile gaming device may approach a retail store while walking in the hallways of a mall. The mobile gaming device may detect its own coordinates using an internal positioning system. The mobile gaming device may transmit its coordinates to a casino server. The casino server, based on the coordinates, may determine that the mobile gaming device is near to a particular retail store. The casino server may have previously received information about gaming outcomes of the player via signal from the mobile gaming device. The casino server may thereupon use information about the player's recent gaming outcomes, together with information about the products at the retail store, to derive a promotion for the player. The casino server may transmit such a promotion to the player. In some embodiments, the casino server may transmit the promotion to the retail store. The retail store may then relay the promotion to the mobile gaming device of the player. As will be appreciated, information about a player, such as information about outcomes achieved by the player, may be received at various locations, such as at a retail store or at a casino server. Similarly, as will be appreciated, a promotion can be determined at several places, including at a casino server, mobile gaming device, or at a retail store. The promotion may be transmitted to the mobile gaming device of the player from several places, such as from the retail store or from the casino server. In various embodiments, the mobile gaming device may store information internally about a retail store. For example, the mobile gaming device may store possible promotions that might be available from a retail store. The mobile gaming device, based on gaming results of the player of the mobile gaming device, may determine which of the internally stored promotions to actually present to a player. The mobile gaming device may employ predictive algorithms in making the presentation.

In various embodiments, information about purchasing habits of players may be shared among retail establishments. For example, a large database may be assembled from data gathered at several retail establishments. The database may include records for various players, some of whom have made purchases at a first retail establishment, and some of whom have made purchases at a second retail establishment. The larger sample size of such a database, as opposed to a database with customers of just a single retail establishment, may make it possible to come up with better predictive algorithms for a player's purchasing decisions.

Perspectives for the Determination of Offers for Retail Establishments

In various embodiments, a casino server may determine one or more outcomes for a player of a mobile gaming device. The casino server may transmit such outcomes to the mobile gaming device. The mobile gaming device may present such outcomes to the player.

The casino server may track the location of the mobile gaming device. The casino server may determine when the mobile gaming device is proximate to a retail establishment.

The casino server may receive data from the retail establishment. For example, the POS terminal of the retail establishment may indicate inventory levels of various products and communicate the inventory levels to the casino server. The retail establishment may communicate other data, such as data about product values, product wholesale costs, expected delivery dates of new products, historical demand for products, customer traffic at the retail shop, and any other pertinent data.

The casino server may use the data received from the retailer to determine promotions on behalf of the retail establishment. For example, if the retailer has an excess of a certain product, the casino server may determine a promotion which offers the product at a discount.

Based on an outcome generated for a player of a mobile gaming device, the casino server may determine a promotion for the player of the mobile gaming device. The casino server may determine a first promotion if a first outcome is generated, and a second promotion if a second outcome is generated. For example, if the outcome generated is a winning outcome, the casino server may determine a promotion which advertises an expensive product. If the outcome generated is a losing outcome, the casino server may determine a promotion that offers a discount to the player.

The casino server may determine a promotion to present to a player of a mobile gaming device based on the fact that a player is within a certain distance of the retail establishment, or based on the fact that the player is within a certain geographic region, area, or locality. For example, the casino server may transmit a promotion to the mobile gaming device of a player for presentation only if the player is within 50 feet of the retail establishment that is being promoted.

Thus, a casino server may determine an outcome which has been generated for a player of a mobile gaming device. The casino server may receive data from a retail establishment. The casino server may determine a distance between the mobile gaming device and the retail establishment. Based on these factors, the casino server may determine a promotion which promotes the retail establishment to the player. The casinos server may cause the promotion to be presented to the player via the mobile gaming device of the player. For example, the casino server may transmit data to the mobile gaming device, where such data describes or encodes the promotion. The mobile gaming device may then present the promotion to the player.

In various embodiments, a retail establishment may receive an indication that a mobile gaming device is in proximity to the retail establishment. The indication may be received via direct communication from the mobile gaming device, or via communication from the casino server (e.g., the casino server may determine that the mobile gaming device is in proximity to the retail establishment and may communicate such information to the retail establishment). The retail establishment may determine a promotion for the player of the mobile gaming device. The retail establishment may determine such promotion based on various data, such as inventory levels, future delivery dates for new products, wholesale costs, ability to return unsold items, and so on. The retail establishment may also receive an indication of an outcome achieved by the player of the mobile gaming device. The retail establishment may receive any information about a player's results, including an indication of recent winnings, an indication of a gross amount won, an indication of a net amount won, and so on. The retail establishment may determine a promotion for presentation to the player based on an outcome received by the player. The retail establishment may determine a promotion for presentation to the player based on any historical results of the player. The retail establishment may determine a promotion based both on the historical results of the player and based on the fact that the player is proximate to the retailer. For example, if the player is proximate to the retail establishment and the player has just won a large payout, then the retail establishment may determine a promotion which highlights a luxury product of the retail establishment. The retail establishment may transmit the promotion to the mobile gaming device. The retail establishment may transmit the promotion to the casino server. The casino server may then transmit the promotion to the mobile gaming device.

In various embodiments, the mobile gaming device may receive information from a retail establishment. The information may include information about inventory levels, current customer traffic levels, historical customer traffic levels, or any other pertinent information. The mobile gaming device may determine whether or not it is near to the retail establishment. If the mobile gaming device is near to the retail establishment, then the mobile gaming device may determine a promotion to present to the player, the promotion serving to promote products or services of the retail establishment. The promotion may be determined based on information provided by the retail establishment. The information provided by the retail establishment may be transmitted directly from the retail establishment to the mobile gaming device. The information provided by the retail establishment may be transmitted first to the casino server and then to the mobile gaming device. In various embodiments, the retail establishment may determine whether or not the mobile gaming device is near to the retail establishment. The retail establishment may then inform the mobile gaming device, either directly or through the casino server. In various embodiments, the casino server may determine whether the mobile gaming device is near to the retail establishment. The casino server may inform the mobile gaming device if it is near the retail establishment.

4.8.1.1. Use the mobile gaming device as an automatic, custom tailored coupon. An individualized coupon. In various embodiments, a mobile gaming device may store coupons, gift certificates, or other tokens which confer value or discounts. Coupons may be transmitted to a mobile gaming device at various times. In various embodiments, a player may win coupons, gift certificates, or other benefits while playing a game. For example, if a player lines up three "Macy's" symbols on a slot machine, the player may win a $100 gift certificate to Macy's. In various embodiments, the coupons, gift certificates, or other tokens of value may be stored in electronic form on a mobile gaming device. In order to use the coupons, gift certificates, etc., at a retail establishment, the player may bring his mobile gaming device to a retail establishment. The mobile gaming device may communicate information about the coupon, gift certificate, or other token to a computer of the retail establishment. The communication may occur in various ways. For example, the mobile gaming device may communicate to the computer of the retail establishment a sequence of bits that uniquely identifies a particular certificate, coupon, etc. In various embodiments, a mobile gaming device may display on its display screen a bar code which identifies a coupon, gift certificate or other token of value. The bar code displayed on the display screen of the mobile gaming device may be scanned by the retail establishment, e.g., using a typical bar code scanner. In this way, the player may carry around coupons, or gift certificates on his mobile gaming device. The player may redeem them at retail establishments from his mobile gaming device.

4.8.2. Proximity to another mobile device. In various embodiments, proximity to a second mobile gaming device may trigger the presentation of a promotion in a first mobile gaming device. When the second mobile gaming device is near, the promotion at the first mobile gaming device may be seen or heard by the player of the second mobile gaming device.

4.9. Time. In various embodiments, time may serve as a trigger for a promotion. For example, a promotion may be triggered at a certain time of day, at a certain date, or at a certain year. As another example, a time since an event may serve as a trigger. For example, a promotion may be triggered 5 minutes after the last promotion has been presented.

4.9.1. A certain amount of time has elapsed since the last promotion. In various embodiments, a promotion may be triggered once a certain amount of time has elapsed from a prior promotion. The prior promotion may be any promotion. For example, a current promotion may be triggered to be presented once one minute has elapsed since the last promotion on a mobile gaming device was presented. The prior promotion may be a promotion of the same type or category. For example, a promotion for toothpaste might be triggered when it has been 30 minutes since the last promotion for toothpaste. The same promotion may be triggered, however, when only 1 minute has lapsed since the last unrelated promotion. By creating a greater time spacing between promotions of the same type, player boredom may be alleviated. In various embodiments, when a certain minimum time gap is kept between the presentation of any promotion, player annoyance may be alleviated. In various embodiments, when a certain maximum time gap is allowed between the presentation of promotions, player exposure to promotions may be increased and thus revenues for the casino and for the marketers may be increased.

4.9.2. It is a certain time of day. For example, advertise food during lunchtime. In various embodiments, the presentation of a promotion may be triggered by the time of day. Products which are typically purchased during a particular time of day may be promoted during that time of day. A promotion for breakfast may be triggered early in the day, such as at 7:00 am. A promotion for lunch may be triggered at 11:45 am. A promotion for an evening show may be triggered at 6:00 pm. A promotion may be triggered based on a merchant's business hours. For example, a promotion for a merchant's products may be triggered for presentation at the time the merchant opens for business.

4.9.3. Ambient conditions (e.g., temperature). In various embodiments, a promotion may be triggered based on ambient conditions. A promotion may be triggered based on the air temperature. If the air temperature is over 90 degrees Fahrenheit, for example, a promotion for a soft drink may be triggered. A mobile gaming device may contain a temperature sensor. Readings from the temperature sensor may be used to trigger promotions. In various embodiments, a mobile gaming device may contain other sensors for sensing or determining ambient conditions. A mobile gaming device may contain humidity sensors for detecting ambient humidity or rain conditions. A mobile gaming device may contain light sensors for detecting ambient brightness, cloudiness, and so on. A mobile gaming device may contain microphones for detecting ambient noise conditions. In various embodiments, promotions of a certain form may be presented depending on ambient conditions. For example, if ambient noise levels are high, then a primarily visually-based promotion may be triggered for presentation. If ambient noise levels are low, then a promotion which includes audio components may be presented. Thus, in various embodiments, a mobile gaming device, a casino server, or another entity may determine ambient noise levels in the vicinity of a mobile gaming device. Based on the ambient noise levels, a promotion may be selected for presentation. The selection process may consider whether the promotion has audio components to it. In various embodiments, ambient brightness levels may be used to determine what types of promotions will be presented. If ambient brightness levels are high, promotions with a greater audio component may be presented. For example, in a bright, sunlit environment, a mobile gaming device may be more likely to present promotions with a higher audio component. In a dim environment, a mobile gaming device may be more likely to present promotions with more of a visual component.

In various embodiments, rules, customs, regulations, and other conditions may determine which promotions may be used. For example, a mobile gaming device may be inside a theater where a show is in progress. In such an environment, a promotion with an audio component may be distracting to surrounding patrons of the theater. Thus, the mobile gaming device may determine promotions that have little or no audio components. It should be understood that selecting a promotion with no audio component may include selecting a promotion with an audio component and suppressing the audio component. For example, if the mobile gaming device determines that it should present a promotion with no audio component, the mobile gaming device may select a promotion that previously had an audio component and mute the audio component. Further, it should be understood that selecting a promotion that does not have a visual component may include selecting a promotion with a visual component and suppressing the visual component.

In various embodiments, the mobile gaming device may receive signals from a casino server describing rules, customs, regulations, and so on in the vicinity of the mobile gaming device. Based on such signals, the mobile gaming device may determine whether a particular promotion is suitable for presentation. In various embodiments, based on the location of a mobile gaming device, a casino server may instruct the mobile gaming device directly as to whether or not certain promotions may be presented. For example, the casino server may transmit to a mobile gaming device instructions explicitly forbidding the presentation of a particular promotion, or explicitly instructing the mobile gaming device to present a particular promotion.

In various embodiments, a casino server may send to a mobile gaming device promotions that are appropriate for presentation based on the conditions in the vicinity of the mobile gaming device. For example, the casino server may receive position information from the mobile gaming device. The casino server may then determine what an appropriate promotion is based on the location of the mobile gaming device. For example, if the mobile gaming device is located in a conference room during the time of a conference, the casino server may determine that an audio promotion is inappropriate. Accordingly, the casino server may only transmit to the mobile gaming device a promotion with a video component.

In various embodiments, if ambient conditions include rain, then a promotion for umbrellas may be shown. If ambient conditions include rain, then promotions for indoor activities (e.g., for shows) may be triggered. In various embodiments promotions may be suppressed based on ambient conditions. For example, if ambient conditions include rain, then promotions for outdoor tours may be suppressed.

In various embodiments, ambient conditions surrounding a mobile gaming device may be detected by the mobile gaming device. In various embodiments, ambient conditions may be detected by some other entity, such as by a weather service. The mobile gaming device may receive signals about ambient conditions from other entities, such as from a weather service or such as from a casino server. The mobile gaming device may then use such information in determining which promotions to present. In various embodiments, a mobile gaming device may simply be instructed as to what promotions to present. The determination as to which promotions to present may be made by some other entity, such as by a casino server. The casino server may, in turn, use information about ambient conditions in determining which promotions should be presented.

4.9.4. Based on the player's own stated interests. In various embodiments, the interests of a player of a mobile gaming device may serve to trigger which promotions are presented at the mobile gaming device. For example, if a player is interested in cars, promotions relating to cars may be presented. For example, if a player is interested in sports, promotions for sports tickets, fantasy sports leagues, or sports memorabilia may be presented. In various embodiments, a player's interests may be deduced in various ways. A player may be asked about his interests. A player may be asked about his interests when he first checks out a mobile gaming device, when he first starts playing games at a mobile gaming device, during the course of a gaming session, or at any other time. A player's interests may be deduced from the actions of a player. For example, suppose a promotion is shown to the player. If the player responds to the promotion, e.g., by touching the display screen in an area labeled "touch here to get more information about this product," then the player may be assumed to be interested in products related to the product which is the subject of the promotion. Player interests may also be deduced through other means. For example, the player may make purchases at a retailer. The retailer may forward the name of the player to the casino server, possibly including with the player's name an indication of the products the player has purchased. The casino server may then assume that the player has interest in products similar to those purchased at the retailer.

4.9.5. You are in between games. In various embodiments, the trigger for a promotion may be that a game on a mobile gaming device has finished. For example, a particular promotion may be best suited only to occur between games. For example, the promotion may require the full area of the display screen of the mobile gaming device. For example, the promotion may require the full attention of the player. In various embodiments, a promotion may be presented if a game has finished, and new game has not been started within a predetermined period of time. For example, if a player has completed a game and not started the next game in five seconds, then a mobile gaming device may trigger the presentation of a new promotion. A player may be more receptive to a promotion if the player is not currently involved in a game.

4.10. Poor connectivity. For example, if you can't be connected to the server at the moment, then show an advertisement. In various embodiments, a promotion may be presented if there is any disruption in communication or connectivity between the mobile gaming device and the casino server. In various embodiments, the mobile gaming device may be required to maintain communication with the casino server while allowing a player to engage in gaming activities. For example, the casino server may be required to continuously verify that the mobile gaming device is on the premises of the casino in order for a player of the mobile gaming device to be allowed to engage in gaming activities. Thus, if there is a disruption in the communication, the mobile gaming device may be prevented from allowing the player to game. A disruption in communication might then present a good opportunity for the presentation of promotions, since the player may not be able to play games.

4.11. Amount of battery life left. In various embodiments, the amount of battery life left in a mobile gaming device might influence whether or not a promotion is presented. In various embodiments, the amount of battery life left in a mobile gaming device may influence which promotion is presented. In various embodiments the amount of battery life left in a mobile gaming device might influence the manner in which a promotion is presented. Presenting a promotion may require battery power. For example, audio associated with a promotion may require that a speaker of a mobile gaming device be powered in order to generate the audio output. As another example, presenting a promotion between games may require power for illuminating the display screen. As another example, in various embodiments, presenting a promotion may first require downloading the promotion from a casino server. For instance, the casino server may transmit to the mobile gaming device image and audio files to be played as part of the promotion. The downloading process may require wireless communication, which may use up battery power of the mobile gaming device. In situations where remaining battery power is low, the conservation of such battery power might allow a player to play extra games at the mobile gaming device before the battery runs out. This may result in extra revenue for the casino, as well as reduced frustration for the player. Therefore, in various embodiments, when the power left in a battery goes below a certain threshold, a promotion may be suppressed. In various embodiments, when the power left in a battery goes below a certain threshold, a promotion which requires less battery power to present may be favored for presentation over a promotion that requires more battery power to present. Given two promotions of equal priority, the mobile gaming device may be less likely to present the one which requires more power the less battery life there is remaining. In various embodiments, based on the battery power remaining in the battery of a mobile gaming device, the mobile gaming device may vary the manner in which a promotion is presented. In various embodiments, if the battery power is low, images associated with the promotion may be dimmed. In various embodiments, if battery power is low, audio associated with the promotion may be played at a low volume or may not be played at all. In various embodiments, if battery power is low, a promotion may be truncated, or otherwise compressed. For example, a five-second version of a video advertisement may be played rather than the full-length 15-second version. In various embodiments, battery life remaining, battery power remaining, energy remaining, and other metrics may all be used in determining whether or not a promotion should be presented, which of two or more promotions should be presented, and the manner in which a promotion will be presented. In various embodiments, if battery life is below a certain threshold, promotions that are stored locally on the mobile gaming device may be favored over promotions that must be newly downloaded from the casino server or from some other device. In this fashion, the power costs associated with downloading a promotion may be saved.

4.12. Amount of money left. In various embodiments, the amount of money a player has remaining may influence what promotion is presented. The amount of money a player has remaining may also influence whether or not a promotion is presented. In various embodiments, if a player has a relatively small amount of money left, promotions may be presented to the player which offer the player monetary benefits or discounted gambling opportunities. For example, if a player has less than $5 left, a promotion may be presented to the player, offering the player 5 free spins if he'll agree to be mailed an information packet about a new retirement savings vehicle. In various embodiments, if a player has a relatively large amount of money left (e.g., more than $500), then the player may be presented with promotions which advertise relatively expensive products or services, such as cars or jewelry.

4.13. Alerts and Messaging. In various embodiments, an alert or message may be sent to player of a mobile gaming device. In various embodiments, the same alert or message may be sent to multiple different players of mobile gaming devices. If there are many players using mobile gaming device, then the mobile gaming devices may serve as an effective mass communication medium for messages, such as messages to be communicated to casino patrons. Various circumstances may trigger alerts or messages. If an alert is accompanied by sounds, then the when the alert is sent to multiple mobile gaming devices in a casino, the sounds of simultaneous mobile gaming devices around the casino making sounds may add emphasis and excitement to the occasion of the alert (e.g., to the occasion where some player has won a large jackpot).

4.13.1. When someone wins the progressive, every player's mobile device can vibrate and/or beep. A message can also be displayed on the mobile device. In various embodiments, a first player of a mobile gaming device may be alerted when a second player wins a significant payout. A significant payout may include a jackpot, a top prize, a prize of more than X amount (e.g., of more than $1000), and so on. In various embodiments, an alert may take the form of beeping, vibrations of the mobile gaming device, flashing lights, and so on. An alert may indicate the name of the second player, the amount won by the second player, the game the second player was playing when he won, the home state of the second player, or any other information. The alert or message may take the form of a text message, an audio message, or any other kind of message.

4.13.2. The alert can also happen in response to other events, like a daily bonus, someone winning more than $100 on a slot machine, or any other significant event, or any other event. In various embodiments, an alert may inform one or more players when a drawing for a prize is about to occur. For example, an alert may inform one or more players when a keno drawing will occur. In various embodiments, an alert may inform one or more players when a drawing is in the process of occurring. The alert may inform a player of partial outcomes. For example, an alert may be sent from the casino server to a mobile gaming device. The alert may detail one or more numbers which have been drawn in a game of keno. The alert may include less than all the numbers that are to be drawn for the game of keno. This may allow a player who is viewing the alert to follow the game of keno as it is in progress. In various embodiments, an alert may inform one or more players that a drawing, chance event, contest, or other event is about to occur, is in the process of occurring, or has occurred. For example, a casino may run a general promotion where three players per day who visit the casino can win a car in a daily drawing. The drawing may occur every day at a particular time, such as at 4:00 pm. Accordingly, the casino may send an alert to one or more players prior to the time of the drawing. The alert may get the player(s) in an anticipatory mood for the drawing and help the drawing to have its intended effect of promoting the casino. The casino may send an alert as the drawing is occurring. The casino may send an alert after the drawing has occurred. The alert may include winning names drawn, for example. The alert may include images, and descriptions of people who won. In various embodiments, any alerts regarding winners of prizes, drawings, contests, or other events may include information about the winners, such as pictures, hometowns, and so on.

4.13.3. The setting (what events trigger the alert) can be configurable by the user. In various embodiments, a player may indicate circumstances under which he would like to receive an alert. In various embodiments, a player might indicate triggers for an alert. A player may provide such indications at various times. For example, when a player first checks out a mobile device, the player may provide indications of what types of alerts he would like to receive. A player may provide indications when playing. For example, a player may access a menu on the display screen of his mobile gaming device. The menu may allow the player to configure what alerts he would like to receive. The menu may list categories of alerts. For example, one category of alert may be an alert that is sent when someone a jackpot is won. Another category of alert may be an alert that is sent when a jackpot reaches a certain level. Another category of alerts may be alerts that are sent when a drawing or other event is set to occur. A player may select a category of alert, e.g., by checking a box or selecting a menu item. A player may also be able to configure a numerical level for a prize before an alert will be sent. For example, a player may specify that he would only like to receive alerts when a payout of more than $1000 has been won in the casino. In various embodiments, a player may configure alerts over the internet. For example, a player may visit a web page of the casino server. On the web page, the player may decide what types of alerts he would like to receive. The player may navigate menus, check boxes, enter text, or otherwise indicate the types of alerts he is interested in receiving. Once a player has checked out a mobile gaming device or otherwise obtained a mobile gaming device, the player's alert selections may be communicated to the mobile gaming device. The mobile gaming device may thereupon only display alerts for which the player has indicated interest.

In various embodiments, a player may receive an alert. The player may then indicate whether he would like to continue receiving alerts of the same type or category. For example, an alert may be presented to a player in a pop-up window. The player may check a box in the pop-up window indicating that he would no longer like to receive alerts of the type just received.

4.13.4. A player may be unable to deactivate alerts following certain events (e.g., a player cannot change the fact that the progressive win gives him an alert). In various embodiments, a player has the option of suppressing certain alerts. For example, a player may indicate that he would not like to see alerts about upcoming keno drawings. Accordingly, the mobile gaming device of the player may cease presenting to the player alerts about keno drawings. In various embodiments, a player does not have the option of suppressing alerts. For example, alerts may be presented by the mobile gaming device of a player even if the player does not wish to receive such alerts, and even if the player has indicated that he does not wish to receive such alerts. In various embodiments, a player is prevented from ignoring alerts or other promotions by having to react in some way to the promotions. For example, when a promotion is presented to a player, the player may be required to press a button, touch an area of the screen, answer a question about the promotion, or otherwise respond to the promotion. If the player does not respond, the player may be prevented from playing further games on his mobile gaming device. For example, an image associated with a promotion may occupy the entire screen area of a mobile gaming device until the player reacts to the promotion. Only then may the promotion disappear and allow the player to view graphics associated with a game.

4.13.5. Alerts when friends or family or group members get a good result. In various embodiments, a player may receive alerts or messages when one of a group of people achieves a particular outcome. The group of people may include people with some relation to the player. For example, the group of people may consist of friends, family, work colleagues, members of the same club, members of the same religious institution, classmates, fraternity brothers, and so on. A player may indicate to the casino server who is in his group. For example, when first checking out a mobile gaming device from the casino, a player may provide the names of his fellow group members. In various embodiments, when one member of a group indicates the names or identifiers of other members of the group, the two or more members of the group (e.g., all members of the group) may receive messages or alerts relating to other members of the group. For example, when one member of the group receives a high-paying outcome, all other members of the group may receive alerts. In various embodiments, alerts may be sent to a player when a member of his group who is not using a mobile gaming device achieves a significant or noteworthy outcome. For example, if a fellow group member at a stationary slot machine wins a $1000 payout, then a player may receive an alert saying, "Your friend just won $1000! !".

4.13.6. Reserving poker tables. Getting alerts for poker tables. Reserve a place in a buffet line. Reserve a taxi.

4.13.6.1. Tables. In various embodiments, a player may use a mobile gaming device to reserve a spot at a gaming table. Gaming tables may include poker tables, blackjack tables, or other tables. To reserve a spot at a table, a player may communicate with the casino server. For example, the player may use his mobile gaming device to access a scheduling system of the casino server. The scheduling system may include a Web page interface, or other type of interface. The scheduling system may list gaming tables within the casino. For example, the scheduling system may list a set of poker tables, each poker table described by the game and the betting limits at the table. The scheduling system may further list names, initials, or other identifiers for players waiting to play at such tables. When visiting the scheduling system, a player may add his name to one or more lists of players waiting to play at tables. For example, a player may add his name to a list of players waiting to play a game of Texas Hold'em with betting limits of $2 and $4 (e.g., 2-4 Texas Hold'em). Once a player's name is added to a list of players waiting for a game, the player may be eligible to sit for the game once all players ahead of him in the list have either been seated or declined to participate in the game. For example, as seats in a game (e.g., a game of Blackjack; e.g., a game of poker) open up, the player at the top of a list of players waiting to play in that game may be offered a seat at the game. The player at the top of the list may then be removed from the list, leaving the previously second player now at the top of the list.

In various embodiments, a player may use a mobile gaming device to access a scheduling system for a game. The scheduling system may allow a player to secure a place in line for a table game, for a slot machine game, or for any other game. The scheduling system may allow a player to reserve a spot in line for any other event or activity for which space or availability may be limited.

In various embodiments, a player may use a mobile gaming device to view available games or tables in a casino. For example, a map of a casino may visually indicate gaming tables, including which tables have openings for players. If there is currently an opening, a player may use his mobile gaming device to reserve the opening for himself.

For example, a player may touch an area on a diagram of a casino floor. The area may be a representation of a poker table. Having touched the area, the mobile gaming device may ask the player whether he would like to reserve a spot at the table. The player may indicate affirmation by touching a button on the screen of his mobile gaming device, such as by touching a button labeled “yes.” The mobile gaming device may inform the player of any time limits associated with claiming the spot. For example, the mobile gaming device may inform the player that the player has 10 minutes in which to claim the spot before the spot will be given to someone else. In various embodiments, when a player reserves a spot at a gaming table, the player may indicate the amount for which he would like to buy in at the gaming table. The player may indicate that amount of cash he would initially like to convert into gaming chips prior to starting play at the gaming table. The player may indicate the amount of gaming chips with which he would like to begin play at the gaming table. After the player has indicated a number of chips with which he would like to begin, a casino representative may arrange to have the chips placed at the gaming table pending the arrival of the player. Thus, when the player arrives at the gaming table, chips may have been counted out for the player already.

In various embodiments, a player may wish to reserve a seat at a gaming table. However, the gaming table may currently be in full use. The player may accordingly interact with a scheduling system in order to place himself in line for a seat at the table. In various embodiments, the casino (e.g., the casino server) may indicate to the player an estimate of the amount of time it will take before a seat opens up for the player at the gaming table. For example, the casino server may transmit to the player’s mobile gaming device an estimate that the wait will be one hour. The waiting time may then be displayed for the player on the screen of the player’s mobile gaming device. The casino server may use various algorithms to estimate a waiting time. The casino server may have historical data indicating the rate at which spots open up at a particular type of game, at particular betting limits, at particular times of day, and so on. Using such data and using data about the number of people ahead of a player for a table, the casino server may estimate how long it will take for a player to get a seat at a table. For example, the estimated time before a player will be seated at a table may be equal to the average time it takes a seat to vacate multiplied by one plus the number of people who are ahead of the player in line for a seat.

In various embodiments, the casino may inform the player of any future gaming tables that will open up. For example, the casino may inform the player that a new poker table will be opening up in half an hour. The player may, accordingly, place himself on a wait list for the new table.

In various embodiments, a player may play a game on a mobile gaming device. The mobile gaming device, or another device, may subsequently offer the player an opportunity to play the same game at a stationary gaming device and/or at a physical gaming table. For example, it may be assumed that if a player has played a game for a period of time on a mobile gaming device, the player might also be interested in playing the same game at a stationary device and/or at a gaming table. In various embodiments, a player may play a game of poker on a mobile gaming device. For example, the player may play a game of Texas Hold’em. The mobile gaming device may then display a message asking the player whether or not the player would like to sit down at a poker table to play a game of poker with a live dealer, with physical cards, and with live opponents. The player may indicate that he is interested. The player’s indication of interest may be transmitted to the casino server. The casino server may then send instructions, e.g., to a casino representative, to have a spot at the table reserved for the player. In various embodiments, a player may be engaged in a slot machine game on his mobile gaming device, e.g., the player may play a game with simulated slot machine reels on the display of the mobile gaming device. An offer may then be presented to the player to play the same game on a stationary slot machine. The player may accept the offer. The slot machine may be subsequently reserved for the player. In various embodiments, when a player plays a particular type of game on a mobile gaming device, and when a spot or space opens up for a similar game at a stationary gaming device or at a gaming table, the spot or space may be offered to the player of the mobile gaming device.

4.13.7. Win a spot at a poker table or blackjack table while playing. In various embodiments, a player who is waiting for a spot at a gaming table, at a game, or in some other activity must play continuously in order to maintain his spot in line. Continuous play may, in various embodiments, be defined differently. For example, continuous play may mean that a player must play one game at least every thirty seconds. As another example, continuous play may mean that a player must make at least $3 in wagers every minute. In various embodiments, a player who does not maintain continuous play may fall back in a line. For example, for every two minute gap in the play of a player, the player may fall back one place in line. If the player was fifth in line for a spot at a gaming table, the player may fall back to sixth in line for a spot at the gaming table.

In various embodiments, a player may win a place in line while playing a game. For example, a player may play a game on a mobile gaming device. The player may win an outcome which advances him one place in line for a spot at a gaming table. A player may also fall back in line based on certain outcomes. For example, a player waiting for a spot at a gaming table may achieve a “fall back” outcome when playing another game on his mobile gaming device. The player’s place in line may accordingly fall back. In some embodiments, players may compete for a spot when the spot opens up. For example, five players may be waiting for a spot at a poker table. When a spot at the table opens up, each of the waiting players may play a game on his or her respective mobile gaming device. The player with the best performance in the game may get the open spot at the gaming table. For example, the player who wins the most money in the game may get the spot at the gaming table.

4.13.8. The act of playing as an entry into any contest or lottery. In various embodiments, play of a game may make a player eligible for entry into a contest or lottery. For example, for each game played on a mobile gaming device, a player may receive an entry into a raffle drawing for a new car. The car may be raffled off to a player who has played a mobile gaming device within a sponsoring casino. In various embodiments, a player must meet a minimum threshold of play before receiving entry into a contest or lottery. For example, a player must play at least one hundred games to receive entry. For example, a player must wager at least $250 in order to receive entry. In various embodiments, a player may receive a number of entries to a contest or lottery which is proportional to an amount the player has wagered. For example, a player may receive entries into a drawing for show tickets, where the number of entries is proportional to an amount wagered by the player. In various embodiments, play of a mobile gaming device may confer to a player entry into a state lottery, inter-state lottery, national lottery, and so on. In various embodiments, play of a mobile gaming device may confer to a player entry into a contest or lottery which is in addition to the game played on the mobile gaming device. In various embodiments, play of a mobile gaming device may confer to a player entry into a contest or lottery which is independent from the game played on the mobile gaming device.

4.13.9. Play poker against other people waiting for an actual spot at the tables. In various embodiments, a player may use a mobile gaming device to simulate play of a table game. In various embodiments, a player with a mobile gaming device may simulate play of a table game with or against other players who have mobile gaming devices. For example, several players with mobile gaming devices may compete against one another in a game of poker. As another example, several players with mobile gaming devices may participate in a game of blackjack using a common dealer and a common deck of cards, e.g., just as the players would if they were at a physical blackjack table. In various embodiments, a player may ask to be seated at a table or at a game. For example, a player may ask to be seated for a poker game. The player may be informed that there are no seats available for the poker game. However, the player may be offered the opportunity to play a game using a mobile gaming device. The player may be offered the opportunity to play the same version of poker as the one for which he had asked to be seated. The player may, accordingly, receive the mobile gaming device and begin play of the game of poker. When a seat becomes available at the physical game of poker, the mobile gaming device of the player may alert the player that the seat has become available. For example, a casino representative may key a message for the player into a terminal. The message may be forwarded (e.g., via the casino server) to the mobile gaming device of the player. The player may thereby be informed that a spot for him at the physical poker table is now available. In various embodiments, a player who is waiting for a seat at a physical gaming table may compete with a mobile gaming device against other players with mobile gaming devices. Players waiting for the same table may compete against one another. For example, five players waiting for seats at a poker table with limits of $4 and $8 may compete in a poker game on their respective mobile gaming devices. The players may compete on their mobile gaming devices in a game with limits of $4 and $8. Thus, in various embodiments, players waiting to play at a physical gaming table which features a particular game may use mobile gaming device to play the same or a similar game. In various embodiments, a player who is waiting for a spot at a table may use a mobile gaming device to play a game with or against other players who are physically seated at the table. Thus, a player with a mobile gaming device may play an electronic version of a game that is being played with real cards, dice, or other playing tokens at a physical gaming table.

5. Indications that there is a promotion. Various signals may be used to get a player's attention so as to inform the player that there is a promotion for him to peruse. In various embodiments, such signals may be generated if it is unclear whether a player would be currently looking at his mobile gaming device. For example, if the player has been engaged in a game in the past five seconds, it may be assumed that the player is currently viewing his mobile gaming device. Thus, a signal of a promotion may not be sent. However, if the player has not been engaged in a game in the last five seconds, a signal may be generated to indicate that a promotion is being presented.

5.1. Vibration. In various embodiments, a mobile gaming device may vibrate to indicate that there is a promotion for the player. The vibrations may be effective if the mobile gaming device is, for example, in physical contact with the player, such as being in the player's pocket. In various embodiments, vibrations associated with a promotion may be distinct from vibrations associated with a phone call, or an email. For example, the mobile gaming device may vibrate at one frequency to signal an incoming call, and at another frequency to signal that a promotion is being presented.

5.2. Beeping. In various embodiments, a mobile gaming device may beep to signal that a promotion is or is about to be presented. In various embodiments, a beep that signals the presentation of a promotion may be distinct from a beep that signals some other event, such as an email.

5.3. Ringing. In various embodiments, a mobile gaming device may ring to signal the presentation of a promotion. The ring associated with a promotion may be distinct from rings signaling other events, such as a phone call.

6. Player responds to an advertisement, e.g., the player shows interest. In various embodiments, a player may respond to a promotion. The player may respond in such a way as to indicate interest in the product, service, event, etc. being promoted. The player may express interest in buying the product or service or in finding out more information about the product or service, for example. The player may respond in a number of ways. During, or following a promotion, the player may have the opportunity to press or click on a button labeled "learn more" "get more information" or the like. Pressing such a button, e.g., on his mobile gaming device, may send a signal to the casino server. The casino server may then forward more information about the product, service, event, etc. to the player. For example, the casino may transmit to the player a text message describing further details about a product. As another example, the casino may transmit to the player more images of the product or service in which the player has expressed interest. The casino server may have further information related to a promotion stored at the casino server. For example, information about the subject of a promotion may be stored in a casino database in associated with the promotion itself. The casino server may receive further information relating to a promotion when a marketer submits a promotion. When submitting a promotion, a marketer may provide additional information. Additional information may include: (a) further description of the product, service, event, or other subject of the promotion; (b) information about where to buy the product or service being promoted; (c) information about the company or marketer making the promotion; (d) safety information; (e) information about related products or services; (f) information about other products being sold by the same company; (g) information about other products made by the same manufacturer; (h) pricing information for the product or service; (i) shipping information for the product (e.g., to what states does the product ship; e.g., how much does shipping cost); (j) information about availability of the product; (k) information about where the product can be purchased; (l) information about when the product or service may be purchased; (m) reviews for the product or service; and any other information pertaining to the promotion or to the product, service, event, etc. being promoted.

6.1. More information about the product mailed or emailed to the player. When a player expresses interest in the subject of a promotion, further information about the subject of the promotion may be sent to the player. The information may be sent via electronic mail. If the information is sent via electronic mail, the player may have a chance to look at the information later when he is not in the midst of a gaming session. The casino server may have the player's email address on file. For example, the casino may have collected the player's email address (and other contact information and other information about the player) when the player signed up for a player tracking card, when the player checked out his mobile gaming device, when the player registered at the casino hotel, etc. If the casino does not have contact information for the player, the player may enter such information at the time he expresses interest in a promotion. In various embodiments, additional information pertaining to promotion may be mailed to a player at a postal address. The postal address may be on file with the casino or may be provided by the player when requesting additional information on a promotion.

6.2. More information shown to the player on the mobile device. In various embodiments, if a player expresses interest in the subject of a promotion, more information about the promotion may be presented to the player on his mobile gaming device. More information may be shown to the player in the form of text, audio, video, still images, cartoons, or in any other presentation format. The additional information may have been previously received by the casino from the marketer and stored with the casino. In various embodiments, when a player expresses interest in the subject of a promotion, the casino may transmit to the marketer an indication that the player has expressed interest. The marketer may then send information to the player. The marketer may send information directly to e.g., an email address or postal address of the player. In various embodiments, the marketer may transmit information about the subject of a presentation to the casino. The casino may then transmit the information to the mobile gaming device of the player. Using his mobile gaming device, a player may repeatedly ask for further information about the subject of a promotion. As the player asks for more information, more information may be transmitted to the player's mobile gaming device and presented to the player from the mobile gaming device.

In various embodiments, a player may request more information about the subject of a promotion. However, in order to provide additional information, a marketer may have to pay the casino. The marketer may have to pay the casino in order to compensate the casino for space taken up on the mobile gaming device of the casino with the additional information and/or for potentially diverting the attention of the player away from the player's gaming session. Thus, in various embodiments, when the player requests more information, a marketer must first confirm that it wishes to provide the additional information and must confirm that it is willing to pay to provide such additional information.

In various embodiments, when a player expresses interest in the subject of a promotion, additional information may be presented for the player using the same slots that are used for original promotions. For example, a promotion may be an advertisement for a car. The promotion may consist of a still image of the car which replaces a symbol on the reels of a slot machine. A player may express interest in the car. Thus, subsequently, additional images of the car may appear as replacement symbols. These additional images may show the car from other angles, may show the interior of the car, may show the car in different colors and styles, and may show any other depiction of the car. In various embodiments, further information provided about a promotion may take the form of follow-on or add-on promotions.

6.3. More information shown to the player on a nearby slot machine. In various embodiments, additional information related to a promotion may be presented to a player using a nearby gaming device. The nearby gaming device may provide a large screen area on which to display promotions. Further the gaming device may not be in use. Therefore, the entire screen area may be available to display promotions. Further, the nearby gaming device may be able to display promotions for a player even while the player continues to play at his mobile gaming device.

In various embodiments, additional information shown to a player may be shown on a stationary gaming device. However, the player may be on the move while additional information is being shown. For example, the player may be walking. Therefore, in various embodiments, information shown to the player may move so as to follow the player. For example, a player may walk alongside a row of slot machines. When the player is in front of a first slot machine, the first slot machine may display a promotional message. As the player walks, he may become more near to a second slot machine and less near to the first slot machine. Accordingly, the second slot machine may now display the same promotional message. The message may disappear from the first slot machine. Accordingly, the message may follow the player. Information shown to the player may be shown on the nearest available stationary gaming device to the player at any given time. An available gaming device may include a gaming device that is not in use, a gaming device that has capabilities to display information of the type necessary, and so on. In various embodiments, information shown to the player may be displayed on the nearest available stationary gaming device to the player that is also facing in the direction of the player. In various embodiments, a display of information may transfer from one gaming device to another according to which gaming devices are adjacent to one another. For example, a player may walk with two gaming devices to his left. As he walks, a display may move from a first of the gaming devices to a second of the gaming devices. In the meantime, the player may walk near to a gaming device that is on his right. However, the display of information may be maintained on the gaming devices to the player's left so as to provide a more continuous viewing experience and so as to avoid making the player turn his head from left to right. The location of the player may be tracked in various ways so that information about promotions may be displayed near to the player. For example, the mobile gaming device of the player may communicate its location to the casino server. The casino server may thereby deduce the location of the player, assuming the player is currently holding the mobile gaming device.

In various embodiments, more information related to a promotion may be shown to a player on a stationary gaming device only if the player plays at the gaming device. For example, additional information may be shown to the player only if the player makes bets in at least three games every minute.

In various embodiments, a player may be presented with additional information related to a promotion, the additional information presented at a stationary gaming device. After the additional information has been presented to the player, the player may be encouraged to begin play at the stationary gaming device. For example, the stationary gaming device may display a message for the player saying, "Hey, while you're here, how would you like to play a few games." The stationary gaming device may even offer the player an incentive to play at the stationary gaming device. For example, the stationary gaming device may present a message to the player saying that if the player makes 8 spins at the stationary gaming device, then the last two spins will be free.

In various embodiments, additional information related to a promotion may be presented, on a stationary gaming device to a first player with a mobile gaming device. The stationary gaming device may be chosen from among several stationary gaming devices, e.g., from stationary gaming devices that are all within a predetermined distance of the first player. Additionally, the stationary gaming device may choose so as to be near to a second player. The second player may be a player who is at an adjacent stationary gaming device to the one being used to present the additional information about the promotion.

6.4. Casino attendant brings more information to show the player. In various embodiments, a casino attendant may bring to a player of a mobile gaming device additional information about the promotion. For example, the player may use his mobile gaming device to request additional information. The casino server may then send a page or email notification to a casino representative to go find the player. The casino server may indicate to the casino representative the location of the player. For example, the casino server may indicate that the player is near to a stationary gaming device number 924, or that the player is near to the east entrance. The casino representative may, in any event, find the player. The casino representative may bring additional information related to the promotion. The additional information may include brochures, coupons, paper advertisements, gift certificates, or any other information. The additional information may include storage media, such as universal serial bus drives, CDs, DVDs, and so on. In various embodiments, the casino attendant may bring to the player a sample of the product. For example, if the promotion is for a new lipstick, the casino representative may bring to the player a sample of the lipstick.

6.5. Player information sent to the marketer. In various embodiments, player information may be sent to a marketer. The player information may be sent to the marketer who originated the promotion sent to the player. The player's contact information may be forwarded to the marketer so that the marketer may later contact the player to provide the player with more information about the product.

7. Showing marketers available marketing opportunities (e.g., who is playing now). In various embodiments, the casino server may show to potential marketers a current audience that is available for viewing promotions. The current audience may include players currently gaming on mobile gaming device, players in possession of mobile gaming devices, players with money remaining with which to play on mobile gaming devices, people within viewing range of mobile gaming devices (e.g., people who might be able to see a promotion shown on a mobile gaming device, people within hearing range of an mobile gaming device, and so on. A potential audience may include people within a limited geographic region. For example, a marketer with retail stores in Nevada might only be interested in sending promotions to people currently in Nevada. A potential audience may include only people within a certain age range. For example, a casino server may show to a marketer only people between the ages of 18 and 35, as such people may be the marketer's main target audience. In various embodiments, a potential audience may include only people with certain demographic characteristics, such as only married people, such as only French speakers, such as only people with incomes over $150,000, and so on. A potential audience may be presented to a marketer in the form of one or more aggregate statistics. For example, a marketer may be told that there are currently 3500 people playing mobile gaming device who are between 18 and 25 years old.

In various embodiments, a potential marketer may be shown available advertising mediums. For example, a marketer may be told that there are currently 1258 places where their product logo can be used as a symbol on reel. As another example, a marketer may be told that there are currently 100 slots open where promotions will be inserted between games played on mobile gaming devices. As will be appreciated, any statistic describing available slots or media for promotions may be presented to a marketer.

In various embodiments, a marketer may be shown available slots for promotions for a particular target audience. For example, a marketer may be told that there 200 mobile gaming devices in which the marketer's promotion may be used in background graphics and where the mobile gaming devices are being played by players of the marketer's target audience.

7.1. The number of active handhelds nationwide is tracked. In various embodiments, the casino server may track the number of mobile gaming device that are currently in use across a particular location or geographic region. The casino server, for example, may track the number of mobile gaming device active within a room, within a casino, within a neighborhood (e.g., the Las Vegas strip), within casinos of the same management, within a state, or within an entire country. Thus, in various embodiments, a casino server may track the number of mobile gaming devices in use nationwide. A statistic describing the number of active mobile gaming devices may be presented to a marketer.

7.1.1. How many handhelds of a particular demographic. In various embodiments, the casino server may track the number of mobile gaming devices that are being used by players of a particular demographic. For example, the casino server may count 584 people that are using mobile gaming device and who are between the ages of 60 and 65. As another example, the casino server may count 2690 people that are using mobile gaming devices and who are also gun owners.

7.1.2. How many handhelds playing a particular denomination. In various embodiments, a casino server may track the number of mobile gaming devices on which players are playing games of a certain denomination. For example, the casino server may track the number of mobile gaming devices on which players are playing games with required wagers of $1.

In various embodiments, the casino server may track the number of mobile gaming devices on which a particular type of game is being played. For example, the casino server may track the number of mobile gaming devices on which Triple Play Video Poker is being played. In various embodiments, the casino server may track the number of mobile gaming devices on which games by a certain game developer are being played.

In various embodiments, any group that is tracked may have its playing characteristics represented by one or more statistics. Such statistics may be presented to a marketer. Based on such statistics, a marketer may decide whether or not to promote to the group.

7.2. Space is made instantly available. In various embodiments, slots, space, or media for promotions may be made available to marketers in a rapid, instant, or real-time basis. For example, a marketer might make a decision to have a promotion presented one minute before it is actually presented. The central server may, for example, list available slots for promotions into the future. A marketer may browse such available slots. The marketer might select one or more slots, even if such slots are to occur within minutes or less. The promotion may then occur on schedule. If a marketer's promotion is not already stored with the casino server (e.g., if image and audio data is not already stored with the casino server), the marketer may be required to upload a promotion to the casino server before it can be presented. Once uploaded, a promotion may be transmitted from a casino server to one or more mobile gaming devices for presentation.

7.3. We allow advertisers to immediately distribute ads on the fly to all, or to all that meet certain criteria. Immediate means display this and now. In various embodiments, a marketer may specify one or more criteria. The criteria may include criteria defining a target audience, such as demographic criteria. The criteria may also define games being played, outcomes achieved, and so on. The criteria may also define current locations of the target audience. For example, the criteria defined by a marketer may specify that the target audience includes only people within the state of Mississippi. Once a marketer has specified a target audience, or criteria that a member of the target audience must meet, promotions from the marketer may be presented to the target audience. Promotions may be presented to all of the target audience, or to some fraction of the target audience. For example, 1000 people may currently satisfy criteria defined by the marketer. The promotion of the marketer may, accordingly, be presented to all 1000 people meeting the criteria. In some embodiments, however, the marketer may not wish to pay to reach the entire target audience. Instead, for example, the marketer may decide to pay to reach only a fraction of the target audience, such as one third of the target audience. Once a marketer has defined a target audience for a promotion, the promotion may be presented to members of the target audience substantially immediately. Alternatively, the promotion may be presented to members of the target audience at a later time, such as at a time desired by the marketer.

7.4. Advertisers get to see a list of who is located near to the product, e.g., to a coke store. In various embodiments, a marketer may view data indicative of how many players of mobile gaming devices are near to the product of the marketer. For example, a marketer may wish to see a count of the number of players of mobile gaming devices who are near to a fast food restaurant which the marketer represents. The marketer may then decide whether to have a promotion presented to some or all of such players.

7.5. Mechanism to allow advertisers to find out what's available and to insert bids. The advertiser has a mechanism to acquire an advertising block. An advertiser has a mechanism to place an ad in the black. In various embodiments, a marketer may view a list or other description of available slots or media in which promotions may be inserted. The list may include a list of slots by time of day, by game, by game denomination, by demographic of the player, and so on. For example, a listing of a slot may indicate that there is a 5-second slot open for 500 gamers between the ages of 50 and 55. The marketer may have the opportunity to purchase that slot and to have his promotion presented during that slot. Thus, the marketer may have his promotion presented to 500 gamers. The marketer may be able to place a bid for that slot. A marketer who places the highest bid may have the opportunity to have a promotion placed in a slot. In various embodiments, a marketer may be able to have a promotion presented to a first number of gamers. The marketer may submit the high bid to have a promotion presented to a second number of gamers, where the second number of gamers is less than the first number of gamers. For example, 500 gamers may be currently playing mobile gaming devices. A marketer may bid to have his promotion presented to 200 of the gamers. If the marketer has submitted the high bid, the marketer may succeed in having his promotion presented to the 200 gamers. The marketer who has submitted the next highest bid may have the opportunity to have his promotion presented to gamers from among the remaining group of gamers. Thus, in various embodiments, a marketer may submit a bid where the bid includes not only a time of day, a game, a length of a promotion, a size of a promotion, etc., but also a number of players to which the promotion will be presented.

In various embodiments, a marketer may purchase a slot for a promotion or submit bids to have a promotion placed using a Web site of the casino server. The casino server Web site may list available slots, highest bids, any restrictions on which types of promotions may be shown, and so on. The marketer may use the Web site to submit bids, to make purchases, to make payment (e.g., by submitting a credit card number), to submit the actual promotion (e.g., image data; e.g., video data; e.g., audio data), and so on. A marketer may submit bids and other information in many other ways, as will be appreciated. For example, a marketer may submit bids via phone, fax, email, postal mail, and so on.

8. Pricing schemes for advertisers. In various embodiments, the casino may charge marketers a variable price for presenting the marketers' promotions. The price charged may depend on a number of factors.

8.1. By real-estate space. The price of a promotion may depend on the amount of physical space taken up by the promotion. The physical space taken up may include space taken up on a display screen. For example, a first promotion that takes up 1 square inch may cost 5 cents per viewer, while a second promotion that takes up 4 square inches may cost 15 cents per viewer. Physical space may be measured in a number of ways. Physical space may be measured in square inches, square centimeters, in pixels, and in portions or percentages of total screen space (e.g., a promotion may take up 25% of the space of a display screen; e.g., a promotion may take up 2 quadrants of a display screen). Physical space may be measured in terms of other items. For example, physical space may be measured in terms of symbols. Thus, for example, a promotion may take up the space of two symbols. In various embodiments, the price of a promotion increases monotonically with the amount of space taken up by the promotion, all else being equal. A promotion may take up space in the sense that images associated with the promotion take up space. For example, the space taken up by a promotion may be the space taken up by images or videos associated with the promotion.

8.2. By time shown. In various embodiments, the price of a promotion may depend on the amount of time taken up by the promotion. For example, a promotion may be presented for 1 second, five seconds, or for thirty seconds. For example, an image associated with a promotion may be displayed for 1 second, five seconds, or for thirty seconds. A promotion which is presented for a longer period of time may cost more money for a marketer.

8.3. By which customers got to see the ad. In various embodiments, the price of a promotion may depend on the target audience for the promotion. The price of a promotion may increase as the income level of the target audience increases. The price of a promotion may increase as the average bet amount of the target audience increases. The price of a promotion may increase as the skill level of the target audience increases. The price of a promotion may increase as the age of the target audience decreases. The price of a promotion may be higher for a target audience of city dwellers versus suburban dwellers. In various embodiments, a target audience may include a set of players who have achieved similar results. For example, a target audience may include all players who have won money in the last hour. In various embodiments, the price of a promotion may be higher for a target audience of players who have won money in the last hour than for a target audience of players who have not won money in the last hour. In various embodiments, a marketer may pay more to reach people who have had better luck (e.g., in the form of winning outcomes) than to reach people who have had worse luck (e.g., in the form of losing outcomes). In various embodiments, the price of a promotion to jackpot winners may be higher than the price of a promotion to people who have not won jackpots, or to people who have not just won jackpots.

8.4. Advertisers are charged more for customers with more money. In various embodiments, the price of a promotion may depend on the amount of money that the viewing audience has. A promotion that is shown to a player with a credit balance of $900 may cost the marketer more than a promotion that is shown to a player with a credit balance of $40. A promotion that is shown to a player with income of $200,000 may cost the marketer more than does a promotion that is shown to a player with an income of $50,000. A promotion that is shown to a player with a hotel room costing $300 per night may cost the marketer more than does a promotion that is shown to a player with a hotel room costing $50 per night.

8.5. Advertisers are charged more for customers with particular demographics. In various embodiments, the price of a promotion may depend on one or more demographics of the target audience. For example, a marketer may have to pay more to show a promotion to a player with one child than to a player with two children.

8.6. There can be a straight price. In various embodiments, the price of a promotion with certain characteristics (e.g., to be presented to a particular target audience, for a particular period of time, etc.) may be fixed. That is, the price may be posted and may not be subject to change or negotiation. The price may be quoted in various ways. For example, the price of a promotion may be quoted on a per-player basis (e.g., the price of a promotion is 5 cents per player to which it is shown). The price of a promotion may be quoted on the basis of a block of players who are to view the promotion. For example, the price of a promotion may be quoted as the price to show a promotion to 500 people.

8.7. There can be a bidding process. If a marketer is the winning bidder, the marketer gets the ad space. In various embodiments, marketers may bid against one another for the opportunity to present a promotion. An opportunity to present a promotion may include an opportunity to present a promotion under a particular set of circumstances. The circumstances for presenting a promotion may include one or more of the following: (a) a time of day during which the promotion will be presented; (b) a player to whom the promotion will be presented; (c) a set of players to whom the promotion will be presented; (d) a game with which a promotion will be presented (e.g., a promotion will be presented on the face of a card in a game of video poker); (e) an amount of time for which the promotion may be presented; (f) an amount of space that will be taken up by a promotion; (g) a type or model of mobile gaming device on which the promotion will be presented (e.g., the promotion may be presented on a model of mobile gaming device with a particular large and bright screen); (h) a location in which a promotion will be presented (e.g., a promotion may be presented only to players who are in a particular restaurant; e.g., a promotion may be presented only to players who are within 20 feet of a particular jewelry store; e.g., a promotion may be presented only to players who are by the pool); and any. As will be appreciated, the circumstances surrounding the presentation of a promotion may influence the desirability of presenting the promotion and may thus influence the amount that a marketer might be willing to pay to present the promotion.

In various embodiments, marketers may bid for the opportunity to present a promotion under a particular set of circumstances. For example, the casino may post a set of circumstances. The posting may allow a marketer to present a 30-second promotion on 4 square inches of screen space, sometime between 2:30 pm and 2:35 pm on Sunday, to 300 female players aged 35-55. In other words, the winning marketer's promotion would be shown to 300 different players as described, with each promotion shown to a player on her respective mobile gaming device.

When the opportunity is posted, marketers may have the opportunity to bid so as to present a promotion under the posted circumstances. Marketers may become aware of the posting by checking a web page of the casino server. For example, marketers may register with the casino server and may thereby receive access to a Web site where opportunities to present promotions are presented. In various embodiments, marketers may become aware of the opportunity through an email or other alert sent by the casino. For example, anytime the casino posts an opportunity for presenting promotions, the casino may alert marketers on its mailing list of the opportunity.

A marketer may enter, in various ways, a bid for an opportunity to present a promotion. In various embodiments, a marketer may key in a price he would be willing to pay. The marketer may key his bid into a Web page run by the casino server. In various embodiments, a marketer may phone a casino representative to convey his bid. In various embodiments, a marketer may submit a bidding strategy to the casino. For example, the bidding strategy may dictate that the marketer will always place a bid that is $10 higher than any competing bid, until the bidding level reaches $300. Accordingly, the casino may enter bids for the marketer automatically in keeping with the marketer's bidding strategy.

In various embodiments, a marketer may bid for only a portion of the promotional opportunities being offered. For example, the casino may post an opportunity to display a still image to 300 people from the Midwest between 3:00 pm and 3:05 pm. A marketer may wish to have a promotion presented to Midwesterners between 3:00 pm and 3:05 pm. However, the marketer may wish to promote to only 100 people. Accordingly, the marketer may bid for the opportunity to present a promotion to 100 of the 300 people from the Midwest. Another marketer may wish to present to only 200 people from the Midwest between 3:00 pm and 3:05 pm. Therefore, it is possible that both the first marketer and the second marketer get their wishes. In various embodiments, all winning bidders pay the same price per person. For example, a marketer who successfully bids to have a promotion presented to 200 of 300 people available may pay the same price per person as does a marketer who successfully bids to have a promotion presented to 100 of 300 people available. The amount paid per person by both marketers may be based on the lower bid. The amount paid per person by both marketers may be based on the higher bid. The amount paid per person by both marketers may be an average or weighted average (e.g., where weightings are proportional to the number of people who will view the each of the marketers' respective promotions) of both bids.

8.8. An advertiser has an exclusive to a particular "slot" (a medium like a card). The advertiser may pay extra for this. In various embodiments, a marketer may gain exclusive use of a slot, medium, or other advertising venue or opportunity. A marketer may gain exclusive rights to: (a) a particular mobile gaming device (e.g., a marketer may have exclusive rights to present promotions on the particular mobile gaming device for some period of time); (b) a particular symbol (e.g., a marketer may have exclusive rights to present promotions on the jack of spades; e.g., a marketer may have exclusive rights to present promotions at the third symbol position of the second reel of a gaming device); (c) a particular area of a screen (e.g., a marketer may have exclusive rights to present promotions in the upper right corner of a display screen of a mobile gaming device; e.g., a marketer may have exclusive rights to present promotions below the playing area on a display screen of a mobile gaming device); (d) a particular display monitor (e.g., a marketer may have exclusive rights to present promotions on a display monitor located above a heavily trafficked corridor in a casino); (e) a particular gaming device (e.g., a marketer may have exclusive rights to present promotions on a particular gaming device; (f) a particular location (e.g., a marketer may have exclusive rights to present promotions to players when the players are at a certain location); (g) a particular time of day (e.g., a marketer may have exclusive rights to present promotions during a particular time of day); (h) a particular group of people (e.g., a marketer may have exclusive rights to present promotions to a particular demographic of people in a casino; e.g., a marketer may have exclusive rights to present promotions to a defined set of people, such as the Jones family; e.g., a marketer may have exclusive rights to present promotions to any person who has won more than $500 in the last hour); or to any other category of promotional opportunity.

In various embodiments, when a marketer gains exclusive use of a slot, medium, or other advertising venue or opportunity, other marketers may be excluded from presenting promotions in the venue while the period of exclusivity persists. In various embodiments, the marketer with exclusive rights may allow other marketers to present promotions at his discretion. The marketer who allows other marketers to present promotions may receive fees from the other marketers.

In various embodiments, a marketer may pay extra for the exclusive right to use a particular slot, medium, venue, etc. For example, suppose the cost per square inch per minute of promotional space on a mobile gaming device is ordinarily 10 cents. If a marketer desires to purchase every square inch of screen space on a mobile gaming device for an hour, the marketer may pay 12 cents per square inch per minute.

In various embodiments, a marketer may gain exclusive rights to a particular slot, medium, venue, etc., with respect to a group of marketers. The group of marketers may be a group of competing marketers, for example. For example, a marketer may gain the exclusive right to present promotions related to airlines on a particular mobile gaming device. As another example, a marketer may gain the exclusive right to present promotions related to food during the hour of 12:00 pm to 1:00 pm on all mobile gaming devices within a casino. In various embodiments, a marketer may pay extra for exclusive rights to present a particular type of promotion, or for rights to exclude a particular group of other marketers from presenting promotions.

8.9. Where several advertisers want a slot, every time the slot appears in a game one of the ads is selected at random. An advertiser can pay more to have a greater probabilistic weighting applied to his ad. For example, if four advertisers pay 2, 5, 6 and 10 respectively, then their respective weights can be 2/23, 5/23, 6/23, and 10/23. In various embodiments, a marketer may pay for a chance or probability of having his promotion presented. For example, a marketer may pay 5 cents and thereby have a 50% chance of having his promotion presented in a particular slot. In various embodiments, various marketers may pay to have a promotion presented in the same slot. For each marketer, a chance that the promotion will be presented in that slot may be determined. For example, the chance that marketer 1's promotion will be presented may be determined to be 40%, the chance that marketer 2's promotion will be presented may be determined to be 20%, and the chance that marketer 32's promotion will be presented may be determined to be 20%. The chance that each marketer's promotion will be presented may be based on the amounts paid by each marketer. In various embodiments, the chance that a marketer's promotion will be presented is set in proportion to the amount paid by the marketer. Thus, if marketer 1 pays twice as does marketer 2 to have his promotion presented in a particular slot, then the chance that marketer 1's promotion will be presented may be set twice as high as that of marketer 2.

In various embodiments, a slot may include a number of presentation opportunities. For example, a slot may include an opportunity to present a promotion to 100 people during a particular five-minute time window. If multiple marketers pay to have a promotion presented during the same slot, the presentation opportunities may be divided among the marketers. For example, one marketer may present his promotion to 60 of the 100 people, while another marketer may present his promotion to 40 of the 100 people. In various embodiments, the number of presentation opportunities given each marketer may be proportional to the amount paid by the marketer. For example, if marketer 1 pays $7, and marketer 2 pays $3, then marketer 1 may have his promotion presented to 70 people while marketer 2 may have his promotion presented to 30 people.

In various embodiments, a slot may include an opportunity to present a promotion on (or in place of) a particular symbol when the symbol arises in a game. As will be appreciated, the symbol may arise multiple times over the course of multiple games. If multiple marketers pay to have a promotions presented in that slot, then one of the marketers' promotions may be chosen at random each time there is an opportunity arises (e.g., each time the symbol arises in a game). The probability that a marketer's promotion will be presented each time an opportunity arises may be proportional to the amount paid by the marketer. In various embodiments, the promotions presented may alternate among all marketers who have paid to have promotions presented in a particular slot. Marketers who have paid more may have their promotions presented more frequently. For example, suppose a first marketer has paid twice as much as a second marketer to present promotions in a particular slot. Then, for every three opportunities to present promotions in that slot, the first marketer may be given the first and third opportunities, while the second marketer may be given the second opportunity.

8.10. There can also be a secondary market for ad space. The ad space can be transferred, for example, with the central service getting a small cut. In various embodiments, a marketer may purchase slots, venues, etc. directly from the casino. In various embodiments, a first marketer may purchase slots, venues, etc. from another marketer or from any other third party. In various embodiments, slots, venues, and other promotional opportunities may be purchased and resold. A secondary market may exist for promotional opportunities.

In various embodiments, the casino may run an exchange for promotional opportunities. In various embodiments, the exchange may be run by a third party. In various embodiments, the exchange may have no individual governing authority. The exchange may allow a marketer to post offers to sell promotional opportunities. The exchange may allow a marketer to post offers to buy promotional opportunities. Offers to buy may include quantities and prices. For example, an offer to buy may specify a number of people to which a promotion will be presented as well as a price that will be paid for the promotional opportunity. Likewise, an offer to buy may specify a price and quantity as well.

In various embodiments, offers to buy and offers to sell may include descriptions of the opportunity being bought or sold. A description may include: (a) a number of people to which a promotion will be presented; (b) a time of day during which the promotion will be presented; (c) a number of mobile gaming devices on which the promotion will be presented; (d) the demographic of the people to whom the promotion will be presented; (e) the amount of time that the promotion will occupy (e.g., the promotion must be a 30-second spot) (f) the form of the promotion (e.g., still image; e.g., video; e.g., audio); (g) the amount of screen or display space the promotion may occupy; (i) the game that the promotion will accompany (e.g., the promotion will be made while players play video poker; (j) the symbol that a promotion will represent or replace (e.g., the promotion will represent a jackpot symbol); and any other descriptors of promotions or the circumstances under which promotions will be presented.

The description of the opportunity being bought or sold may be provided by the casino. The casino may, in fact, be the originator of the opportunity and so may possess a description of the opportunity which it has come up with. In various embodiments, each opportunity may receive a unique identifier. For example, the opportunity to promote to 100 people between the ages of 55 and 65, each with incomes over $100,000, between 11:00 am and 11:05 am in a 30-second video spot taking up half of a screen may have a unique identifier of 1112223453. In various embodiments, identical or fungible opportunities may receive the same identifier. For example, the opportunity to present to a first person from Tennessee at 9:00 pm may be indistinguishable from the opportunity to present to a second person from Tennessee at 9:00 pm. Thus the two opportunities may have identical identifiers. However, any opportunity which is different in some way may receive a different identifier. Associated with each identifier may be a description of the opportunity. A marketer who is interested in purchasing a particular opportunity, for example, may use the identifier associated with the opportunity to access a description of the opportunity. For example, the casino may store a database containing descriptions of opportunities in association with identifiers. If a marketer submits an identifier to the database, the casino may retrieve the description and present the description to the marketer. The description may be presented to a marketer, e.g., on a Web interface to the exchange.

In various embodiments, a quantity specified by a marketer may refer to a number of a particular opportunity that is associated with an identifier. For example, a marketer may wish to purchase 100 of the opportunity with identifier 1112223999. This may correspond to the opportunity to present a still image to 100 people who are in a particular restaurant at a casino between the hours of 12:00 pm and 2:00 pm on Sunday.

In various embodiments, an opportunity may include the opportunity to present a 10-second video clip to a particular individual sometime between 6:00 pm and 9:00 pm. There may be 100 such opportunities available, meaning that the same individual will have 100 10-second video clips presented on his mobile gaming device between 6:00 pm and 9:00 pm. However, as the particular times that the video clips are presented may be chosen at random, each individual opportunity from among the 100 may be a priori indistinguishable from each other opportunity. Therefore each of the 100 opportunities may have the same identifier. Thus, for example, a marketer may bid on 10 such opportunities to present to the player. If the marketer should find a seller to give him the 10 opportunities, the marketer would have the ability to present 10 10-second video clips to the person sometime between 6:00 pm and 9:00 pm.

In various embodiments, one purpose of the exchange may be to match buyers and sellers of the same opportunity. If a buyer bids a certain price for a certain quantity of a particular opportunity, and a seller offers the same price for the same quantity of the same particular opportunity, the buyer and seller may be matched. A sale may take place. The buyer may thus acquire the opportunities to present promotions, and the seller may give up such opportunities. In exchange, the seller may receive payment from the buyer based on the bid and offer amounts. The casino, or other authority in charge of the exchange may receive a transaction fee for matching the buyer and seller. For example, the casino may receive a transaction fee from either the buyer, seller, or both. The fee may come from the last of the buyer or seller to match the price of the other. The fee may come from the first of the buyer and seller to post the price at which the transaction took place. The fee may take the form of a percentage of the sale price and may be deducted from the amount that the seller collects from the buyer.

In various embodiments, a potential buyer may pay a fee just for posting a bid. In various embodiments, a potential seller may pay a fee just for posting an offer. In various embodiments, participants in the exchange may pay a fixed fee, a fixed fee per period of time, or a fixed fee per transactions completed, in order to participate on the exchange.

When an opportunity has come into the hands of a buyer, the buyer's name or other identifying information may be stored in association with the opportunity. Thus, the casino may maintain a record of which marketers own which opportunities for presenting promotions. When it comes time for presenting promotions, the casino may allow the owners of the promotional opportunities to present their promotions during those times.

In various embodiments, an owner of a promotional opportunity must submit a promotion to the casino within a predetermined time of coming into possession of the opportunity. For example, within 1 hour after buying a promotional opportunity, a buyer may be required to submit an advertisement to the casino. The casino may subsequently approve the advertisement before it can be shown. In various embodiments, an owner of a promotional opportunity must submit a promotion to the casino within a predetermined period of time of the promotion's showing, or first potential showing. For example, suppose a promotion has a 10% chance of being shown as early as 8:00 pm. Then the owner of the promotional opportunity may be required to submit the promotion by 7:00 pm. If the promotion is not submitted on time, the owner of the promotional opportunity may lose the opportunity and may be unable to have his promotion shown. In various embodiments, if an owner of an opportunity does not submit his promotion in time, the opportunity may return to the market, for potential acquisition by a new owner.

In various embodiments, contingency opportunities for presenting promotions may be sold. A contingency opportunity may include ability of a second marketer to present a promotion if a first marketer with priority over the second marketer decides not to present a promotion. For example, a first marketer may purchase the opportunity to present a promotion to a particular person at a particular time. A second marketer may purchase the opportunity to present to the same person at the same time if the first marketer does not.

In various embodiments, an identifier for an opportunity may include a ticker symbol. The ticker symbol may be a compact way of representing or identifying the opportunity. For example, the ticker symbol may consist of four letters.

8.11. By the presentation means (audio versus video). In various embodiments, the price of a promotional opportunity may depend on the type of signal used to broadcast the promotion. For example, promotions that employ visual or light based presentations may be priced differently than promotions that employ audio or sound based presentations. A promotion that uses video and audio may be priced differently than is a promotion which uses only video. A promotion that uses video and audio may be priced differently than is a promotion which uses only audio. A promotion which uses vibrations or other touch stimuli may be priced differently from a promotion that does not use touch stimuli. A promotion that uses smell may be priced differently from a promotion that does not use smell.

9. Data about players that is available for reference. In various embodiments, a casino may store various data related to a player. Data may be received in various ways. A player may provide data about himself to the casino. For example, a player may provide data when making a reservation or when signing up for a player tracking card. The casino may receive data about a player when performing a check on the player, such as when performing a check on a player prior to granting credit to the player. The casino may receive data about a player by tracking its interaction with a player. For example, through the player's interaction with the casino, the casino may gather data about a player's wins and losses, recent outcomes, and so on.

In various embodiments, data about a player may be used by marketers to select a target audience for their promotions. For example, a marketer may decide that he wishes to advertise only to players with high skill levels at video poker. In various embodiments, a marketer may select a target audience by navigating through a series of menus. One menu may relate to age. Using the menu, a marketer may select an age range for his target audience. Another menu may relate to income. Using the menu, the marketer may select an income range for his target audience.

In various embodiments, having selected a target audience, a marketer may indicate that he wishes his promotions to go to the target audience. In various embodiments, having indicated a target audience, the marketer may first view statistics describing how many of his target audience are currently available for viewing promotions. For example, the marketer may view statistics describing how many of his target audience are currently using mobile gaming devices. If the marketer is satisfied with the number of his target audience that are available, then the marketer may indicate he wishes his promotion(s) shown to the target audience.

In various embodiments, one or more of the following types of data may be available with respect to a player: (a) name; (b) address; (c) gender; (d) date of birth; (e) data derived from games the player has played; (f) a skill level of the player at a game; (g) a skill level of the player at Blackjack; (h) a skill level of the player at video poker; (i) transaction data for the player; (j) an average deposit size for the player; (k) a bet amount made by the player; (l) an average bet amount made by the player; (m) a bet limit for the player (e.g., a maximum amount that a player is allowed to bet per game; e.g., a maximum total that a player is allowed to bet over a plurality of games, such as over a session of games); (n) a bet limit for the player that has been self-imposed by the player (e.g., a maximum amount that a player is allowed to bet per game by request of the player); (o) a loss limit for the player (e.g., a maximum amount that a player is allowed to lose over some period of time, beyond which the player will be prevented from further gaming); (p) a deposit limit for the player (e.g., a maximum amount that a player is allowed to deposit in a gaming machine; e.g., a maximum amount of chips that a player is allowed to buy at a gaming table).

In various embodiments, one or more of the following types of data may be available with respect to a player: (a) residential address; (b) residential address city; (c) residential address country; (d) residential address preferred; (e) residential address street; (f) residential address suburb; (g) residential address zip; (h) postal address; (i) postal address city; (j) postal address country; (k) postal address preferred; (l) postal address street; (m) postal address suburb; (n) postal address zip; (o) contact details; (p) email; (q) secondary email; (r) fax number; (s) mobile (e.g., the phone number for the player's mobile device); (t) pager (e.g., the contact number for the players' pager); (u) preferred contact method; (v) business number (e.g., the phone number for the player's business); (w) home number (e.g., the phone number for the player's home); (x) credit cards details; (y) personal details; (z) agent code; (aa) date of birth; (bb) first name; (cc) last name; (dd) middle name; (ee) national id; (ff) nationality (e.g., the player's country of origin; e.g., the country in which the player has citizenship); (gg) promotional code; (hh) sex; (ii) title; (jj) authentication question and answers (e.g., questions about the player's mother's maiden name and answers to such questions); (kk) bank account details; (ll) bank name; (mm) bank_account_id; (nn) branch_address; (oo) branch_code; (pp) branch_country; (qq) account_name; and (rr) account_no.

The Player Chooses a Type of Ad at the Time when he Checks Out a Mobile Device.

In various embodiments, a player may make one or more designations at the time when he receives a mobile device. Such designations may influence the promotions and advertisements shown to the player. For example, such designations may influence the types of companies that advertise to the player or the types of products that are advertised to the player.

A player may receive a mobile device in a number of ways. In various embodiments, a player may receive a mobile device at a cage at a casino, at a vending machine, or at a front desk at a casino hotel. In various embodiments, a player may receive a mobile device from a casino representative. For example, a player may be situated at a slot machine and wish to move around the casino while continuing to engage in gaming. Accordingly, the player may request that a casino representative provide the player with mobile device for gaming. A player may also be in possession of a mobile device of his own (e.g., the player may be in possession of a personal cell phone). A player already in possession of a mobile device may make one or more designations pertaining to advertisements at the time he configures or enables his mobile device for the purposes of gaming.

When receiving or configuring a mobile device, a player may make a number of designations. The player may indicate: (a) a product (e.g., Coke); (b) a category of products (e.g., soft drinks; e.g., leisure cruises); (c) a brand; (d) a company; (e) a manufacturer; (f) a purpose for a product (e.g., as a wedding present; e.g., something to clean a bathroom); (g) a price range (e.g., a price range for a product that the player may be willing to buy; (h) a budget range (e.g., an amount the player may have available to spend); (i) a desired sales representative or type of sales representative that the player may be interested in communicating with (e.g., a life insurance agent). Such designations by the player may allow a marketer to determine the desirability of sending advertisements or promotions to a player. For example, if a player has designated the product category of a particular marketer, then the marketer may be more willing to pay to have the player view an advertisement for the marketer's product. The designations may also aid the casino in selling advertising space to marketers. For example, the casino may be able to convince cruise lines to advertise on the mobile devices of players if the casino can show cruise line marketers that a number of such players are interested in vacations on cruise lines.

When receiving or configuring a mobile device, a player may also indicate characteristics about himself/herself. The player may indicate an age, race, income level, place of residence, family status, gender, political preference, occupation, or any other piece of information. Such information may further aid marketers in deciding which players to advertise to, how much to pay to provide advertisements, and in deciding what advertisements to send to one or more players.

Bonus Round on a Separate Device

In various embodiments, a player may engage in part of a game on a mobile gaming device, and part of the same game on another device. The other device may be a gaming device that is not a mobile device. For example, the other device may be a slot machine, video poker machine, video blackjack machine, or the like. In some embodiments, the gaming device may offer an experience to the player that is not available on the mobile gaming device. Thus, it may be more exciting or otherwise pleasing for the player to play a portion of a game on the other gaming device rather than playing the entire game on the mobile gaming device. In some embodiments, a player may reach a bonus round of a game while playing on a mobile gaming device. The bonus round of the game may feature random event embodied in a physical process. For example, the bonus round may feature the spinning of a wheel. While it is possible that the spinning of a wheel may be visually simulated using a display screen of a mobile gaming device, for example, it may be more exciting for a player if he actually sees a physical wheel spin. Thus, a player may play out the bonus round portion of his game using a gaming device that is not mobile. The gaming device used for the bonus round may include a physical spinning wheel. The wheel may spin to reveal the player's prize in the bonus round.

In various embodiments, when a first portion of a game is played on a mobile gaming device, and a second portion of a game is played on another device, the outcome of the game may be determined in several ways. The outcome of the game may be determined solely based on random numbers or events generated by the mobile gaming device. The outcome of the game may be determined solely based on random numbers or events generated by the other device (e.g., by a gaming device that is not mobile). The outcome of the game may be determined solely by a third device, such as by a casino server. The outcome of the game may be determined based on random numbers or events generated by both the mobile gaming device and the other device (e.g., the gaming device that is not mobile). For example, entry into a bonus round may be determined based on random numbers generated on a mobile gaming device. The outcome of the bonus round may be based on random numbers generated at the other device (e.g., at the gaming device that is not mobile). The outcome of the game may be determined based on random numbers or events generated at the mobile gaming device and at the third device (e.g., the casino server). The outcome of the game may be determined based on random numbers or events generated at the other device (e.g., at the gaming device that is not mobile) and at the third device (e.g., at the casino server). The outcome of the game may be determined based on random numbers or events generated at the mobile gaming device, at the other device (e.g., at the gaming device that is not mobile), and at the third device (e.g., at the casino server).

100% Payback Device

In various embodiments, a game on a mobile gaming device may have a house edge of 0%. In various embodiments, a game on a mobile gaming device may have a negative house edge. As will be appreciated, games with 0% house edge may fail to yield profits for a casino. As will be appreciated, games with a negative house edge may potentially cost a casino money.

Thus, in various embodiments, a casino may use revenue from presenting promotions in order to supplement costs associated with games that have 0% or less house edge.

In various embodiments, a casino may present enough promotions on a mobile gaming device to create a desired positive house edge when earnings from promotions are counted. For example, for each $1 game played on a mobile gaming device, the mobile gaming device may present 5 promotions. For example, the five promotions may include five products which take the place of symbols on simulated slot machine reels. For each promotion presented, the marketer sponsoring the promotion may pay the casino one cent. Thus, the casino may earn five cents from marketers for each $1 game played. Even if the house edge on the game itself is 0%, the casino may effectively maintain a 5% house edge when earnings from promotions are taken into account. In order to attain a desired effective house edge, a casino may adjust the number of promotions presented per game played and/or adjust the fees charged to marketers per promotion. For instance, in the foregoing example, if the casino wished to receive a 6% house edge, the casino may have caused the presentation of 6 promotions per game rather than 5.

In various embodiments, a player of a game may be required to view or otherwise peruse one or more promotions in order play games with a zero or negative house edge. As a player views promotions, a player may accumulate points, tokens, or other scrip. The player may be required to accumulate a certain number of points in order to play games with a zero or negative house edge. As the player approaches a target number of points, the house edge may get smaller and smaller, reaching zero when the player achieves the target number of points. For example, a game may conventionally have a house edge of 10%. However, when a player has viewed half of the promotions required to play games with a 0% house edge, the house edge may decline to 5%. In various embodiments, as a player accumulates points, the player may use such points to play a game with a 0% or negative house edge. Once the player uses up points, the player may be required to earn further points (e.g., by viewing more promotions) in order to play further game with a 0% or negative house edge.

In various embodiments, a meter or other gauge may indicate a player's progress towards being able to play games with a 0% house edge. As a player views more promotions, for example, the meter may more closely approach a target. When the target is reached, the player may be able to play games with a 0% house edge. In various embodiments, a player may be required to continually, periodically, or sporadically view additional promotions in order to maintain the privilege of playing games with a 0% or negative house edge. If the player fails to view promotions at the desired rate, the player may lose points and/or the meter may move away from its target range. The player may then be left to play games with a positive house edge until such time as the player views additional promotions.

Getting Regulatory Approval for Ads

In various embodiments, a casino may seek regulatory approval to feature or insert a promotion into a game. In various embodiments, a casino may seek regulatory approval to feature or insert a graphic associated with a promotion into a game. In various embodiments, a casino may seek regulatory approval to feature or insert any graphic into a game. The game may be a game of chance played for money, such as a slot machine game or video poker game. In various embodiments, a casino may receive blanket approval to insert any one of several graphics, at the casino's discretion, into a game. For example, the casino may desire regulatory approval to insert any one of 50 different graphics into a game. For example, the casino may desire regulatory approval to insert any one of 50 graphics as a symbol into a game. The graphics, or any data related to a promotion, may be shown in advance to regulators. The regulators may approve all the graphics, or other data, and may then allow the casino to insert any one of such graphics, at its discretion, into the game.

Terms of regulator approval for inserting a graphic into a game may include any one or more of the following: (a) the presence of a graphic has no effect on the game when compared to how the game would be played if the graphic were not present; (b) the presence of a graphic has no effect on the payout of the game when compared to what the payout of the game would be if the graphic were not present; (c) the graphic in no way indicates or represents something that is not true (e.g., a graphic cannot say "winner" if the graphic does not form part of a winning outcome); (d) the graphic in no way indicates or represents anything about the game itself (e.g., the graphic does not suggest an amount of a payout, a winning or losing outcome, an entry into a bonus round, etc. The graphic may simply convey a message that is independent of the game play); (e) the graphic is not offensive; (f) the graphic cannot be confused for another graphic that is already part of the game; (g) the graphic cannot be confused for a graphic that is part of any game (e.g., a graphic of a clown might be forbidden because it might be confused with a joker symbol); (h) the graphic may not appeal to children or minors (e.g., the graphic may not show toys or brands which appeal to children); and so on. It will be appreciated that the foregoing terms may apply to video, cartoons, animation, audio, or any other information which may be featured in a promotion.

Obtaining regulatory approval on the foregoing may allow a casino to solicit promotions which may be obtained from marketers and then which may be incorporated into games. A new promotion may be received and then incorporated without the necessity of obtaining regulatory approval between the time the promotion is received and the time the promotion is incorporated. This may allow for marketers to enjoy a rapid turnaround time between when promotions are submitted and when the promotions are incorporated.

In various embodiments, a mobile gaming device may display a promotion that serves to encourage a player to play at a stationary gaming device. For example, a player may be holding a mobile gaming device as he walks through a casino. The mobile gaming device may start buzzing and then display a message. The message may inform the player that a stationary gaming device of a certain type is nearby. For example, the message may read, "There is a great game called Jackpot Jungle" to your right. It is very lucky today!". In various embodiments, a mobile gaming device may detect the presence of a nearby stationary device, or vice versa. The mobile gaming device may then encourage the player to visit the nearby stationary gaming device. There may be any of a number of triggering conditions which trigger the display of a message to a player encouraging the player to visit a stationary gaming device. Triggering conditions may include the following: (a) the stationary gaming device is within a predetermine distance of the mobile gaming device; (b) the stationary gaming device has a higher betting limit than the mobile gaming device; (c) the stationary gaming device supports the same game that the player has been playing on his mobile gaming device; (d) the stationary gaming device supports the same game that the player had played in the past; (e) the stationary gaming device supports a game on which the player had experienced good results in the past (e.g., a game on which the player had won more than $100 in the past); (f) the stationary gaming device features a new game (e.g., a new game that the casino wishes to test; e.g., a new game that a manufacture wishes to test; e.g., a new game that the casino wishes to popularize); and any other triggering conditions.

In various embodiments, a mobile gaming device, or any mobile device, may serve as an information display or information conduit for nearby objects, people, or other things or entities. In various embodiments, a player may hold the mobile gaming device close to a stationary gaming device in order to find out information about the stationary gaming device. For example, a player may hold up a mobile gaming device close to a stationary gaming device in order to find out historical gaming results at the stationary gaming device. Information that may be revealed on a mobile gaming device about a stationary gaming device may include the following: (a) the last outcome; (b) the last payout; (c) the last 10 outcomes; (d) the last 10 payouts; (e) the last X outcomes; (f) the last X payouts; (g) the last time a bonus round was reached; (g) the net winnings of the prior player at the stationary gaming device; (h) the gross winnings of the prior player at the stationary gaming device; (i) the amount won at the stationary gaming device in the last hour; (j) the amount won at the stationary gaming device in the last X period of time; (k) the last time a jackpot was won; (l) the largest payout to be won in the last hour; (m) the identity of any celebrity that has played at the stationary gaming device; and any other information about the stationary gaming device.

In various embodiments, a mobile gaming device may reveal information about a gaming table. The mobile gaming device may reveal results or outcomes at the table. For example, the mobile gaming device may display representations of cards that are currently in play at the table. For example, the mobile gaming device may display representations of the community cards that are currently in play in a game of Texas Hold'em. In various embodiments, a mobile gaming device may display representations of current pot sizes or beta amounts at a table. The mobile gaming device may display representations of hidden or secret cards. For example, a mobile gaming device may show representations of cards that a player holds in his hand, or representations of cards yet to be dealt. In various embodiments, a mobile gaming device may show: (a) the identify of one or more players at a table; (b) a gaming history of one or more players at a table (e.g., the most recent outcome achieved by a player at the table; e.g., the winnings for the player at the table in the last hour); (c) the identity of the dealer at the table; (d) the stakes at the table; (e) the betting limit at the table; (f) the last X cards dealt at the table; (g) the manufacturer of the table; (h) the availability of a seat at the table (e.g., the mobile gaming device may show that there is one seat available at the table; e.g., the mobile gaming device may show that there are 3 people in line to sit at the table); (i) information about a dealer at the table; (j) information about how much players have won when playing with this dealer; and any other information about the game at the table, the outcomes at the table, the players at the table; and any other information about the table.

In various embodiments, a mobile gaming device may display information about a restaurant. The mobile gaming device may display information including: (a) an indication of one or more menu items that are in the restaurant; (b) an indication of prices in the restaurant; (c) in indication of ratings or reviews for the restaurant; (c) an indication of the available seating in the restaurant; (d) information about a chef at a the restaurant; (e) an indication of an expected wait time; (f) an indication of an expected time to be served dinner; (g) an indication of any special items being served; (h) an indication of any promotion associated with the restaurant (e.g., a current promotion may offer drinks at half price); and any other information about the restaurant.

In various embodiments, a mobile gaming device may display information about a store or other retail establishment. A mobile gaming device may display information including: (a) product listings; (b) product prices; (c) promotions (e.g., a promotion may offer 50% on all items in the store); (d) product reviews; (e) product sizes (e.g., sizes for clothes); (f) number available of every product, and any other information about the store.

In various embodiments, a mobile gaming device may have different settings in terms of what types of information or how much information it may reveal about a stationary gaming device, about a person, or about any other entity. In various embodiments, different settings may allow a player to view information about different time periods. A first setting may allow a player to view information from a particular time in the past. A second setting may allow a player to view information from another, more distant time in the past. For example, a first setting may allow a player to view historical game information about a stationary gaming device up to 10 minutes in the past. In other words, the player may be able to see what outcomes have occurred at the gaming device in the past ten minutes. However, outcomes which had occurred at the gaming device more than ten minutes ago may not be available for viewing by the player. A second setting of a mobile gaming device may allow a player to view historical gaming results from a stationary gaming device up to one hour in the past. In various embodiments, a setting may determine the range over which a mobile gaming device may display information about a stationary gaming device or other person, object, or entity. At a first setting, the mobile gaming device may be able to display information about a stationary gaming device that is up to 10 feet away. At a second setting, the mobile gaming device may be able to display information about a stationary gaming device that is up to 50 feet away. If a player has a mobile gaming device at the second setting, the player may be able to sweep the mobile gaming device in an arc with his hand and to thereby find out information about many different stationary gaming devices without having to move his feet. In various embodiments, settings may determine the type of stationary gaming device, person, object, or other entity about which a mobile gaming device may display information. For example, in a first setting, a mobile gaming device may display information only about stationary gaming devices that feature video poker. In a second setting a mobile gaming device may display information only about stationary gaming devices that feature slot machine games.

In various embodiments, prior to displaying information about a stationary gaming device, person, or other object or entity, a mobile gaming device must first detect the stationary gaming device. Further, in various embodiments, it must be decided which stationary gaming device among several proximate gaming devices will be the one for which information will be displayed on the mobile gaming device. For example, the mobile gaming device may be proximate to several stationary gaming devices. It must then be determined which of the several proximate stationary devices will be the one for which information is displayed on the mobile gaming device. In various embodiments, a mobile gaming device will display information about the stationary gaming device to which it is closest. In various embodiments, a mobile gaming device will display information about the stationary device to which it is most nearly being pointed. For example, a mobile gaming device may have side or face which may be assumed to constitute the front of the mobile gaming device. When the front of the mobile gaming device is facing or pointing towards a particular stationary gaming device, then the mobile gaming device may display information about the stationary gaming device. In various embodiments, a mobile gaming device may display information about a stationary gaming device which is facing in the direction of the mobile gaming device. Thus, for example, the mobile gaming device may display information about a first stationary gaming device that is further away than is a second stationary gaming device if the first stationary gaming devices faces in the direction of the mobile gaming device and the second stationary gaming device faces in a different direction.

In various embodiments, a player may pay to have particular settings on his mobile gaming device, where such settings determine the amount of information that may be displayed on the mobile gaming device. For example, a player may pay $5 per day for a first setting in which he can hold his mobile gaming device up to a stationary gaming device and see the last 10 outcomes of the stationary gaming device displayed on his mobile gaming device. The player may pay $10 per day for a second setting in which he can hold his mobile gaming device up to a stationary gaming device and see the last 100 outcomes of the stationary gaming device displayed on his mobile gaming device. In various embodiments, a mobile gaming device may receive information such that it is capable of displaying the information available for any possible setting. However, the mobile gaming device may withhold information or not display certain information that it has received based on its current setting. For example, a mobile gaming device may be in a first setting where it may only display the last 10 outcomes that have occurred on a stationary gaming device. The stationary gaming device may, in fact, communicate to the mobile gaming device the last 100 outcomes that have occurred at the stationary gaming device. However, the mobile gaming device may only display 10 of those outcomes because of its current setting. Were the mobile gaming device in a second setting, the mobile gaming device might display all 100 of those outcomes. In various embodiments, a mobile gaming device may request from a stationary gaming device, from the casino server, or from any other source only the information that it may communicate to a player based on the current setting of the mobile gaming device.

The invention claimed is:

1. An apparatus comprising:

at least one processor configured to control:

receiving an indication of a predetermined location in a predetermined area at which an opportunity to present a promotion on a mobile computing device may occur in the future;

submitting a bid for the opportunity to present the promotion on the mobile computing device in the future, the bid including a monetary amount;

receiving an indication that the bid has been accepted;

generating data from which to present the promotion, based on a comparison of content of the promotion with content items that are to be displayed in a portion of a game at a plurality of areas on a display screen when the promotion is to be presented, in which the comparison determines the content of the promotion is permissible to be displayed in the portion of the game in a first area of the plurality of areas and is not permissible to be displayed in the portion of the game in a second area of the plurality of areas, in which the first area is different from the second area;

transmitting the data to a server; and receiving from the server information on presentation of the promotion by a mobile computing device at the predetermined location.

2. The apparatus of claim 1, in which the at least one processor is configured to control:

receiving a bill for the monetary amount; and providing the monetary amount.

3. The apparatus of claim 1, in which the data includes at least one of:

(a) image data;

(b) video data; or (c) audio data.

4. The apparatus of claim 1, in which the at least one processor is configured to control receiving an indication that the promotion meets a set of criteria used to filter out unwanted promotions.

5. The apparatus of claim 4, in which the set of criteria includes one or more of:

(a) the promotion contains no vulgar language;

(b) the promotion contains only images with certain pixel dimensions;

(c) the promotion has predetermined running length;

(d) the promotion contains no images which are identical to images used in one or more predetermined games; and (e) the promotion contains no sounds which are identical to sounds used in one or more predetermined games.

6. The apparatus of claim 1, in which the at least one processor is configured to control: receiving an indication of a reaction to the promotion and determining an adjustment to a future promotion based on the reaction.

7. The apparatus of claim 1, in which the at least one processor is configured to control receiving an indication of a credit balance of a player for which the opportunity to present the promotion may occur in the future.

8. The apparatus of claim 1, in which the at least one processor is configured to control receiving an indication of a characteristic of a win by a player for which the opportunity to present the promotion may occur in the future.

9. The apparatus of claim 8, in which the characteristic includes an amount won.

10. The apparatus of claim 1, in which the comparison determines the content of the promotion is permissible to be displayed in the portion of the game at a second predetermined location on the display screen in relation to a given area of the plurality of areas.

11. The apparatus of claim 10, in which the second predetermined location is in a predetermined direction in relation to the given area.

12. A method comprising:

controlling, by at least one processor:

receiving an indication of a predetermined location in a predetermined area at which an opportunity to present a promotion on a mobile computing device may occur in the future;

submitting a bid for the opportunity to present the promotion on the mobile computing device in the future, the bid including a monetary amount;

receiving an indication that the bid has been accepted;

generating data from which to present the promotion, based on a comparison of content of the promotion with content items that are to be displayed in a portion of a game at a plurality of areas on a display screen when the promotion is to be presented, in which the comparison determines the content of the promotion is permissible to be displayed in the portion of the game in a first area of the plurality of areas and is not permissible to be displayed in the portion of the game in a second area of the plurality of areas, in which the first area is different from the second area;

transmitting the data to a server; and receiving from the server information on presentation of the promotion by a mobile computing device at the predetermined location.

13. The method of claim 12, in which the at least one processor is configured to control:

receiving a bill for the monetary amount; and providing the monetary amount.

14. The method of claim 12, further comprising:

controlling, by the at least one processor, receiving an indication that the promotion meets a set of criteria used to filter out unwanted promotions.

15. The method of claim 14, in which the set of criteria includes one or more of:

(a) the promotion contains no vulgar language;

(b) the promotion contains only images with certain pixel dimensions;

(c) the promotion has predetermined running length;

(d) the promotion contains no images which are identical to images used in one or more predetermined games; and (e) the promotion contains no sounds which are identical to sounds used in one or more predetermined games.

16. The method of claim 12, further comprising:

controlling, by the at least one processor, receiving an indication of a reaction to the promotion and determining an adjustment to a future promotion based on the reaction.

17. The method of claim 12, further comprising:

controlling, by the at least one processor, receiving an indication of a credit balance of a player for which the opportunity to present the promotion may occur in the future.

18. The method of claim 12, further comprising:

controlling, by the at least one processor, receiving an indication of a characteristic of a win by a player for which the opportunity to present the promotion may occur in the future.

19. The method of claim 12, in which the comparison determines the content of the promotion is permissible to be displayed in the portion of the game at a second predetermined location on the display screen in relation to a given area of the plurality of areas.

20. The method of claim 19, in which the second predetermined location is in a predetermined direction in relation to the given area.

* * * * *